United States Patent
Miyake et al.

(10) Patent No.: US 6,889,315 B2
(45) Date of Patent: May 3, 2005

(54) PROCESSOR AND METHOD OF CONTROLLING THE SAME

(75) Inventors: Hideo Miyake, Kawasaki (JP); Atsuhiro Suga, Kawasaki (JP); Yasuki Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 701 days.

(21) Appl. No.: 09/736,357

(22) Filed: Dec. 15, 2000

(65) Prior Publication Data

US 2001/0004757 A1 Jun. 21, 2001

(30) Foreign Application Priority Data

Dec. 17, 1999  (JP) ............................................ 11-359837
Feb. 21, 2000  (JP) ...................................... 2000-043441
Mar. 10, 2000  (JP) ...................................... 2000-067789

(51) Int. Cl.[7] ............................................ G06F 9/312
(52) U.S. Cl. ...................................... 712/217
(58) Field of Search ........................................ 712/217

(56) References Cited

U.S. PATENT DOCUMENTS

| 5,694,577 A | 12/1997 | Kiyohara et al. | 711/167 |
| 5,758,051 A | 5/1998 | Moreno et al. | 714/2 |
| 5,778,219 A | * 7/1998 | Amerson et al. | 712/244 |
| 5,920,710 A | * 7/1999 | Tan et al. | 712/216 |
| 6,615,343 B1 | * 9/2003 | Talcott et al. | 712/244 |

FOREIGN PATENT DOCUMENTS

| EP | 0 789 298 A1 | 8/1997 |
| JP | 7-182165 | 7/1995 |
| JP | 2000-222207 | 8/2000 |

OTHER PUBLICATIONS

"Rejection of Program Interrupts Generated by Out–of–Order, Speculative Instructions", IBM Technical Disclosure Bulletin, vol. 37, No. 4A, Apr. 1, 1994, pp. 257–258.

* cited by examiner

*Primary Examiner*—Eric Coleman
(74) *Attorney, Agent, or Firm*—Staas & Halsey LLP

(57) ABSTRACT

The present invention relates to a processor that performs a load operation prior to a store operation while avoiding ambiguous memory reference, and achieves high-speed operations. The present invention also relates to a method of controlling such a processor. This processor includes a history control unit that stores a storage destination of a result obtained by executing a second instruction that is executed prior to a first instruction placed before the second instruction. When it is determined that the address of first data to be processed by the first instruction is included in the address region of second data to be processed by the second instruction, the history control unit overwrites the result obtained by the execution of the first instruction on the second data corresponding to the address.

55 Claims, 72 Drawing Sheets

FIG. 3 PRIOR ART

| OP-CODE | GR1 | GR2 | GRD |

FIG. 5 PRIOR ART

| OP-CODE | GR1 | GR2 | GRS |
|---|---|---|---|

FIG. 16

| OP-CODE | GR1 | GR2 | GRD |

FIG. 18

| OP-CODE | GR1 | GR2 | GRS |

FIG. 20

| OP-CODE | — | — | — |

FIG. 28

| OP-CODE | GR1 | GR2 | GRS |
|---|---|---|---|

FIG. 34

| OP-CODE | GR1 | GR2 | GRS |

FIG.62

| INSTRUCTION ADDRESS | PATH IDENTIFICATION NUMBER |
|---|---|
| a0 | p0 |
| a1 | p1 |
| ⋮ | ⋮ |
| ai | pi |

FIG.63

| PATH IDENTIFICATION NUMBER | INSTRUCTION ADDRESS | ANOTHER PATH IDENTIFICATION NUMBER |
|---|---|---|
| p0 | b0 | sp0 |
| p1 | b1 | sp1 |
| ⋮ | ⋮ | ⋮ |
| pj | bj | spj |

FIG.64

| INSTRUCTION ADDRESS | PATH IDENTIFICATION NUMBER |
|---|---|
| b0 | p0 |
| b1 | p1 |
| ⋮ | ⋮ |
| bk | pk |

FIG.65

| PATH IDENTIFICATION NUMBER | INSTRUCTION ADDRESS | EFFECTIVE ADDRESS |
|---|---|---|
| p0 | c0 | ec0 |
| p1 | c1 | ec1 |
| ⋮ | ⋮ | ⋮ |
| pl | cl | ecl |

FIG.75

| REGISTER NUMBER | INSTRUCTION ADDRESS | EFFECTIVE ADDRESS |
|---|---|---|
| r0 | a0 | ea0 |
| r1 | a1 | ea1 |
| ⋮ | ⋮ | ⋮ |
| rl | al | eal |

US 6,889,315 B2

PROCESSOR AND METHOD OF CONTROLLING THE SAME

BACKGROUND OF THE INVENTION

1. Field of the Invention

The present invention generally relates to processors and methods of controlling processors, and, more particularly, to a processor that executes programmed instructions and a method of controlling such a processor.

2. Description of the Related Art

FIG. 1 shows a first example of a conventional processor having a general register and a floating point register. As shown in FIG. 1, the processor comprises a memory 1, n instruction read unit 3 connected to the memory 1, an instruction execution unit 5 connected to the memory 1 and the instruction read unit 3, a register control unit 7 connected to the instruction execution unit 5, and an interrupt control unit 9 connected to the instruction read unit 3, the instruction execution unit 5, and the register control unit 7.

The instruction read unit 3 includes an instruction read control unit 11, a program counter (PC) 13, and an instruction word register (IR) 15. The instruction read control unit 11 is connected to the memory 1, and the program counter (PC) 13 is connected to the instruction read control unit 11. The instruction word register (IR) 15 is connected to the instruction read control unit 11.

The instruction execution unit 5 includes an instruction decoder unit 17, a load instruction execution unit 19, a store instruction execution unit 21, an instruction execution circuit 23, a gloating point load instruction execution unit 25, a floating point store instruction execution unit 27, and a floating point calculation instruction execution unit 29.

The instruction decoder unit 17 is connected to the instruction word register 15, and the load instruction execution unit 19 is connected to the memory 1 and the instruction decoder unit 17.

The store instruction execution unit 21 is connected to the instruction decoder unit 17 and a general register 37 that will be described later. The instruction execution circuit 23 is connected to the instruction decoder unit 17, the general register 37, and registers 31, 33, and 35 that will be described later. The floating point load instruction execution unit 25 is connected to the memory 1 and the instruction decoder unit 17. The floating point store instruction execution unit 27 and the floating point calculation instruction execution unit 29 are connected to the instruction decoder unit 17 and a floating point register 39 that will be described later.

Meanwhile, the register control unit 7 includes an EPCR register 31, an EPSR register 33, a PSR register 35, the general register 37, and the floating point register 39. The EPCR register 31, the EPSR register 33, and the PSR register 35 are connected to an interrupt control circuit 40. The general register 37 is connected to the load instruction execution unit 19, the store instruction execution unit 21, and the instruction execution circuit 23. The floating point register 39 is connected to the floating point load instruction execution unit 25, the floating point store instruction execution unit 27, and the floating point arithmetic operation instruction execution unit 29.

The interrupt control unit 9 includes the interrupt control circuit 40. The interrupt control circuit 40 is connected to the instruction read control unit 11, the program counter 13, the load instruction execution unit 19, the store instruction execution unit 21, the instruction execution circuit 23, the floating point load instruction execution unit 25, the floating point store instruction execution unit 27, and the floating point arithmetic operation instruction execution unit 29.

In the processor having the above structure, the instruction read unit 3 reads an instruction word indicated by the program counter 13 out of the memory 1, and supplies the instruction word to the instruction execution unit 15 via the instruction word register (IR) 15. If the instruction read control unit 11 receives a branch destination address from the instruction execution unit 5 and the interrupt control circuit 40, which executes an interrupt, the instruction read control unit 11 writes the branch destination address in the program counter 13. In other cases, the instruction read control unit 11 supplies a next instruction word to the instruction execution unit 5, and therefore increments the program counter 13 that indicates the address of the instruction word to be read out. In a case where the instruction read control unit 11 detects an interrupt when reading an instruction word, the instruction read control unit 11 supplies an interrupt signal to the interrupt control circuit 40.

The instruction decoder unit 17 decodes an instruction supplied from the instruction word register 15. In a case of a load instruction, the instruction decoder unit 17 supplies the instruction to the load instruction execution unit 19. In a case of a store instruction, the instruction decoder unit 17 supplies a store instruction to the store instruction execution unit 21. In a case of a floating point load instruction, the instruction decoder unit 17 supplies the instruction to the floating point load instruction execution unit 25. In a case of a floating point store instruction, the instruction decoder unit 17 supplies the instruction to the floating point store instruction execution unit 27. In a case of a floating point calculating instruction, the instruction decoder unit 17 supplies the instruction to the floating point calculating instruction execution unit 29. In a case of an interrupt return instruction to any other instruction, the instruction decoder unit 17 supplies the instruction to the instruction execution circuit 23.

When the load instruction execution unit 19 receives the load instruction, the load instruction execution unit 19 reads data from a region in the memory 1 corresponding to an effective address determined based on a value read out from the general register 37, and writes the result in the general register 37, as shown in FIG. 2. Here, the load instruction includes an instruction code OP-CODE, and codes GR1, GR2, and GRD for designating a register. The addition result of the register value indicated by the code GR1 and the register value indicated by the code GR2 represents the address of the data to be loaded, and the code GRD indicates the number of a register that holds the addition result. However, in a case where the load instruction execution unit 19 detects an interrupt when executing the load instruction, the load instruction execution unit supplies an interrupt signal to the interrupt control circuit 40.

Likewise, when the store instruction execution unit 21 receives the store instruction, the store instruction execution unit 21 reads data from the region in the general register 37 corresponding to an effective address determined based on a value read out from the general register, and writes the result in the region of the memory 1 corresponding to the effective address, as shown in FIG. 4. Here, the store instruction includes an instruction code OP-CODE, and codes GR1, GR2, and GRS for designating a register. The addition result of the register value indicated by the code GR1 and the register value indicated by the code GR2 represents the address of data to be stored, and the code GRS indicates the number of a register that holds a value to be written. However, in a case the store instruction execution unit 21 detects an interrupt when executing the store instruction, the store instruction execution unit 21 supplies an interrupt signal to the interrupt control circuit 40.

When the floating point load instruction execution unit 25 receives the floating point load instruction, the floating point load instruction execution unit 25 reads data from the region in the memory 1 corresponding to an effective address determined based on a value read out from the general register 37, and writes the result in the floating point register 39. However, in a case where the floating point load instruction execution unit 25 detects an interrupt when executing the floating point load instruction, the floating point load instruction execution unit 25 supplies an interrupt signal to the interrupt control circuit 40.

When the floating point store instruction execution unit 27 receives the floating point store instruction, the floating point store instruction execution unit 27 reads data from the region in the floating point register 39 corresponding to an effective address determined based on a value read out from the general register 37, and writes the result in the region memory 1 corresponding to the effective address. However, in a case where the floating point store instruction execution unit 27 detects an interrupt while executing the floating point store instruction, the floating point store instruction execution unit 27 supplies an interrupt signal to the interrupt control circuit 40.

The floating point arithmetic operation instruction execution unit 29 executes an operation based on a value read out from the floating point register 39 when the floating point arithmetic operation instruction is supplied. The floating point arithmetic operation instruction execution unit 29 then writes the result in the floating point register 39.

When the instruction execution circuit 23 receives an arithmetic operation instruction from the instruction decoder unit 17, the instruction execution circuit 23 performs an operation based on a value read out from the general register 37, and writes the result in the general register 37. In a case where the instruction execution circuit 23 receives a branch instruction from the instruction decoder unit 17, the instruction execution circuit 23 supplies the branch destination address to the program counter 13 at the time of the occurrence of the branch. In a case where the instruction execution circuit 23 receives an interrupt return instruction, the instruction execution circuit 23 writes data that represents the pre-interrupt operation state in the register PSR 35. The instruction execution circuit 23 then reads the address of the instruction at the return destination from the register EPCR 31, and supplies the address as the branch destination address to the program counter 13. However, if the instruction execution circuit 23 detects an interrupt while executing the above instruction, the instruction execution circuit 23 supplies an interrupt signal to the interrupt control circuit 40.

The register EPCR 31 holds the address of an instruction corresponding to the return destination from the interrupt. The address is set at the occurrence of the interrupt. The register PSR 35 holds data that represents the operation state, and the register EPSR 33 holds data that represents the pre-interrupt operation state set prior to the occurrence of the interrupt.

Based on the interrupt signal supplied from the instruction read unit 3 or the instruction execution unit 5, the interrupt control circuit 40 writes the instruction address corresponding to the interrupt return destination in the register EPCR 31, the data that represents the pre-interrupt operation state in the register EPSR 33, and the operation state corresponding to the interrupt in the PSR 35. The interrupt control circuit 40 supplies the branch destination address corresponding to the interrupt to the instruction read unit 3.

In the following, the operations of the above processor will be summarized. The operation of the processor in the initial stage is as follows. The instruction read unit 3 reads out an instruction word indicated by the program counter 13, supplies the instruction word to the instruction execution unit 5, and then executes the supplied instruction.

When an interrupt occurs, the interrupt control circuit 40 writes the instruction address corresponding to the interrupt return destination in the register EPCR 31, the data that represents the pre-interrupt operation state in the EPSR 33, and the operation state of the interrupt in the PSR 35, based on the interrupt signal supplied from the instruction read unit 3 or the instruction execution unit 5. Also, the interrupt control circuit 40 supplies the branch destination address corresponding to the interrupt to the instruction read unit 3. The instruction read unit 3 then reads out an instruction word in accordance with the branch destination address supplied from the interrupt control unit 9, and supplies the instruction word to the instruction execution unit 5. After that, the operation is carried out in the same manner as in the normal state described above.

At the time of interrupt return, the instruction execution unit 5 executes an interrupt return instruction, thereby writing the value of the register EPSR 33 in the register PSR 35. The instruction execution unit 5 reads out the data from the register EPCR 31, and supplies the result as the branch destination address to the instruction read unit 3. The instruction read unit 3 in turn reads out an instruction word in accordance with the branch destination address supplied from the instruction execution unit 5, and supplies the instruction word to the instruction execution unit 5. After that, the operation is performed in the same manner as in the above-described normal state.

FIG. 6 shows a second example of the conventional processor having a general register and a floating point register. This processor has the same structure as the processor of the first example, except that an instruction execution unit 6 further comprises an arithmetic operation instruction execution unit 22, and a register control unit 8 further comprises a condition register 30. In FIG. 6, the same components as in FIG. 1 are denoted by the same reference numerals, and explanations for them are omitted in this description.

When receiving an arithmetic instruction, the arithmetic operation instruction execution unit 22 reads out data from the region in the general register 37 corresponding to an effective address determined based on a value read out from the general register 37, and performs an arithmetic operation based on the read data. The result of the arithmetic operation is then written in the general register 37, as shown in FIG. 7. The arithmetic operation instruction has the same format as the load instruction shown in FIG. 3. When receiving a comparison instruction, the arithmetic operation instruction execution unit 22 compares two values read out from the general register 37. If the two values are equal, the arithmetic operation instruction execution unit 22 writes the data indicating truth in the condition register 30. If the two values are not equal, the arithmetic operation instruction execution unit 22 writes data indicating false in the condition register 30.

FIG. 8 shows a third example of the conventional processor. In FIG. 8, the same components as in FIG. 6 are denoted by the same reference numerals, and explanations for them are omitted in this description. As shown in FIG. 8, this processor comprises the memory 1, an instruction read unit 303 connected to the memory 1, an instruction execution unit 307 connected to the memory 1 and the instruction read unit 303, a register control unit 309 connected to the instruction execution unit 307, and the interrupt control unit 9 connected to the instruction read unit 303, the instruction execution unit 307, and the register control unit 309.

The instruction read unit 303 comprises the instruction read control unit 11, the program counter 13 the instruction word register 15, and an instruction break detector unit 301. The instruction break detector unit 301 is connected to the memory 1 and the instruction execution circuit 23.

The instruction execution unit 307 comprises the instruction decoder unit 17, the load instruction execution unit 19, the store instruction execution unit 21, the arithmetic operation instruction execution unit 22, the instruction execution circuit 23, and a data break detector unit 305. The data break detector unit 305 is connected to the load instruction execution unit 19, the store instruction execution unit 21, and the instruction execution circuit 23.

The interrupt control circuit 40 is connected to the instruction read control unit 11, the program counter 13, the instruction break detector unit 301, the load instruction execution unit 19, the store instruction execution unit 21, the arithmetic operation instruction execution unit 22, the instruction execution circuit 23, and the data break detector unit 305.

When receiving a break point instruction from the instruction decoder unit 17, the instruction execution circuit 23 notifies the interrupt control circuit 40 of the software break. When receiving an instruction break point register read instruction from the instruction decoder unit 17, the instruction execution circuit 23 reads a break point object address from an instruction break point register in the instruction break detector unit 301, and writes the read address in the general register 37. When receiving an instruction break point register write instruction from the instruction decoder unit 17, the instruction execution circuit 23 writes the break point object address corresponding to a value read out from the general register 37 into the instruction break point register in the instruction break detector break detector unit 301.

Likewise, when receiving a data break point register read instruction from the instruction decoder unit 17, the instruction execution circuit 23 reads out a break point object address from a data break point register in the data break detector unit 305, and writes the read address into the general register 37. When receiving a data break point register write instruction from the instruction decoder unit 17, the instruction execution circuit 23 writes the break point object address corresponding to a value read out from the general register 37 into the data break point register in the data break detector unit 305.

FIG. 9 shows the structure of the instruction break detector unit 301. As shown in FIG. 9, the instruction break detector 301 comprises detectors 311 to 314, address fields 315 to 318, E fields 319 to 322, V fields 323 to 326, and an OR circuit 327.

The address fields 315 to 318 each hold a break point object address, and constitute the above-mentioned instruction break point register. The E fields 319 to 322 each holds data that indicates whether or not an instruction break operation is valid. More specifically, when the instruction break operation is invalid, the corresponding one of the E fields 319 to 322 holds the value "0". When the instruction break operation is valid, the corresponding one of the E fields 319 to 322 holds the value "1". The E fields 319 to 322 constitute the above-mentioned instruction break point register. The V fields 323 to 326 each hold data that indicates whether or not an instruction break has been detected. More specifically, if no instruction break has been detected, the corresponding one of the V fields 323 to 326 holds the value "0". If an instruction break has been detected, the corresponding one of the V fields 323 to 326 holds the value "1".

The detectors 311 to 314 each determine whether or not an instruction break is established. More specifically, each of the detectors 311 to 314 compares an instruction address supplied from the memory 1 with an address supplied from the instruction break point register. If the two addresses coincide with each other, the value "1" is written in the corresponding one of the V fields 323 to 326, and a match signal mt is supplied to the OR circuit 327. An interrupt signal is then transmitted form the OR circuit 327 to the interrupt control circuit 40, thereby notifying the interrupt control circuit 40 of the instruction break.

FIG. 10 shows the structure of the data break detector unit 305. As shown in FIG. 10, the data break detector unit 305 also comprises the detectors 311 to 314, the address fields 315 to 318, the E fields 319 to 322, the V fields 323 to 326, and the OR circuit 327.

The address fields 315 to 318 each hold a break point object address, and constitute the above-mentioned data break point register. The E fields 319 to 322 each hold data that indicates whether or not a data break operation is valid. More specifically, if the data break operation is invalid, the corresponding one of the E fields 319 to 322 holds the value "1". If the data break operation is valid, the corresponding one of the E fields 319 to 322 holds the value "0". The E fields 319 to 322 constitute the data break point register. The V fields 323 to 326 each hold data that indicates whether or not a data break has been detected. More specifically, when no data break has been detected, the corresponding one of the V fields 323 to 326 holds the value "0". When a data break has been detected, the corresponding one of the V fields 323 to 326 holds the value "1".

The detectors 311 to 314 each determine whether or not a data break is established. More specifically, the detectors 311 to 314 each compare an effective address (data address of a load store instruction supplied form the memory 1 with a break point object address stored in the corresponding one of the address fields 315 to 318. When the two addresses coincides with each other, "1" is written in the corresponding one of the V fields 323 to 326, and a match signal mt is supplied to the OR circuit 327. By doing so, an interrupt signal is supplied from the OR circuit 327 to the interrupt control circuit 40, thereby notifying the interrupt control circuit 40 of the data break.

FIG. 11 is a flowchart showing a data break interrupt operation of the above processor by an interrupt operation program. As shown in FIG. 11, a context is saved in step S1, and a data break operation is performed in step S2. The context is then restored in step S3, and an interrupt return instruction is executed so as to return from the interrupt operation in step S4. The interrupt operation then comes to an end.

FIG. 12 is a flowchart showing a software break interrupt operation by the interrupt operation program. As shown in FIG. 12, a context is saved in step S1, and a software break operation is performed in step S2. The context is restored in step S3, and an interrupt return instruction is executed so as to return from the interrupt operation in step S4. The interrupt operation then comes to an end.

In the above conventional processors, a control method of simultaneously executing a plurality of instructions, such as a superscalar technique or a speculative execution technique, is employed to improve the performance of the processor, utilizing the parallelism of instruction words that constitute a program. Generally, such a processor comprises a plurality of instruction execution units, and sequentially executes the instructions contained in the program. A plurality of instructions can be read out from the memory in one cycle, and a plurality of instructions can be issued in one cycle, with the dependency among the instructions being taken into account.

In the instruction execution control, an out-of-order completion technique is employed to increase the performance at the instruction level of the processor. Here, the "out-of-order completion" indicates that the issuance order of instructions on the program differs from the instruction execution order, i.e., the instruction completion order. By performing such an execution control operation, the effective availability of the instruction execution unit is increased, and the entire execution time of the program is shortened. To ensure the instruction order at the time of the generation of the program, the data dependency relationship or the control dependency relationship needs to be taken into consideration. The information on the dependency relationship is extracted from the information written in the instruction words.

In a load operation performed on the memory 1, data is read out from the memory 1, and the result is written in the register in the processor. After that, a series of operations depending on the read data are started. Accordingly, a load operation from the memory 1 is started so as to reduce adverse influence onto the operation of the entire processor from a delay of access to the memory 1 caused by cache miss or the like.

From the above reasons, when a program is generated, a load instruction may be placed in a further front position in the program so as to start the load operation in an earlier stage. In this arrangement, the same effects as obtained by moving the load instruction on the program can be obtained. If the load operation is executed prior to the store operation in the memory 1, data processing is performed in the same execution sequence as long as the address regions of the data in both operations do not overlap with each other. However, even if the address regions only partially overlap with each other, there will be a difference in the data process results.

More specifically, when the load operation is performed prior to the store operation, the previous data stored prior to the store operation is read out by the load operation, through the store data stored in the memory 1 by the store operation should be read out by the load operation. With the change in the execution sequence, the data processing operation changes accordingly. This problem is known as the problem of ambiguous memory reference. In the prior art, to avoid this problem, a load operation cannot be performed on the memory 1 prior to a store operation on the memory 1.

Meanwhile, a technique of moving instructions beyond the boundaries between basic blocks by a compiler is known as the wide area instruction movement technique. Further, instruction movement beyond condition branching in the wide area instruction movement is known as the speculative instruction movement technique. However, when an exception occurs with a speculatively moved instruction, the ability to perform an exception operation drastically deteriorates, or an unexpected break occurs in the program execution despite the originally programmed sequence.

For instance, when an instruction that has a possibility of causing a page fault with necessary data missing from the memory is speculatively moved, an exception operation program that causes a page fault at the movement destination is executed, resulting in a drop in the operation ability. If a division instruction is speculatively moved, a zero division operation might be carried out at the movement destination, but the execution of the program is stopped in such a case. An exception caused by the execution of a speculatively moved instruction is called a "speculative exception".

As a means to solve the above problems, a method of delaying the occurrence of a speculative exception using a non-exception instruction is known. A non-exception method in which a speculative exception operation is delayed is mentioned in the reference "A VLIW Architecture for a Trace Scheduling Compiler, Proceedings of the 2nd International Conference on Architectural Support for Programming Languages and Operating Systems, pp. 180–192, 1987 (B. P. Colwel, B. P. Nix, J. J. O'Donnel, D. B. Papworth, and P. K. Rodman)". Meanwhile, a method of scheduling the restart of execution from a speculative exception is mentioned in the reference "Sentinel Scheduling for VLIW and Superscalar Processor, Proceedings of the Fifth International Conference on Architectural Support for Programming Languages and Operating Systems, pp. 238–247, 1992 (S. A. Mahlke, W. Y. Chen, W. W. Hwu, B. R. Rau, and M. S. Schlansker)".

There are two types of exceptions: one is an exception with which the main operation can be continued by canceling the exception factor, like a page fault; and the other one is an exception with which the main operation cannot be continued, like a zero division operation. In the data processing operation using the non-exception instruction, each exception is detected as a speculative exception, and executed after a predetermined period of time.

However, since an exception operation that can be continued and the following main operation are performed by executing an interrupt operation program, the program becomes too long as a whole. As a result, the capacity required for the processor becomes too large, and the operation speed drops accordingly.

Furthermore, when a program including the non-exception instruction is being debugged, there is another problem that the execution of the program is interrupted by a data break with an instruction not ensured in the original execution sequence among speculatively moved instructions.

SUMMARY OF THE INVENTION

A general object of the present invention is to provide processors and methods of controlling the processor in which the above disadvantages are eliminated.

A more specific object of the present invention is to provide a processor that performs a load operation prior to a store operation while avoiding ambiguous memory reference, and thus provides ambiguous memory reference. Thus, a high-speed operation can be realized.

Another specific object of the present invention is to provide a processor that has higher data processing ability and higher operation reliability.

The above objects of the present invention are achieved by a method of controlling a processor that changes an execution sequence of instructions contained in a program, the method comprising the steps of: executing a second instruction that is placed after a first instruction in the program, prior to execution of the first instruction; and, when an address of first data to be executed by the first instruction is included in an address region of second data to be processed by the second instruction, overwriting an execution result of the first instruction on data corresponding to the address of the first data.

According to this method, disorder in data processing due to a change to the execution sequence of the instructions can be corrected.

The above objects of the present invention are also achieved by a processor that executes instructions arranged in a program, the processor comprising:

a storage destination memory unit that stores a storage designation of a result obtained by executing a second instruction prior to the execution of a first instruction, the second instruction being placed after the first instruction in the program;

a judgment unit that determines whether or not an address of first data to be processed by the first instruction is included in an address region of second data to be processed by the second instruction; and a data restoration unit that overwrites a result obtained by executing the first instruction on the second data corresponding to the address of the first data at the storage destination stored in the storage destination memory unit, when the judgment unit determines that the address of the first data is included in the address region of the second data.

The above objects of the present invention are also achieved by a method of controlling a processor that controls execution of programmed instructions arranged in a program, the method comprising the steps of:

executing an instruction prior to the execution of a branch instruction, the instruction being placed after the branch instruction in the program;

retaining an exception operation when the necessity of the exception operation is detected in the step of executing;

performing the exception operation when the retained exception operation is needed in execution of an instruction at a branch destination selected through the execution of the branch instruction; and returning to the program so as to continue the execution of the instruction at the branch destination when the exception operation is completed.

According to this method, when the exception operation is finished, the main operation returns to the program and sequentially executes the instructions starting from the instruction next to the instruction that has required the exception operation. Thus, a high-speed operation can be realized.

The above objects of the present invention are also achieved by a method of controlling a processor that controls execution of instructions arranged in a program, the method comprising the steps of:

executing an instruction prior to the execution of a branch instruction, the instruction being placed after the branch instruction in the program;

retaining an exception operation when an exception start instruction that requires the exception operation is detected in the step of executing;

performing the exception operation when the retained exception operation is required in the execution of an instruction at a branch destination selected through the execution of the branch instruction; and returning to the program so as to sequentially execute the instructions starting from the exception start instruction, when the exception operation is finished.

According to this method, when the exception operation is finished, the main operation returns to the program and sequentially executes the instructions, starting from the exception start instruction. Thus, the operation speed can be further increased.

The above objects of the present invention are also achieved by a processor that executes instructions arranged in a program, the processor comprising:

a control unit that controls an execution sequence so that an instruction placed after a branch instruction in the program is executed prior to the execution of the branch instruction;

an exception inhibiting unit that retains an exception operation when necessity of the exception operation is detected during the execution of the instruction placed after the branch instruction;

an exception operation unit that performs the exception operation when the exception operation retained by the exception inhibiting unit is needed in the execution of an instruction at a branch destination selected through execution of the branch instruction; and a return unit that returns to the program when the exception operation is finished, and continues the execution of the instruction at the branch destination.

The above objects of the present invention are also achieved by a processor that executes instructions in a program, the processor comprising:

a control unit that controls an execution sequence so that an instruction placed after a branch instruction in the program is executed prior to the execution of the branch instruction;

an exception inhibiting unit that retains an exception operation when an exception start instruction that requires the exception operation is detected during the execution of the instruction placed after the branch instruction;

an exception operation unit that performs the exception operation when the exception operation retained by the exception inhibiting unit is needed in the execution of an instruction at a branch destination selected through the execution of the branch instruction; and a return unit that returns to the program when the exception operation is finished, and sequentially executes the instructions starting from the exception start instruction.

The above objects of the present invention are also achieved by a method of controlling execution of instructions in a program, the method comprising the steps of:

executing an instruction prior to the execution of a branch instruction, the instruction being placed after the branch instruction in the program;

retaining a break operation when the necessity to suspend the execution of the program is detected in the step of executing the instruction; and performing the break operation when the retained break operation is required in the execution of an instruction at a branch destination selected through the execution of the branch instruction.

According to this method, the unnecessary break due to the advance execution of the instruction placed after the branch instruction is avoided. Thus, the instructions can be surely executed in the programmed execution order.

The above objects of the present invention are also achieved by a processor that executes instructions in a program, the processor comprising:

an exception inhibiting unit that retains a break operation when the necessity of suspending the execution of the program is detected in the execution of a predetermined instruction prior to the execution of a branch instruction, the predetermined instruction being placed after the branch instruction in the program; and a break operation unit that performs the break operation when the break operation retained by the exception inhibiting unit is required in the execution of an instruction at a branch destination selected through the execution of the branch instruction.

The above and other objects and features of the present invention will become more apparent from the following description taken in conjunction with the accompanying drawings.

BRIEF DESCRIPTION OF THE DRAWINGS

FIG. 3 shows the format of the load instruction;

FIG. 5 shows the format of the store instruction;

FIG. 16 shows the format of the speculative load instruction;

FIG. 18 shows the format of the interference recovery store instruction;

FIG. 20 shows the format of the speculative load operation history nullifying instruction;

FIG. 28 shows the format of the interference recovery exception store instruction;

FIG. 34 shows the format of the interference recovery branching store instruction;

FIG. 62 shows the structure of an exception inhibiting load instruction table of the thirteenth embodiment of the present invention;

FIG. 63 shows the structure of a commit point table in accordance with the thirteenth embodiment of the present invention;

FIG. 64 shows the structure of a commit break point table in accordance with the thirteenth embodiment of the present invention;

FIG. 65 shows the structure of an exception inhibiting data break history table in accordance with the thirteenth embodiment of the present invention;

FIG. 75 shows the structure of an exception inhibiting data break history table in accordance with the sixteenth embodiment of the present invention.

DESCRIPTION OF THE PREFERRED EMBODIMENTS

Figure 1:
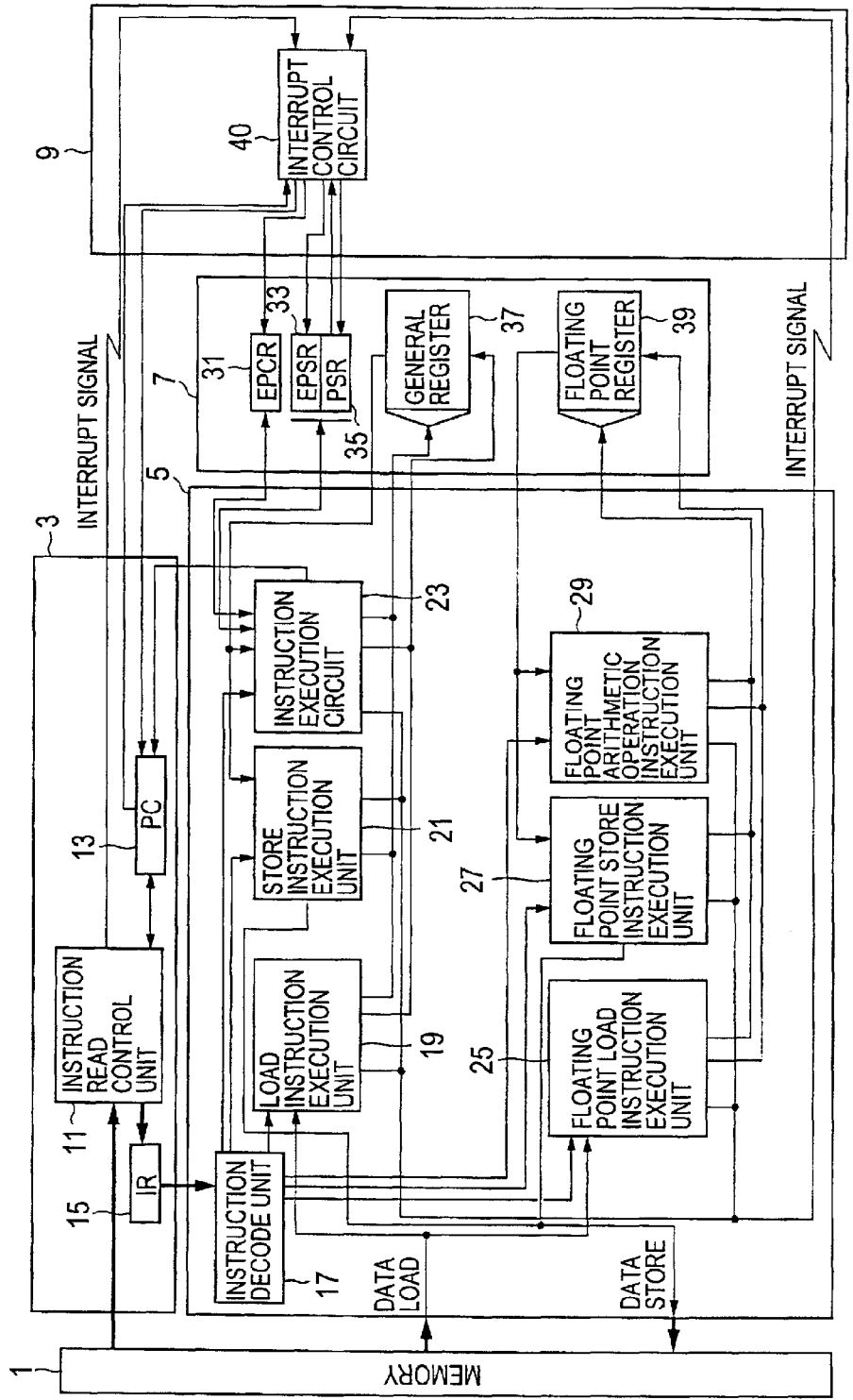
FIG. 1 shows a first example a conventional processor having a general register and a floating point register.
Figure 2:
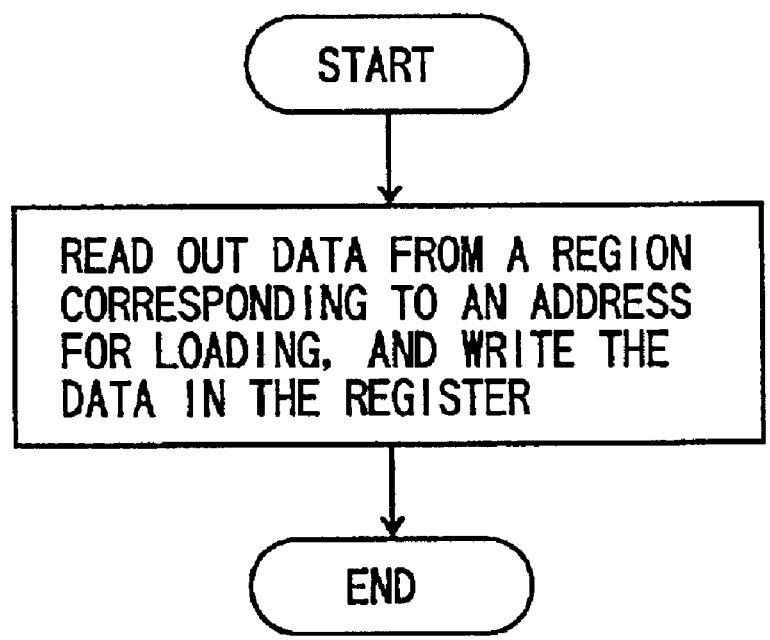
FIG. 2 is a flowchart showing an operation in accordance with a load instruction.
Figure 4:
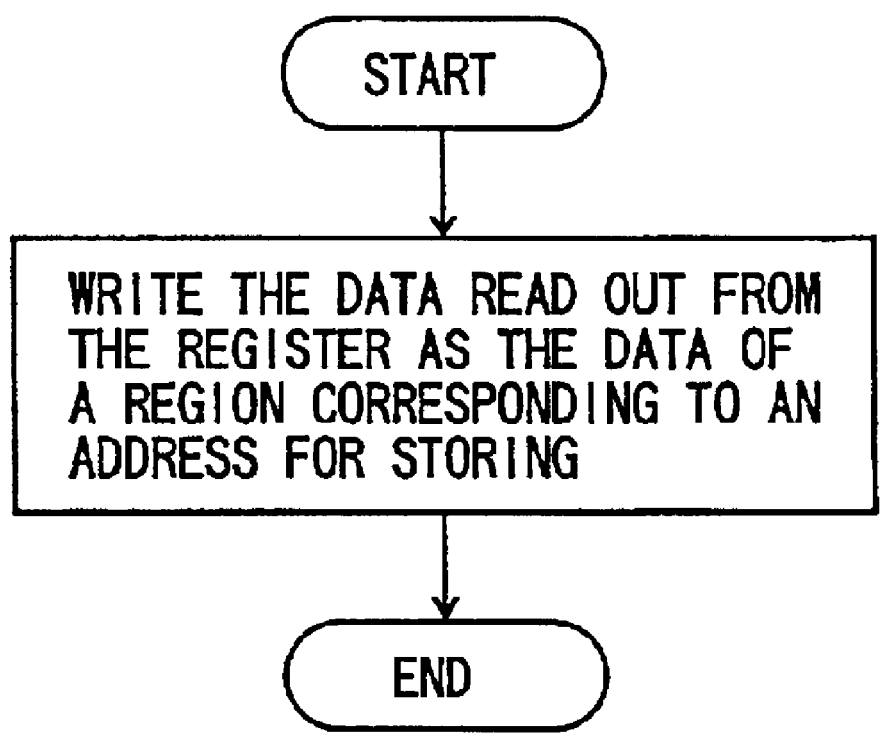
FIG. 4 is a flowchart showing an operation in accordance with a store instruction.

The following is a description of embodiments of the present invention, with reference to the accompanying drawings. In the drawings, the same components are denoted by the same reference numerals.

A processor of the present invention executes a programmed instruction

[First Embodiment]

Figure 13:
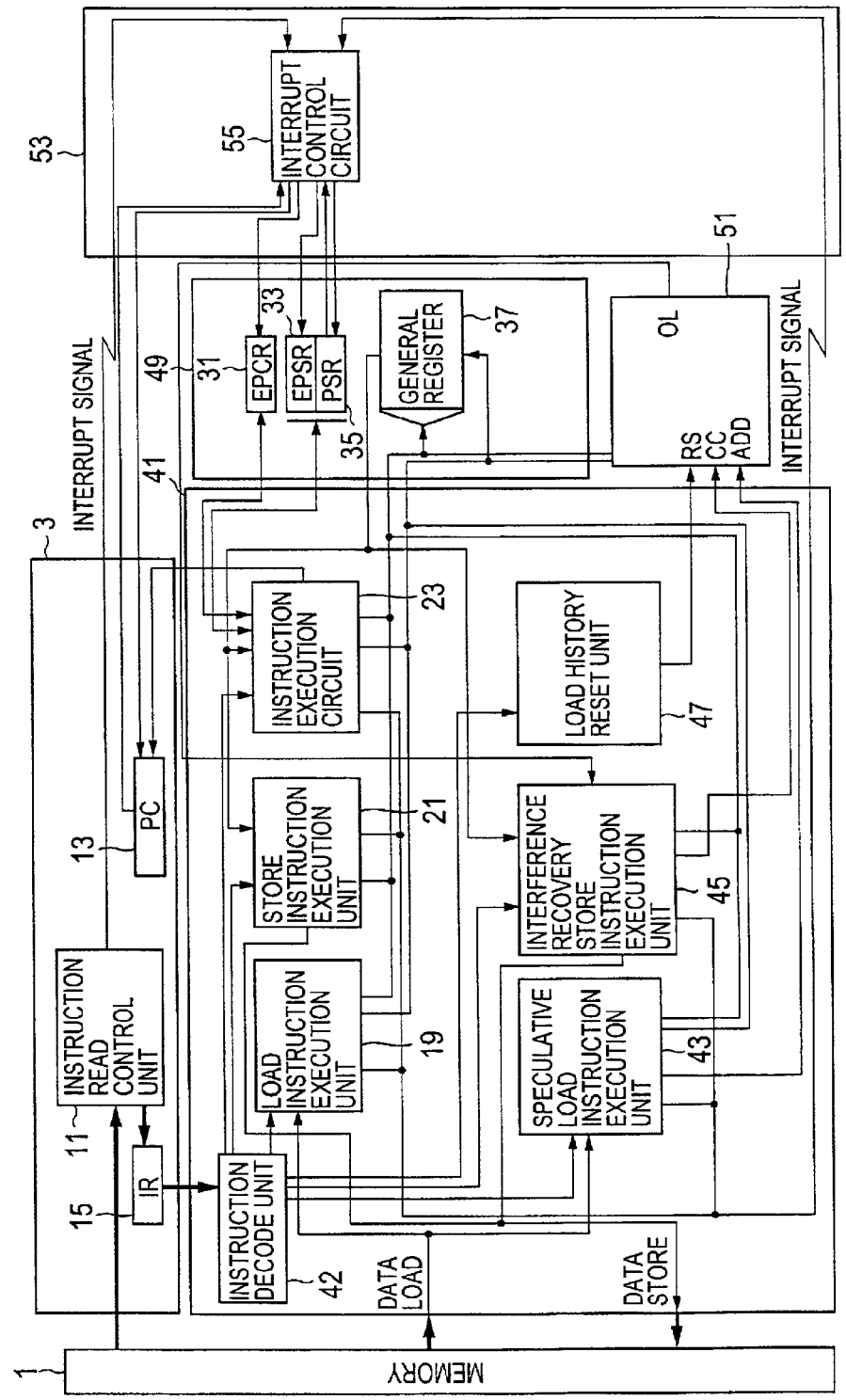
FIG. 13 shows the structure of a processor in accordance with a first embodiment of the present invention.

FIG. 13 shows the structure of a processor in accordance with a first embodiment of the present invention. As shown in FIG. 13, the processor of this embodiment is the same as the conventional processor shown in FIG. 1, except that the processor of this embodiment further comprises a history control unit 51, and an instruction execution unit 41 comprises a speculative load instruction execution unit 43, an interference recovery store instruction execution unit 45, and a load history reset unit 47.

The input terminal of the speculative load instruction execution unit 43 is connected to a decoder unit 42 and a memory unit 1. The output terminal of the speculative load instruction execution unit 43 is connected to the general register 37, a speculative load operating history control unit 51, and an interrupt control circuit 55. The input terminal of the interference recovery store instruction execution unit 45 is connected to the decoder unit 42, the general register 37, and the history control unit 51. The output of the interference recovery store instruction execution unit 45 is connected to the memory 1, the general register 37, the history control unit 51, and the interrupt control circuit 55. The input terminal of the load history reset unit 47 is connected to the decoder unit 42, while the output terminal is connected to the history control unit 51.

Figure 15:
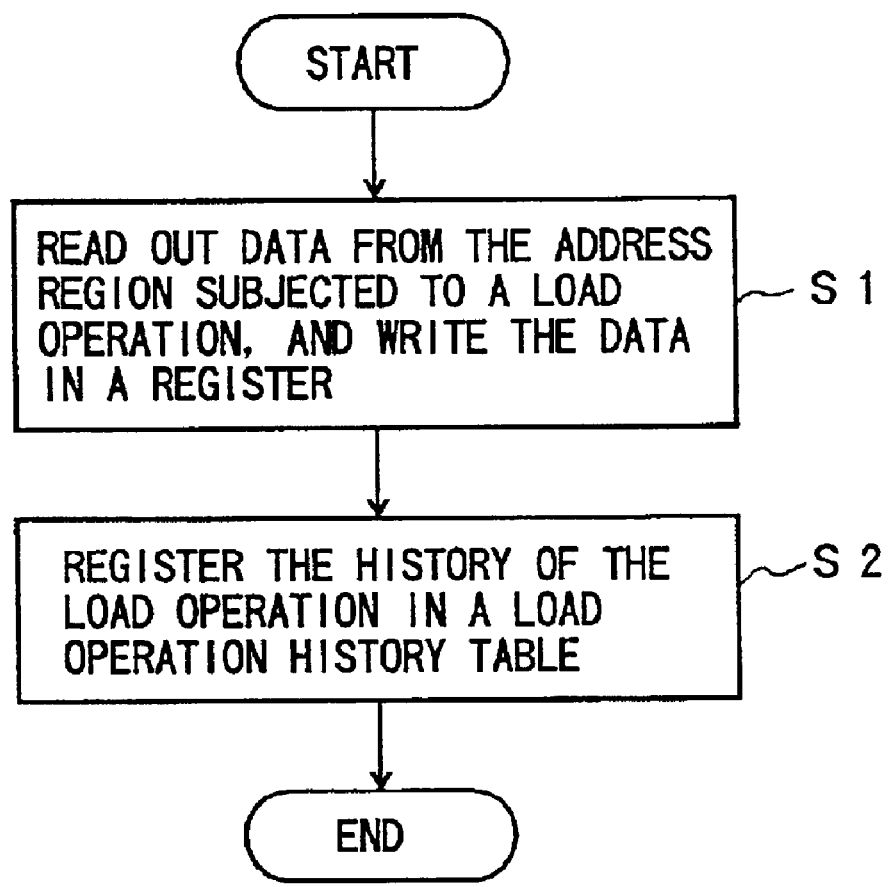
FIG. 15 is a flowchart showing an operation in accordance with a speculative load instruction.

FIG. 15 is a flowchart of an operation performed in accordance with a speculative load instruction. When the speculative load instruction execution unit 43 receive a speculative load instruction from the decode unit 42, the speculative load instruction execution unit 43 determines an effective address from a value read out from the general register 37. As shown in FIG. 15, the speculative load instruction execution unit 43 reads out data from the region in the memory 1 corresponding to the effective address, and then writes the data in the general register 37 in step S1. In step S2, the speculative load instruction execution unit 43 supplies the history control unit 51 with a registration signal ADD for registering the execution of the speculative load instruction, and the history control unit 51 registers the history of load operations in a load operation history table in step S2. As shown in FIG. 16, the format of the speculative load instruction is the same as the format of the load instruction shown in FIG. 3. In a case where the speculative load instruction execution unit 43 detects an interrupt when executing the speculative load instruction, the speculative load instruction execution unit 43 supplies an interrupt signal to the interrupt control circuit 55.

Figure 17:
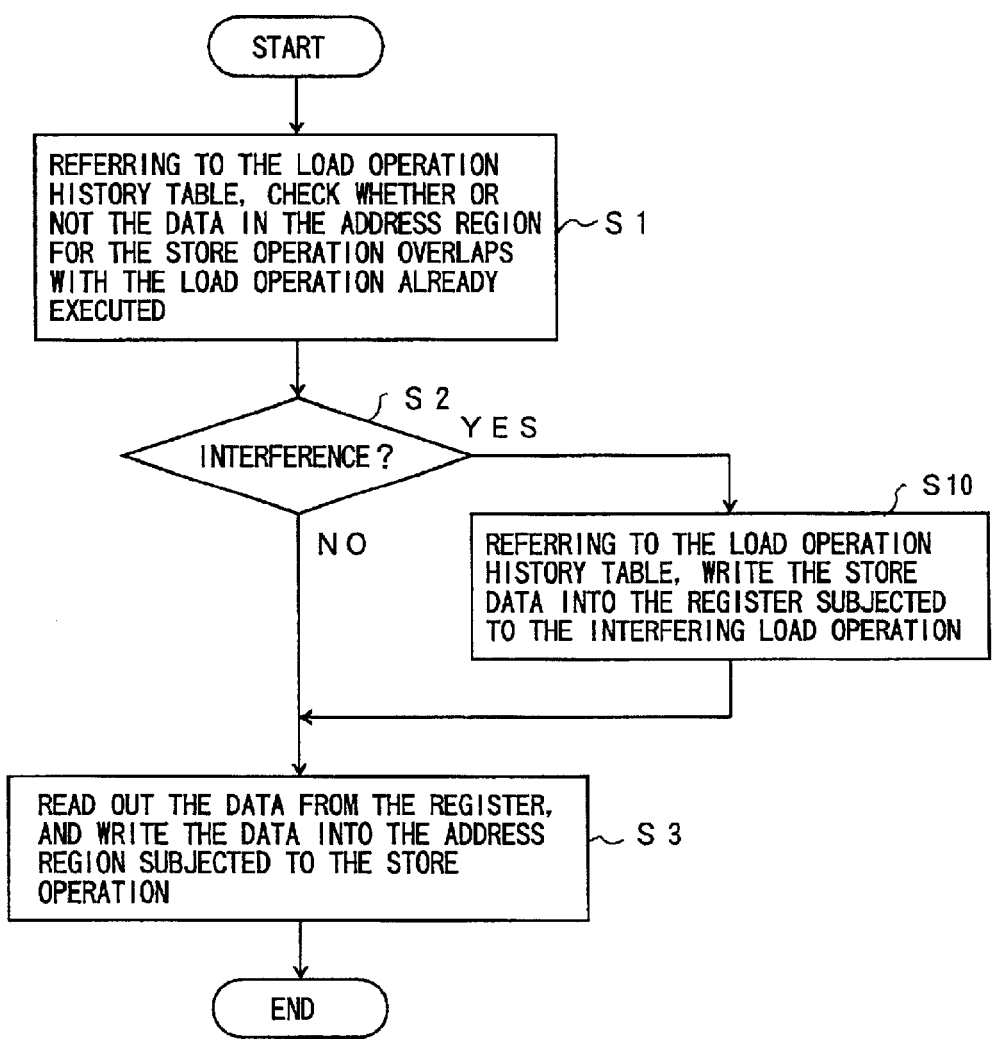
FIG. 17 is a flowchart showing an operation in accordance with an interference recovery store instruction.

FIG. 17 is a flowchart showing an operation performed in accordance with an interference recovery store instruction.

When the interference recovery store instruction execution unit 45 receives an interference recovery store instruction from the decoder unit 42, the interference recovery store instruction execution unit 45 determines an effective address from a value read out from the general register 37, and, at the same time, supplies a confirmation signal CC to the history control unit 51. In step S1, the history control unit 51 checks whether or not the two address regions for speculative load operations registered in the store operation history table and the speculative load operation history table interfere (or overlap) with each other.

In step S2, it is determined whether or not the above interference exists. If there is no interference, the operation moves on to step S3 in which the interference recovery store instruction execution unit 45 writes data read out from the general register 37 in the region in the memory 1 corresponding to the effective address. If it is determined that the two address regions interfere with each other, the operation moves on to step S10 in which the interference recovery store instruction execution unit 4 refers to the load operation history table, and rewrites store data in a load register designated as a store destination by the speculative load operation. After that, the operation moves on to step S3, in which the interference recovery store instruction execution unit 45 writes data read out from the general register 37 into the region in the memory 1 corresponding to the effective address.

As shown in FIG. 18, the format of the instruction is the same as the format of the store instruction shown in FIG. 5. If the interference recovery store instruction execution unit 45 detects an interrupt when executing the interference recovery store instruction, the interference recovery store instruction execution unit 45 supplies an interrupt signal to the interrupt control circuit 55.

Figure 19:
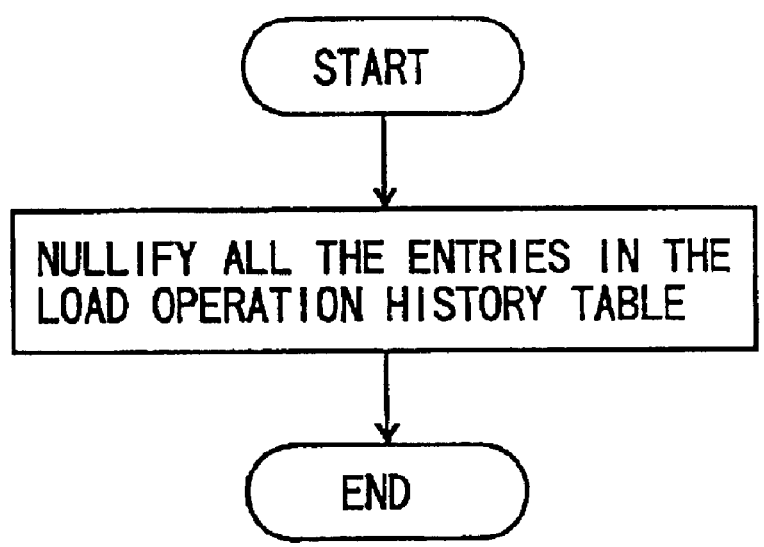
FIG. 19 is a flowchart showing an operation in accordance with a speculative load operation history nullifying instruction.
Figure 20:
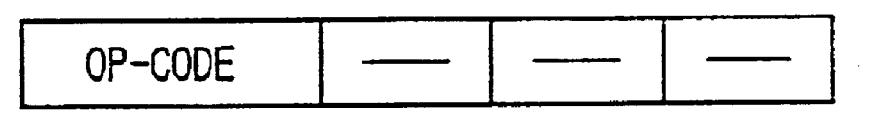

FIG. 19 is a flowchart showing an operation performed in accordance with a speculative load operation history nullifying instruction. As shown in FIG. 19, when the load history reset unit 47 receives the speculative load operation history nullifying instruction from the decoder unit 42, the load history reset unit 47 supplies reset signal RS to the history control unit 51, thereby nullifying all the entries in the speculative load operation history table. As shown in FIG. 20, the format of the speculative load operation history nullifying instruction is made up of only an instruction code OP-CODE.

Figure 14:
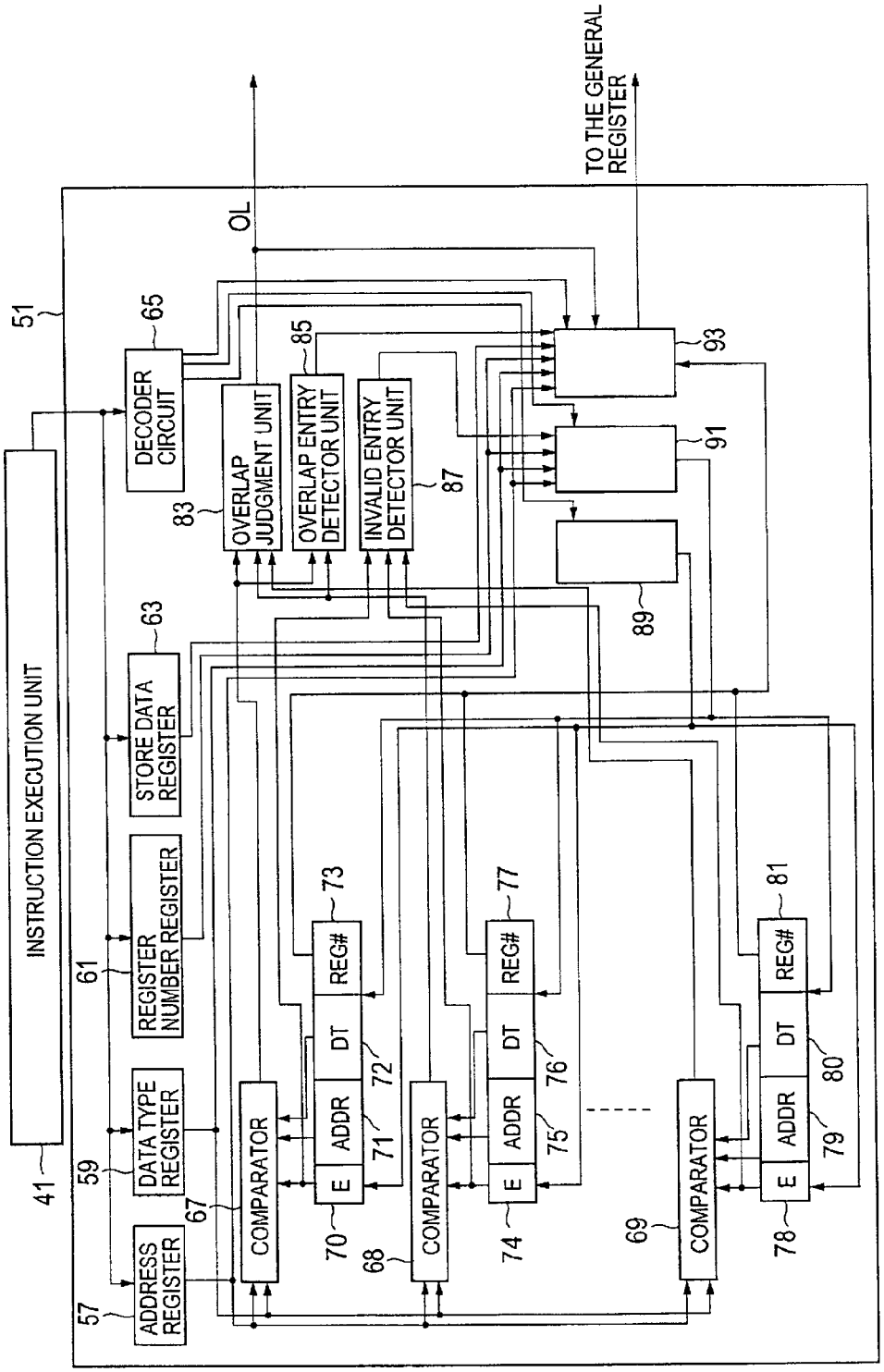
FIG. 14 shows the structure of a history control unit shown in FIG. 13.

FIG. 14 shows the structure of the history control unit 51 shown in FIG. 13. As shown in FIG. 14, the history control unit 51 comprises an address register 57, a data type register 59, a register number register 61, a store data register 63, a decoder circuit 65, comparators 67 to 69, E fields 70, 74, and 78, address fields 71, 75, and 79, data type fields 72, 76, and 80, register number fields 73, 77, and 81, an overlap judgment unit 83, an overlap entry detector unit 85, an invalid entry detector unit 87, a speculative load operation history reset control unit 89, a speculative load operation history registration control unit 91, and a speculative load operation history interference confirmation control unit 93.

As shown in FIG. 14, the instruction execution unit 41 is connected to the address register 57, the data type register 59, the register number register 61, the store data register 63, and the decoder circuit 65. The address register 57 holds an effective address used for executing the speculative load instruction or the interference recovery store instruction. The data type register 59 holds an identification value that represents the size of data to be loaded or stored in the execution of the speculative load instruction or the interference recovery store instruction. The register number register 61 holds the register number of a register to be loaded or stored in the execution of the speculative load instruction or the interference recovery store instruction.

The store data register 63 holds a write value (store data) in accordance with the interference recovery store instruction. The decoder circuit 65 analyzes a signal supplied from the instruction execution unit 41, and activates the corresponding control unit. More specifically, when the registration signal ADD is supplied, the store data register 63 activates the speculative load operation history registration control unit 91. When the confirmation signal CC is supplied, the store data register 63 activates the speculative load operation history interference confirmation control unit 93. When the reset signal RS is supplied, the store data register 63 activates the speculative load operation history reset control unit 89.

Meanwhile, the comparators 67 to 69 are connected to the entries corresponding to the address register 57 and the data type register 59. Here, the speculative load operation history table is made up of a plurality of entries. Each of the entries includes the E fields 70, 74, and 78 that represent effectiveness, the address fields 71, 75, and 79 that represent the effective addresses of registered speculative load operations, the data type fields 72, 76, and 80 that represent the type of data subjected to registered speculative load operations, and the register number fields 73, 77, and 81 that represent the register number of registered to be loaded in the registered speculative load operations. In the data type fields 72, 76, and 80, identification values corresponding to the type of data are recorded. The identification value for an unsigned byte is 0; the identification value for a signed byte is 1; the identification value for an unsigned half word is 2; the identification value for a signed half word 3; the identification value for a word is 4; the identification value for a double word is 5; and the identification value for a quad word is 6.

The comparators 67 to 69 compare the address region of load data determined by the address fields 71, 75, and 79, and the data type fields 72, 76, and 80, with the address region of store data determined by the address register 57 and the data type register 59, and each output a signal indicating whether or not the two address regions interfere (overlap) with each other.

The overlap judgment unit 83 is connected to the comparators 67 to 69. In accordance with signals supplied from the comparators 67 to 69, the overlap judgment unit 83 determines whether or not the address region for the speculative load operation registered as the speculative load operation history overlaps with the address region for the store operation in accordance with the interference recovery store instruction. If the two address regions overlap with each other, the overlap judgment unit 83 outputs an overlap signal OL. The overlap entry detector unit 85 is connected to the comparators 67 to 69, and, in accordance with the signals supplied from the comparators 67 to 69, the overlap entry detector unit 85 detects the numbers of entries that are subjected to the speculative load operation and interfere with each other.

In accordance with the information of the E fields 70, 74, and 78 of each entry, the invalid entry detector unit 87 detects a dead entry (invalid entry) in the speculative load operation. The speculative load operation history reset control unit 89 is connected to the decoder circuit 65, thereby resetting the E fields 70, 74, and 78 of each entry to 0.

The speculative load operation history registration control unit 91 is connected to the address register 57, the data type register 59, the register number register 61, the decoder circuit 65, and the invalid entry detector unit 87. In accordance with a supplied registration signal ADD, the speculative load operation history registration control unit 91 writes the information corresponding to the speculative load operations in the address fields 71, 75, and 79, the data type fields 72, 76, and 80, and the register number fields 73, 77, and 81 of the dead entries detected by the invalid entry detector unit 87. Here, the value "1" indicating validity is written in each of the E fields 70, 74, and 78 of the entries in which the information has been written.

The speculative load operation history interference confirmation control unit 93 is connected to the address register 57, the data type register 59, the register number register 61, the store data register 63, the overlap judgment unit 83, the overlap entry detector unit detector unit 85, the decoder circuit 65, and the general register 37. The information of the register number fields 73, 77, and 81 is supplied to the speculative load operation history interference confirmation control unit 93. In a case where the overlap judgment unit 83 determines that there is an overlap, the speculative load operation history interference confirmation control unit 93 writes a write value (store data) by a store operation in the register in which the data is stored. The value written in the register is a value obtained by performing a sign extension process or a zero extension process on the store data, based on the information in the data type fields 72, 76, and 80.

Next, the operation of the above process will be summarized. In the initial stage, a normal operation is performed. In the normal operation, the instruction read unit 3 reads an instruction word indicated by the program counter 13, and then supplies the instruction word to the instruction execution unit 41. The instruction execution unit 41 in turn executes the supplies instruction. However, if the instruction execution unit 41 receives a speculative load instruction, the instruction execution unit 41 additionally registers the history of the load operation in the history control unit 51.

In a case where an interference recovery store instruction is supplied, the address of data subjected to the store operation is checked whether or not to interfere with the address region of the data already subjected to the previous speculative load operation and registered in the history control unit 51. If there is interference, the store data is written in the register in which the interfering data is already stored, thereby restoring the data from the disorder caused by the interference. In the normal operation, the above operation is repeated.

In a case where an interrupt occurs, in accordance with an interrupt signal supplied from the instruction read unit 3 or the instruction execution unit 41, the interrupt control circuit 55 writes the address of an instruction word that is the return destination from the interrupt, in the register 31, also writes the pre-interrupt operation state in the register 33, and further writes the operation state corresponding to the interrupt in the register 35. Also, the branch destination address corresponding to the interrupt is supplied to the program counter 13. Here, the instruction read unit 3 reads an instruction word from the memory 1 in accordance with the supplied branch destination address, and then supplies the instruction word to the instruction execution unit 41. After that, the operation is continued in the same manner as in the above-described normal operation.

When performing interrupt return, the instruction execution unit 41 executes an interrupt return instruction, thereby writing the value from the register 33 into the register 53. The instruction execution unit 41 also reads out the value from register 31 and supplies the value as the branch destination address to the instruction read unit 3. Here, the instruction read unit 3 reads out an instruction word from the memory 1 in accordance with the supplied branch destination address, and supplies the instruction word to the instruction execution unit 41. After that, the operation is continued in the same manner as in the normal operation.

In accordance with the above-described first embodiment of the present invention, when the address region of data subjected to an operation in accordance with a speculative load instruction previously executed overlaps with the address region of data subjected to an operation in accordance with an interference recovery store instruction executed later, store data is written over the interfering data, so that ambiguous reference to the memory can be avoided in the execution of the load operation prior to the store operation. Thus, a precise and high-speed operation can be performed.

[Second Embodiment]

Figure 21:
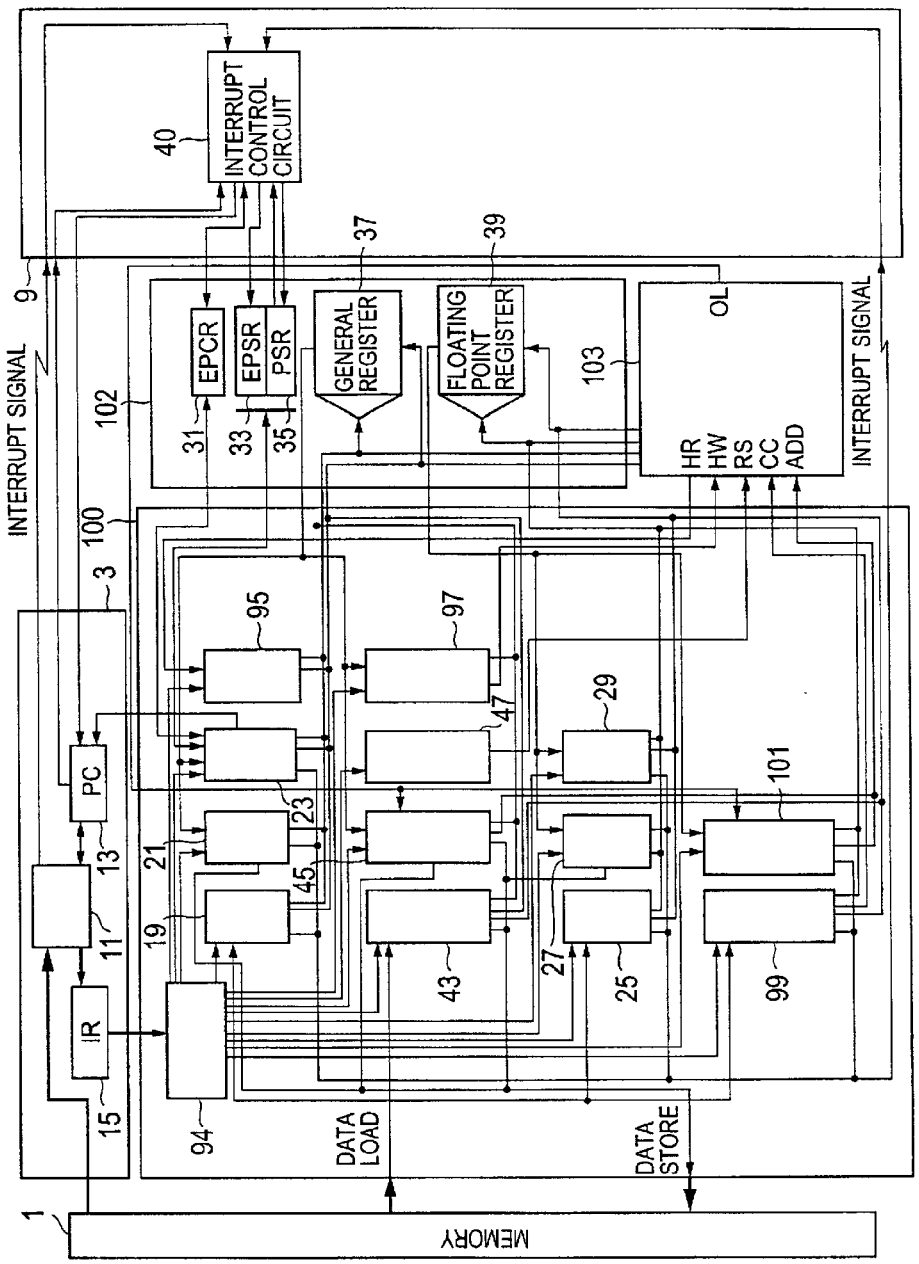
FIG. 21 shows the structure of a processor in accordance with a second embodiment of the present invention.

FIG. 21 shows the structure of a processor in accordance with a second embodiment of the present invention. As shown in FIG. 21, the processor of the second embodiment has the same structure as the processor of the first embodiment shown in FIG. 13, except that the instruction execution unit 41 further comprises a speculative load operation history read instruction execution unit 95 and a speculative load operation history write instruction execution unit 97, and a history control unit 103 has a different structure from the history control unit 51. The processor of this embodiment also differs from the first embodiment in that the instruction execution unit 41 comprises a floating point load instruction execution unit 25, a floating point store instruction execution unit 27, and a floating point calculation instruction execution unit 29, which are accompanied by a speculative floating point load instruction execution unit 99 and an interference recovery floating point store instruction execution unit 101.

Here, the speculative load operation history read instruction execution unit 95 is connected to the instruction decoder unit 94, the general register 37, and the history control unit 013. The speculative load operation history write instruction execution unit 97 is connected to the general register 37 and the history control unit 103. The speculative floating point load instruction execution unit 99 and the interference recovery floating point store instruction execution unit 101 are connected to the instruction decoder unit 94, the floating point load instruction execution unit 25, the floating point register 39, the interrupt control circuit 40, and the history control unit 103.

Figure 22:
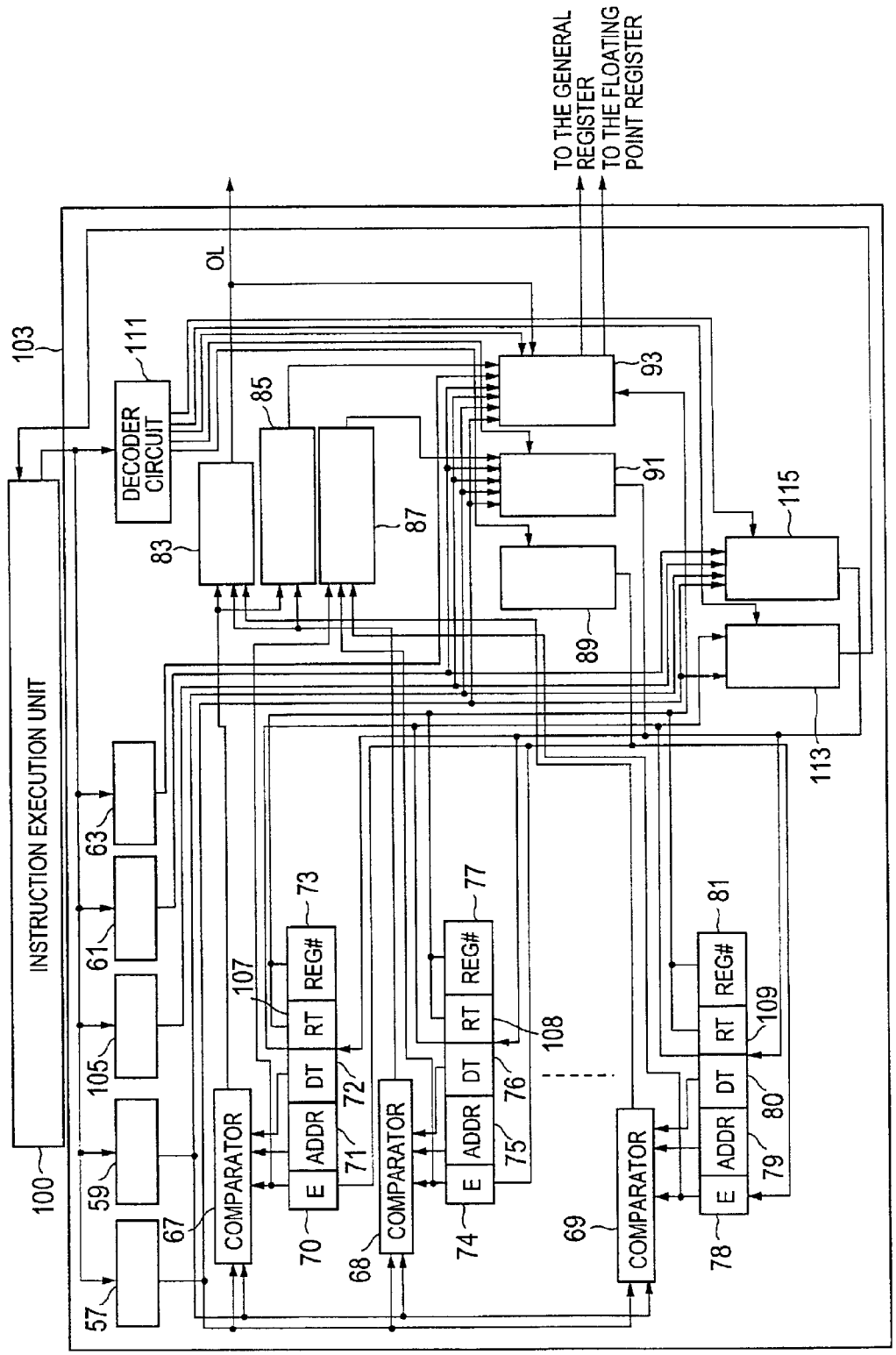
FIG. 22 shows the structure of a history control unit shown in FIG. 21.

FIG. 22 shows the structure of the history control unit 103 shown in FIG. 21. As shown in FIG. 22, the history control unit 103 has the same structure as the history control unit 51 shown in FIG. 14, except that the history control unit 103 further comprises a register type register 105, a speculative load operation history read instruction execution unit 113, and a speculative load operation history write instruction execution unit 115. Here, each entry includes register type fields 107 to 109 that represent the types of registers.

The register type register 105 is connected to an instruction execution unit 100. The speculative load operation history read instruction execution unit 113 is connected to the address register 57, each of the entries, a decoder circuit 111, and the instruction execution unit 100. The speculative load operation history write instruction execution unit 115 is connected to the address register 57, the data type register 59, the register type register 105, the register number register 61, the decoder circuit 11, and each of the entries.

In the above structure, when receiving a speculative load operation history read instruction from the instruction decoder unit 94, the speculative load operation history read instruction execution unit 95 supplies a history read signal HR to the history control unit 103, and then writes the read history of the speculative load operation into the general register 37. When receiving a speculative load operation history write instruction from the instruction decoder unit 94, the speculative load operation history read instruction execution unit 95 supplies the data read out from the general register 37, as well as a history write signal HW, to the history control unit 103.

Based on a registration signal ADD supplied from the speculative load instruction execution unit 43 or the speculative floating point load instruction execution unit 99, the history control unit 103 registers the speculative load operation in the speculative load operation history table. In accordance with a confirmation signal CC supplied from the interference recovery store instruction execution unit 45 and the interference recovery floating point store instruction execution unit 101, the history control unit 103 checks whether or not the store operation by an interference recovery store instruction or an interference recovery floating point store instruction interferes with the address region for the operation in the speculative load operation registered in the speculative load operation history table. If the address regions interferes with each other, a write value (store data) obtained from the execution of the interference recovery store instruction or the interference recovery floating point store instruction is written as the load destination of a next speculative load operation over the interfering data in the register.

In accordance with the history read signal HR supplied from the speculative load operation history read instruction execution unit 95, the speculative load operation history read instruction execution unit 113 reads out the history of the speculative load operation from the load operation history table, and supplies the history of the speculative load operation to the speculative load operation history read instruction execution unit 95. Furthermore, in accordance with the history write signal HW supplied from the speculative load operation history write instruction execution unit 97, the speculative load operation history write instruction execution unit 115 writes the data supplied from the speculative load operation history write instruction execution unit 97 into the speculative load operation history table.

The register type register 105 shown in FIG. 22 holds identification values for identifying registers to be operated in the execution of the instructions, i.e., the speculative load instruction, the interference recovery store instruction, the speculative floating point load instruction, and the interference recovery floating point store instruction. The identification value for a general register is 0, while the identification value for a floating point register is 1. The register type fields 107 to 109 holds setting values that represent the types of registers subjected to the speculative load operation.

With the processor of the second embodiment described above, the same effects as in the first embodiment can be obtained, and the speculative load operation history table can be arbitrarily rewritten. Thus, context switching can be easily carried out.

Also, by holding the information representing the types of registers as a history, a preceding operation for the general register can be distinguished from an operation for the floating point register 39. Thus, ambiguous reference to the memory can be avoided in the data processing in both registers, and a precise and high-speed operation can be performed.

[Third Embodiment]

Figure 23:
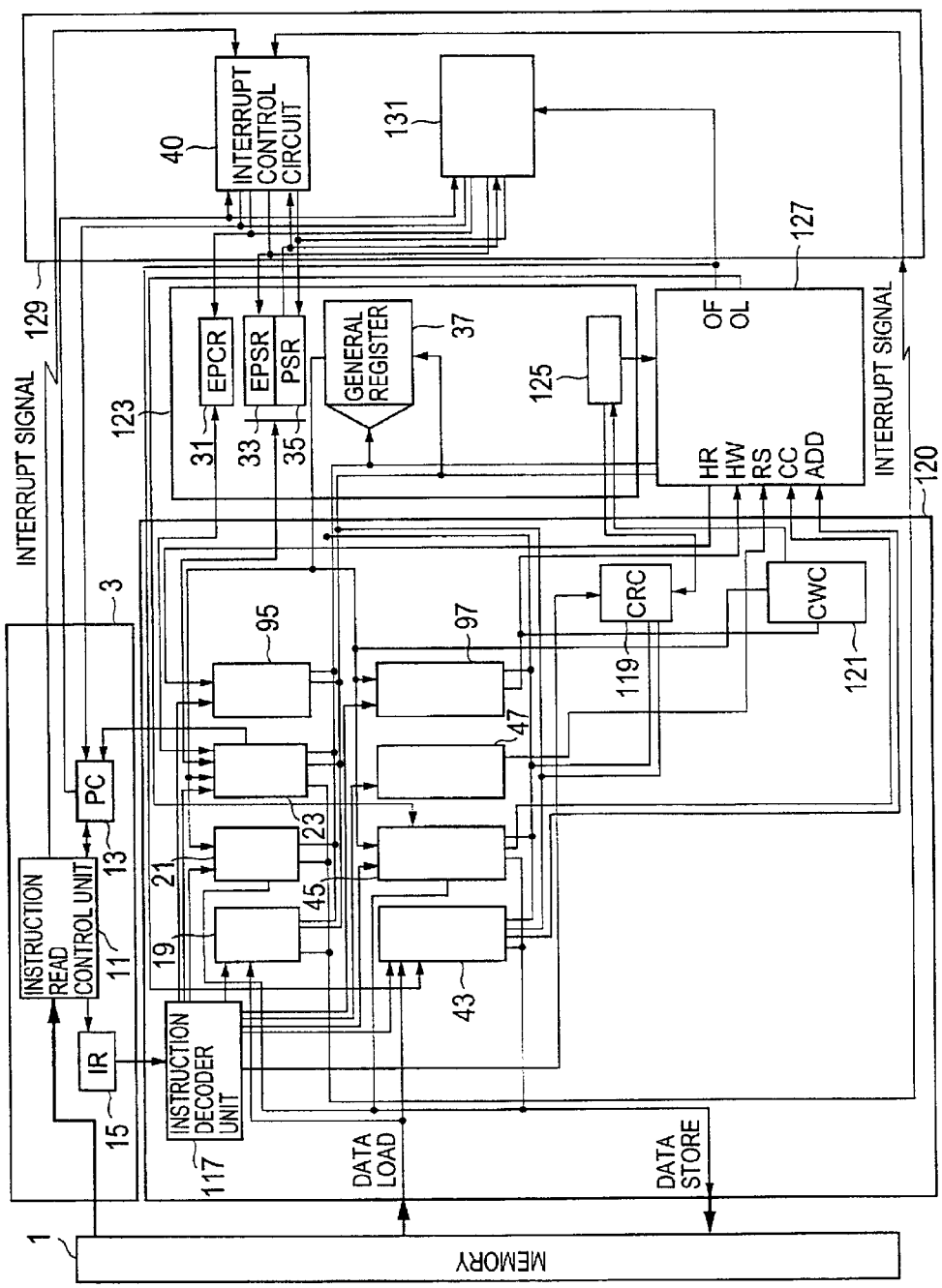
FIG. 23 shows the structure of a processor in accordance with a third embodiment of the present invention.

FIG. 23 shows the structure of a processor in accordance with a third embodiment of the present invention. A shown in FIG. 23, the processor of the third embodiment has the same structure as the processor of the second embodiment shown in FIG. 21, except that an instruction execution unit 120 comprises a context identification number register read instruction execution unit 119 and a context identification number register write instruction execution unit 121, in place of the floating point load instruction execution unit 25, the floating point store instruction execution unit 27, the floating point calculation instruction execution unit 29, the speculative floating point load instruction execution unit 99, and the interference recovery floating point store instruction execution unit 101.

A register control unit 123 comprises a context identification number register 125 in place of the floating point register 39. An interrupt control unit 129 further comprises an overflow exception interrupt control unit 131. Furthermore, with the above components, the structure of a history control unit 127 is changed accordingly.

The context identification number register read instruction execution unit 119 and the context identification number register write instruction execution unit 121 are connected to the instruction decoder unit 117, the general register 37, the history control unit 127, and the context identification number register 125. The contest identification number register 125 is connected to the history control unit 127. The overflow exception interrupt control unit 131 is connected to the program counter 13, the registers 31, 33, and 35, and the history control unit 127.

Figure 24:
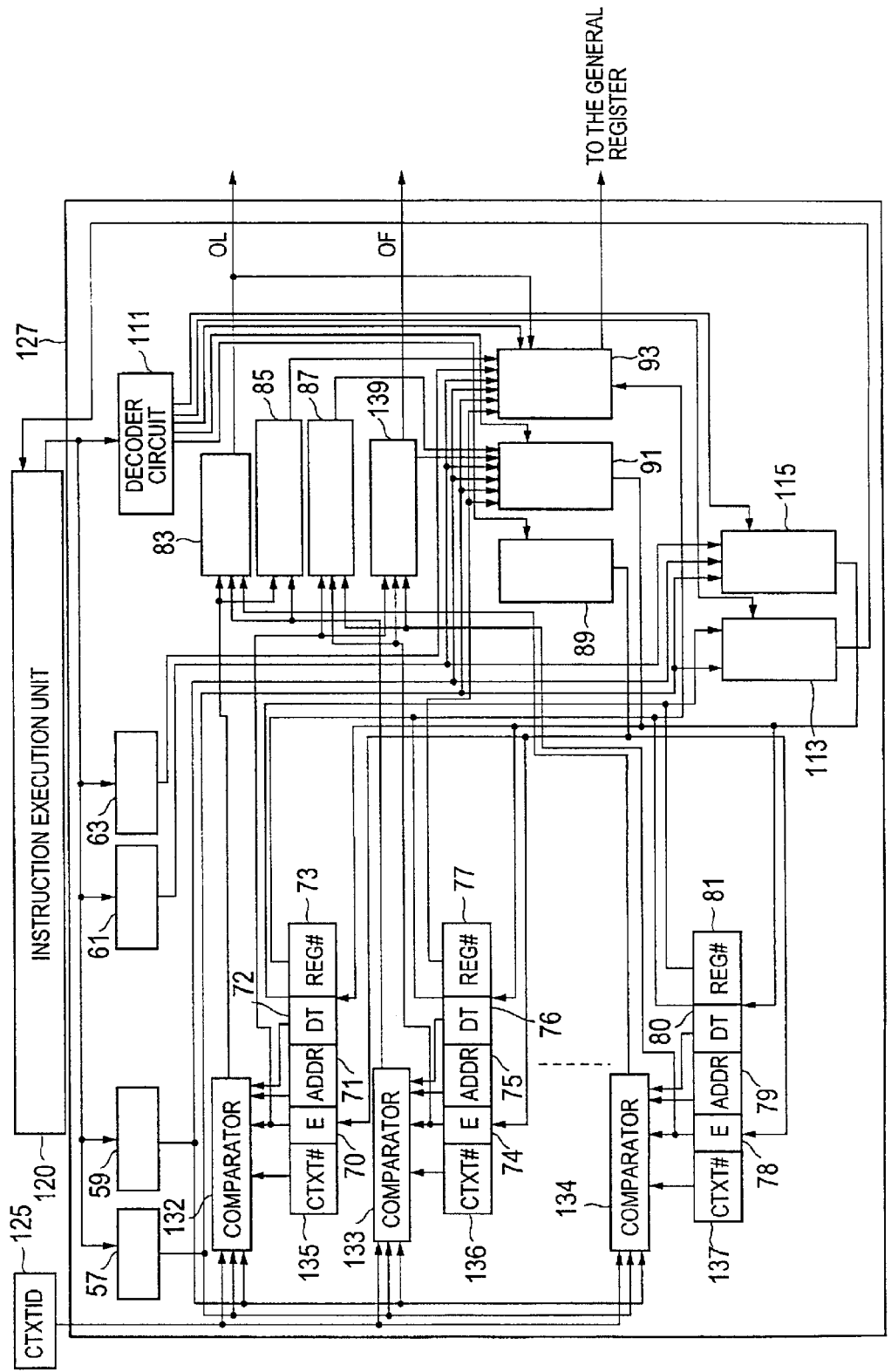
FIG. 24 shows the structure of a history control unit shown in FIG. 23.

FIG. 24 shows the structure of the history control unit 127 shown in FIG. 23. As shown in FIG. 24, the history control unit 127 has the same structure as the history control unit 103 shown in FIG. 22, except that the history control unit 127 further comprises an overflow judgment unit 139, and each entry includes context identification fields 135 to 137 in place of the register type fields 107 to 109. The overflow judgment unit 139 is supplied with the values of the E fields 70, 74, and 78 of each entry.

Here, the context identification number register 125 holds an identification number for identifying a current context. When receiving a context identification number register read instruction from the instruction decoder unit 117, the context identification number register read instruction execution unit 119 reads out a context identification number from the context identification number register 125, and then writes the context identification number in the general register 37. When receiving a context identification number register write instruction from the instruction decoder unit 117, the context identification number register write instruction execution unit 121 writes the data read out from the general register 37 into the context identification number register 125.

When receiving an overflow signal OF from the history control unit 127, the overflow execution interrupt control unit 131 generates an interrupt, and then writes the interrupt return address in the register 31, the pre-interrupt operation state in the register 33, and the operation state of the interrupt in the register 35. Also, the overflow execution interrupt control unit 131 supplies the branch destination address corresponding to the interrupt to the program counter 13.

The overflow judgment unit 139 determines whether or not a free entry in which registration can be performed exists in the speculative load operation history table. More specifically, an entry having the E fields 70, 74, and 78 provided with the value "0" is determined to be a free entry. The overflow judgment unit 319 then notifies the speculative load operation history registration control unit 91 of the presence or absence of a free entry. When there is no free entry, the overflow judgment unit 139 supplies the overflow signal OF to the overflow exception interrupt control unit 131.

In the processor of the third embodiment described above, when the values of the context identification fields 135 to 137 coincide with the context identification numbers supplied from the context identification number register 125 in entries having the E fields 70, 74, and 78 provided with the value "1", the comparators 132 to 134 are activated, and the presence or absence of the interference is determined. Thus, ambiguous reference to the memory can be avoided, and a precise and high-speed operation can be performed.

Also, the context identification numbers stored in the context identification number register 125 can be freely rewritten. Thus, context switching can be easily carried out.

[Fourth Embodiment]

Figure 25:
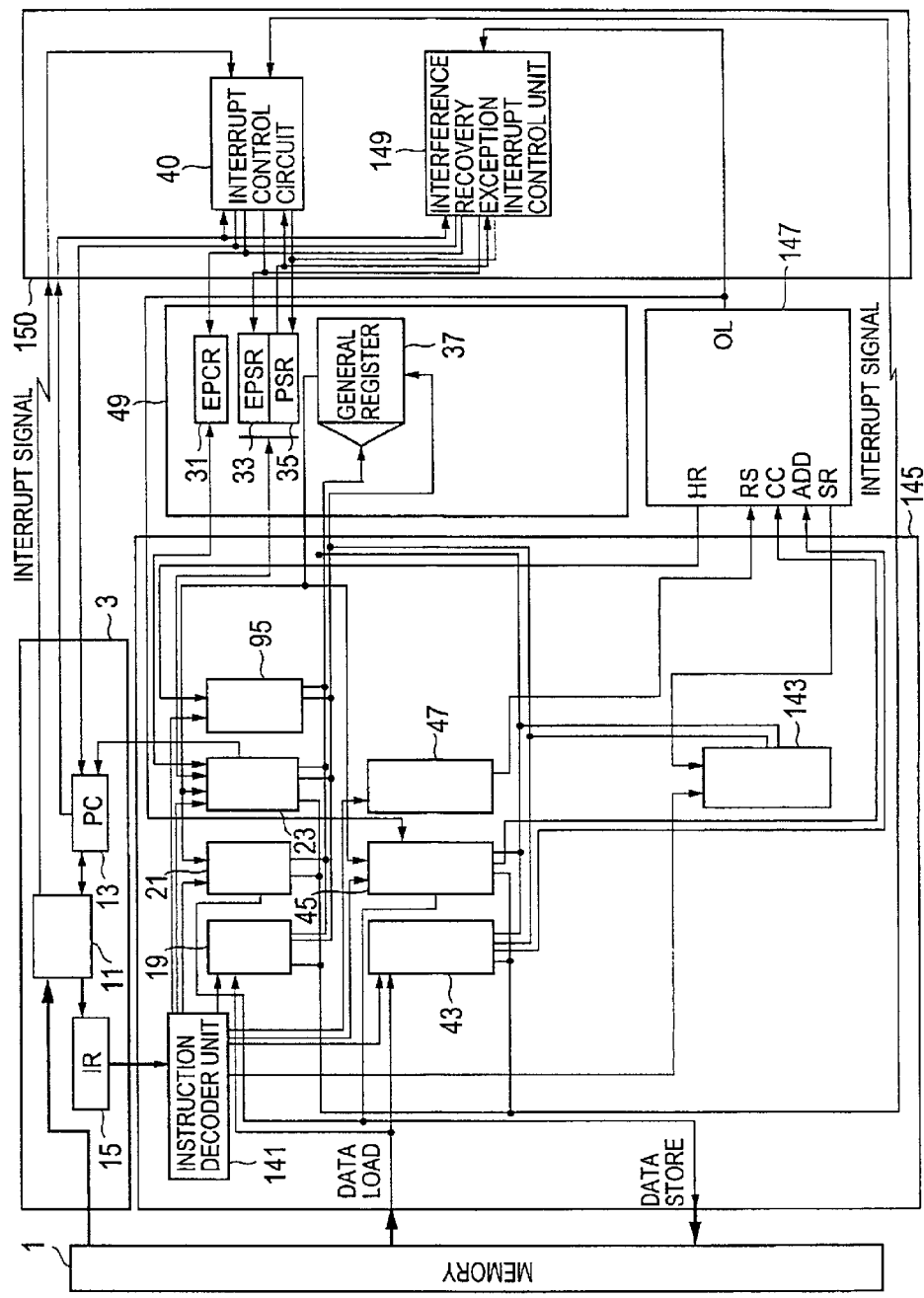
FIG. 25 shows the structure of a processor in accordance with a fourth embodiment of the present invention.

FIG. 25 shows the structure of a processor in accordance with a fourth embodiment of the present invention. As shown in FIG. 25, the processor of the fourth embodiment has the same structure as the process of the first embodiment shown in FIG. 13, except that an instruction execution unit 145 of this embodiment comprises the speculative load operation history read instruction execution unit 95, and further comprises a store data table read instruction execution unit 143. The processor of this embodiment also differs from the first embodiment in that an interrupt control unit 150 comprises an interference recovery exception interrupt control unit 149.

Here, the store data table read instruction execution unit 143 is connected to an instruction decoder unit 141, a history control unit 147, and the general register 37. The interference recovery exception interrupt control unit 149 are connected to the program counter 13, the registers 31, 33, and 35, and the history control unit 147.

Figure 26:
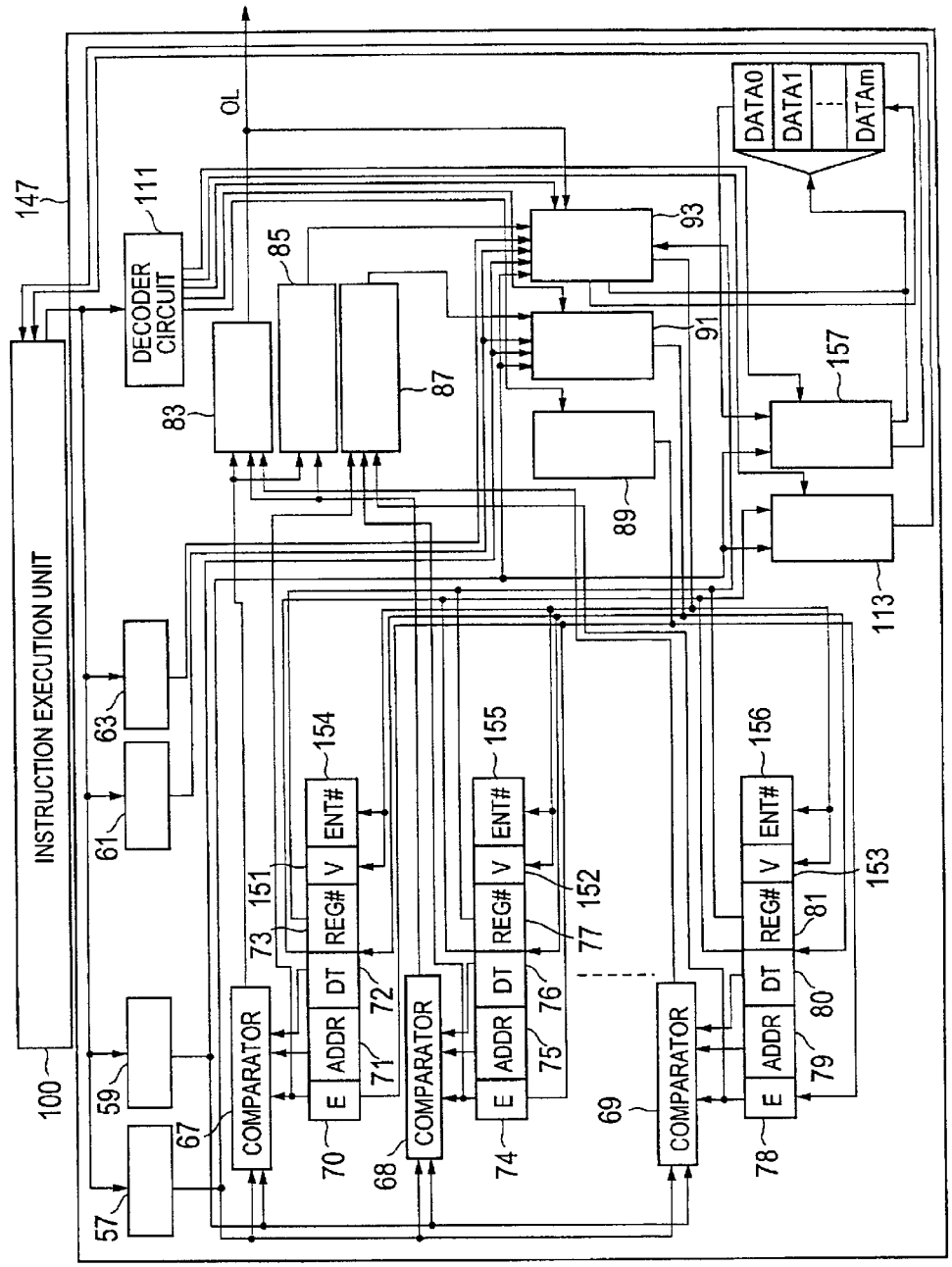
FIG. 26 shows the structure of a history control unit shown in FIG. 25.

With the above components, the structure of the history control unit 147 is changed accordingly. FIG. 26 shows the structure of the history control unit 147 shown in FIG. 25. As shown in FIG. 26, the history control unit 147 has the same structure as the history control unit 51 shown in FIG. 14, except that the history control unit 147 of this embodiment further comprises the speculative load operation history read instruction execution unit 113, a store data table read instruction execution unit 157, and data fields DATA0 to DATAm. Also, each entry includes V fields 151 to 153 and entry fields 154 to 156.

Here, the store data table read instruction execution unit 157 is connected to the address register 57, the data fields DATA0 to DATAm, the decoder circuit 65, and the instruction execution unit 41.

In the processor having the above structure, in accordance with a store data table read instruction supplied from the instruction decoder unit 141, the store data table read instruction execution unit 143 supplies a store data read signal SR to the history control unit 147, thereby reading a store data table described later and writing the read data into the general register 37.

In accordance with an overlap signal OL supplied from the history control unit 147, the interference recover exception interrupt control unit 149 generates an interrupt, and writes an interrupt return address in the register 31, the pre-interrupt operation state in the register 33, and the operation state corresponding to the interrupt in the register 35. The interference recovery exception interrupt control unit 149 also supplies a branch destination address corresponding to the interrupt to the instruction read unit 3.

In accordance with a store data read signal SR supplied from the store data table read instruction execution unit 143, the history control unit 147 reads the store data table, and then supplies the read data to the store data table read instruction execution unit 143.

The data in the V fields 151 to 153 shown in FIG. 26 indicates whether or not the address region subjected to the speculative load operation in the corresponding entry interferes with the address region subjected to the store operation by an interference recovery exception store instruction. For instance, in a case where the data in the V fields 151 to 153 is "0", there is no interference. On the other hand in a case where the data in the V fields 151 to 153 is "1", the two address regions interferes with each other.

The entry fields 154 to 156 represent the entry numbers of the store data table that holds write values (store data) in accordance with the interference recovery exception store instruction when the corresponding one of the V fields 151 to 153 is "1". In an interference recovery exception interrupt operation program mentioned later, recovery is carried out with reference to the entry fields 154 to 156.

The data fields DATA0 to DATAm constitute the entry of the store data table, and holds write values (store data) of an interfering store operation in a case where the address region of the speculative load operation registered in the speculative load operation history table interferes with the address region subjected to the store operation in accordance with the interference recovery exception store instruction.

Next, the operation of the processor of the fourth embodiment having the above structure will be described below. In the initial stage, a normal operation is performed. In the normal operation, the instruction read unit 3 reads out an instruction word indicated by the program counter 13, and supplies the instruction word to the instruction execution unit 145. The instruction execution unit 145 normally executes a supplied instruction. However, when receiving a speculative load instruction, the instruction execution unit 145 additionally registers the history of the load operation in the history control unit 147.

Figure 27:
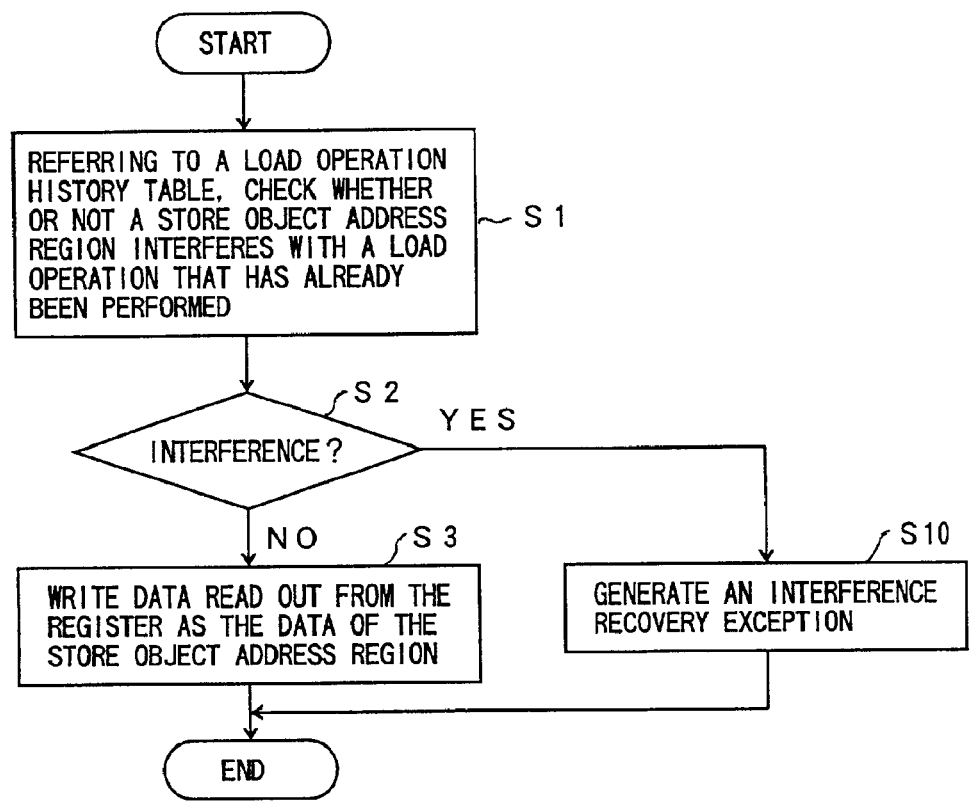
FIG. 27 is a flowchart showing an operation in accordance with an interference recovery exception store instruction.

FIG. 27 is a flowchart showing the operation in a case where the interference recovery exception store instruction is supplied. In step S1, it is determined whether or not the address of data subjected to the store operation interferes with the address region of data that has been subjected to a previous speculative load operation and already registered in the history control unit 147. If there is interference in step S2, the operation moves on to step S10, in which the store data is additionally written in the store table, and the interrupt operation program of the interference recovery exception is executed.

Figure 29:
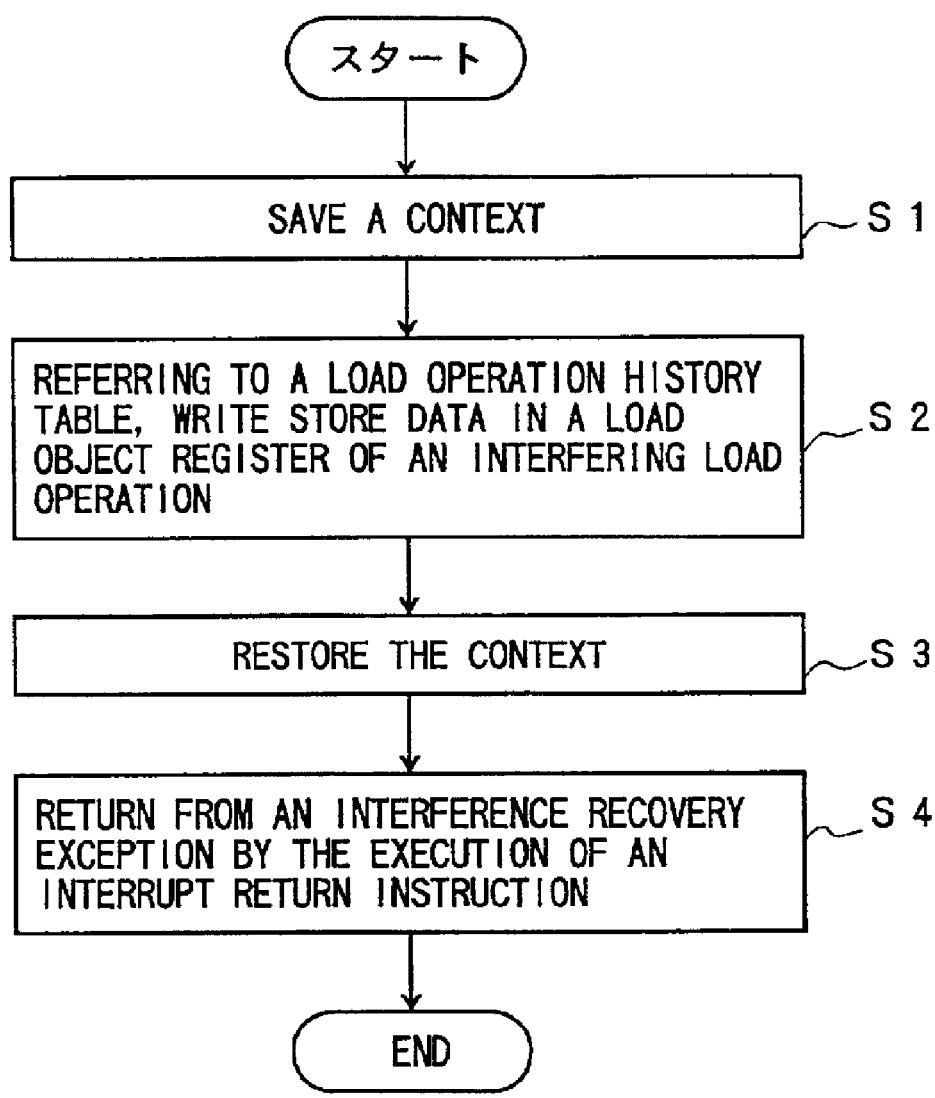
FIG. 29 is a flowchart showing an interference recovery exception interrupt processing program.

FIG. 29 is a flowchart showing the interrupt operation program of the interference recovery exception. In the interrupt operation program of the interference recovery exception, the context is saved in step S1, and the store data is written in the register of a load destination in the interfering load operation, with reference to the load operation history table and the store data table in step S2. The context is then restored in step S3, and an interrupt return instruction is executed in step S4.

Meanwhile, if there is no interference in step S2 in FIG. 27, the operation moves on to step S3, in which the data read out from the general register 37 is written as the data of the store object address region. If a store data table read instruction is supplied, predetermined store data is read out from the store data table. In the normal operation, these steps are repeated. The format of the interference recovery exception store instruction shown in FIG. 28 is the same as the format of the store instruction shown in FIG. 5.

When an interrupt occurs, in accordance with an interrupt signal supplied from the instruction read unit 3 or the instruction execution unit 145, the interrupt control circuit 40 writes the address of an instruction word at the return destination from the interrupt into the register 31, the pre-interrupt operation state into the register 33, and the operation state corresponding to the interrupt into the register 35. The interrupt control circuit 40 also supplies the branch destination address corresponding to the interrupt to the program counter 13. In accordance with the supplied branch destination address, the instruction read unit 3 reads out an instruction word from the memory 1, and supplies the instruction word to the instruction execution unit 145. After that, the operation returns to the normal operation.

When a return operation from the interrupt is performed, the instruction execution unit 145 executes an interrupt return instruction so as to write the value read out from the register 33 into the register 35. The instruction execution unit 145 also reads out the value from the register 31, and supplies the value as a branch destination address to the instruction read unit 3. In accordance with the supplied branch destination address, the instruction read unit 3 reads out an instruction word from the memory 1, and supplies the instruction word to the instruction execution unit 41. After that, the operation returns to the normal operation described above.

As described so far, with the processor of the fourth embodiment, data disorder due to interference can be corrected by a data processing operation. Thus, the same effects as with the processor of the first embodiment can be easily obtained.

[Fifth Embodiment]

In the history control unit 147 of the processor of the fourth embodiment shown in FIG. 26, it is also possible to arrange the V fields 151 to 153 and the entry fields 154 to 156 in contact with the data fields DATA0 to DATAm.

Figure 30:
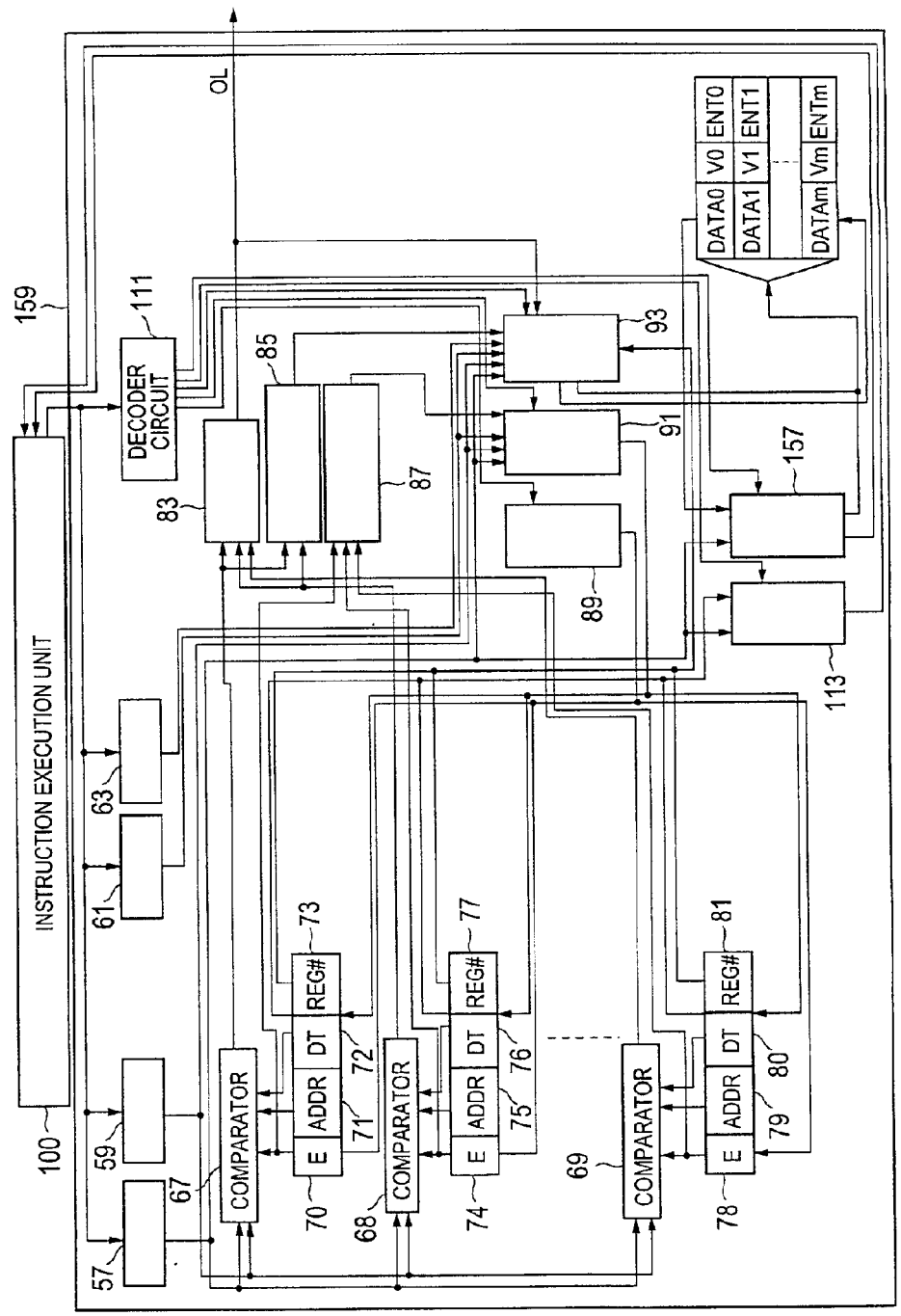
FIG. 30 shows the structure of a history control unit in a processor in accordance with a fifth embodiment of the present invention.

FIG. 30 shows the structure of a history control unit 159 of a processor in accordance with the a fifth embodiment of the present invention. As shown in FIG. 30, V fields Vn (n=0 to m) and entry fields ENTn are arranged adjacent to data fields DATAn. With this structure, the same effects as with the processor of the fourth embodiment can be obtained.

[Sixth Embodiment]

Figure 31:
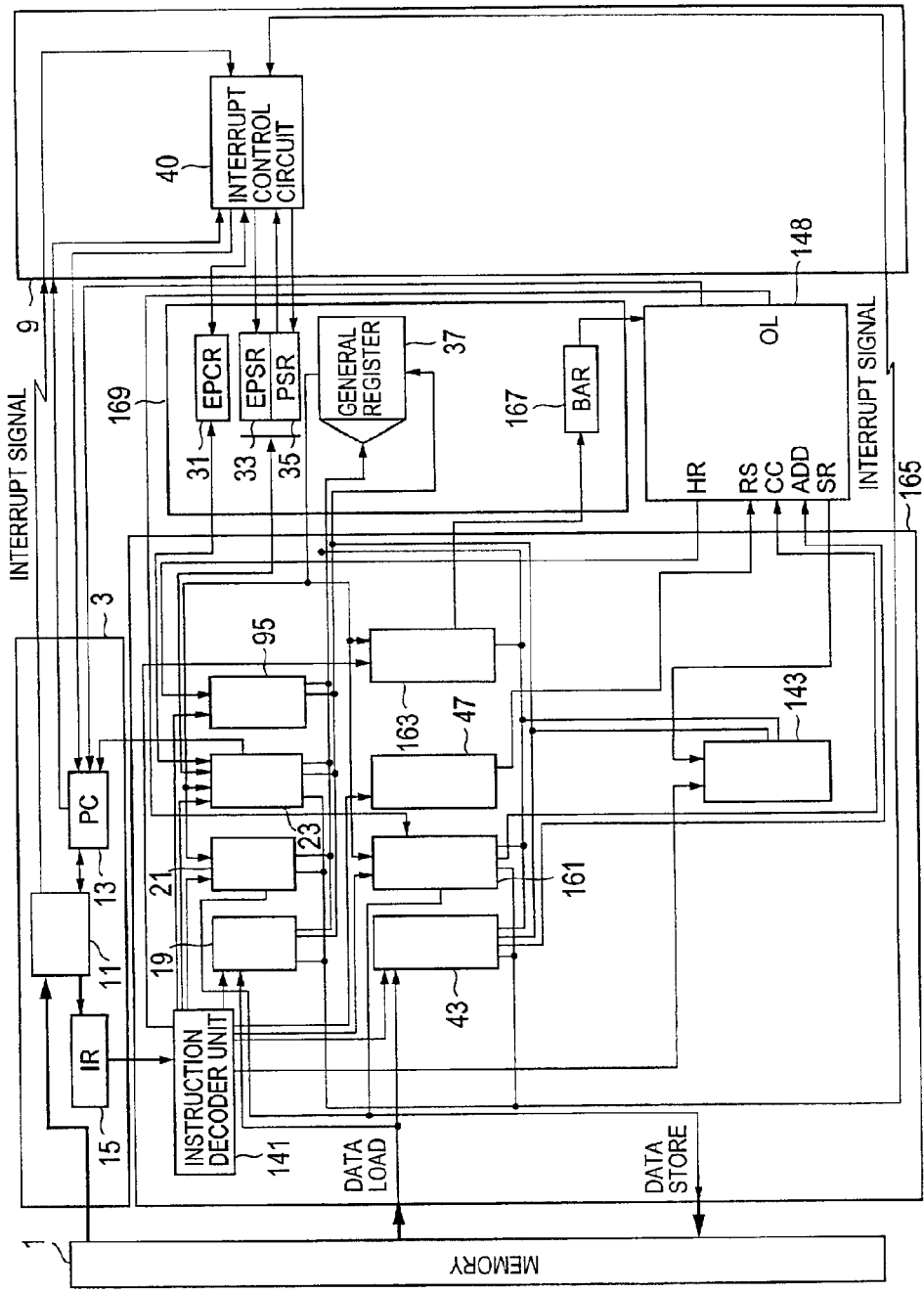
FIG. 31 shows the structure of a processor in accordance with a sixth embodiment of the present invention.

FIG. 31 shows the structure of a processor in accordance with a sixth embodiment of the present invention. As shown in FIG. 24, the processor of this embodiment has the same structure as the processor of the fourth embodiment shown in FIG. 25, except that an instruction execution unit 165 comprises an interference recovery branching store instruction execution unit 161 and an interference recovery branch address register write instruction execution unit 163, in place of the interference recovery store instruction execution unit 45. Also, a register control unit 169 of the processor of this embodiment further comprises an interference recovery branch address register 167.

The interference recovery branching store instruction execution unit 161 is connected to the instruction decoder unit 141, the general register 37 the interrupt control circuit 40, and a history control unit 148. The interference recovery branch address register write instruction execution unit 163 is connected to the instruction decoder unit 141, the general register 37, and the interference recovery branch address register 167. The interference recovery branch address register 167 is connected to the history control unit 148.

Figure 32:
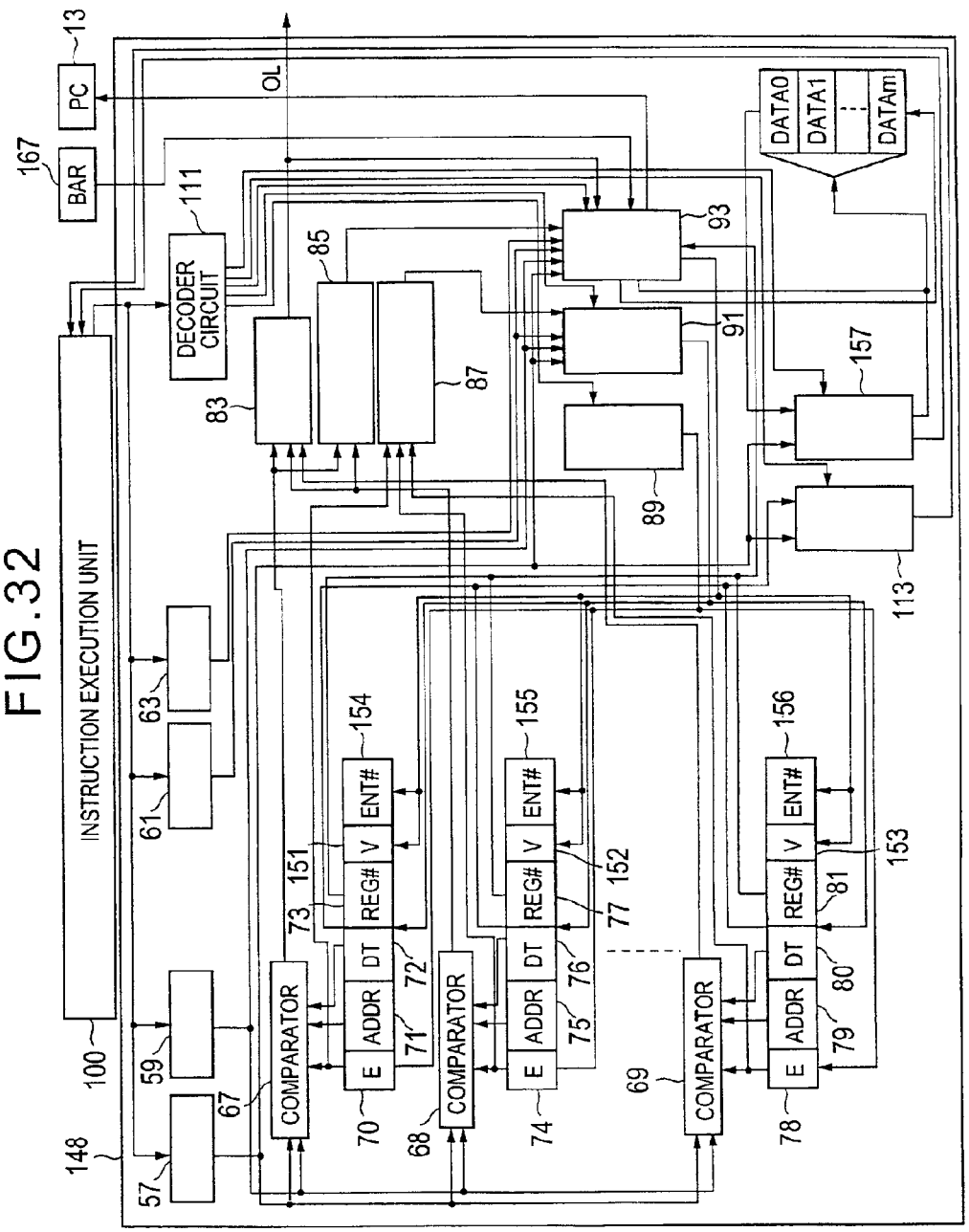
FIG. 32 shows the structure of a history control unit shown in FIG. 31.

FIG. 32 shows the structure of the history control unit 148 shown in FIG. 31. As shown in FIG. 32, the history control unit 148 of this embodiment has the same structure as the history control unit 147 shown in FIG. 26, except that the speculative load operation history interference confirmation control unit 93 is connected to the interference recovery branch address register 167 and the program counter 13.

When receiving an interference recovery branching store instruction from the instruction decoder unit 17, the interference recovery branching store instruction execution unit 161 determines an effective address from a value read out from the general register 37, and writes the data read out from the general register 37 into the region in the memory 1 corresponding to the effective address. The interference recovery branching store instruction execution unit 161 also outputs a confirmation signal CC to the history control unit 148. In a case where an interrupt has been detected at the time of executing an instruction, an interrupt signal is supplied to the interrupt control circuit 40.

When receiving an interference recovery branch address register write instruction from the instruction decoder unit 17, the interference recovery branch address register write instruction execution unit 163 writes the data read out from the general register 37 into the interference recovery branch address register 167. The interference recovery branch address register 167 holds a first address of a recovery code for recovering from data disorder due to interference.

Next, the operation of the processor having the above structure will be described. In the initial state, a normal operation is performed. In the normal operation, the instruction read unit 3 reads out an instruction word indicated by the program counter 13, and supplies the instruction word to the instruction execution unit 165. The instruction execution unit 165 normally performs a supplied instruction. However, the instruction execution unit 165 additionally registers the history of the load operation in the history control unit 148.

Figure 33:
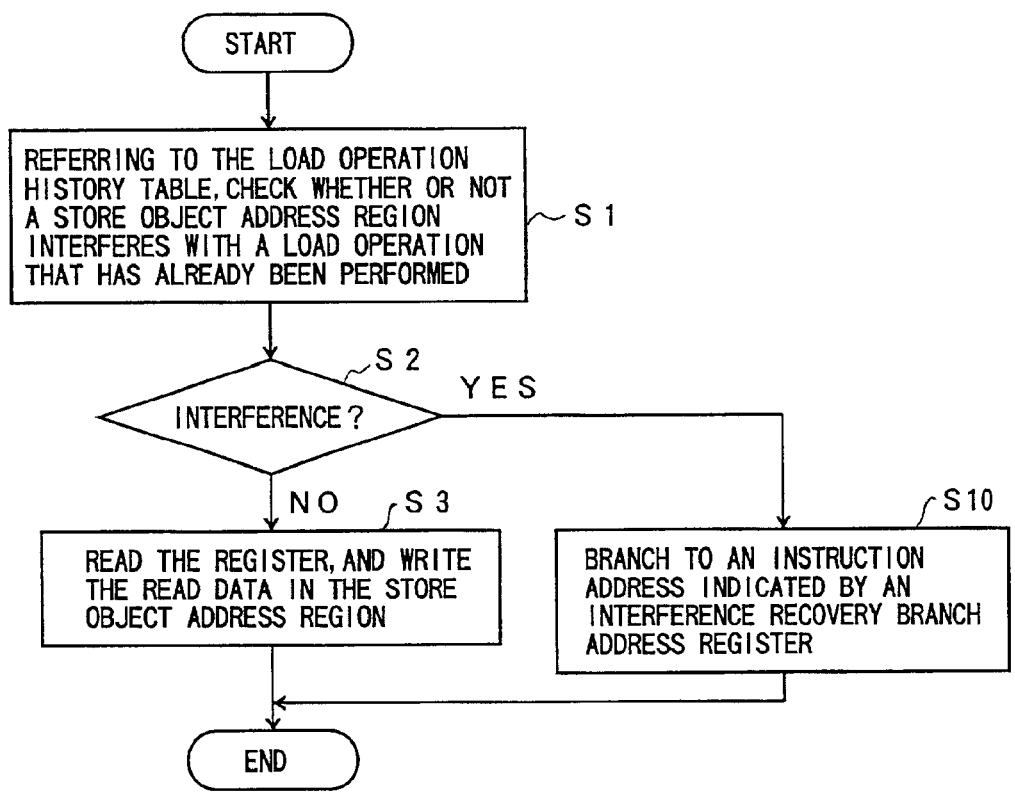
FIG. 33 is a flowchart showing an operation in accordance with the interference recovery branching store instruction.

FIG. 33 is a flowchart showing the operation when the interference recovery branching store instruction is supplied. In step S1, it is determined whether or not the address of data subjected to the store operation interferes with the address region of the data that has been subjected to a previous speculative load operation and already registered in the history control unit 148. If there is interference in step S2, the operation moves on to step S10, in which the store data is added to the store data table, and branching is carried out to an instruction address indicated by the interference recovery branch address register 167.

If there is no interference in step S2, the operation moves on to step S3, in which the data read out from the general register 37 is written as the data of the store object address region. In the normal operation, these steps are repeated. The format of the interference recovery branching store instruction shown in FIG. 34 is the same as the format of the store instruction shown in FIG. 5. When a store data table read instruction is supplied, the store data is read out from the store data table.

When an interrupt occurs, in accordance with a interrupt signal supplied from the instruction read unit 3 or the instruction execution unit 165, the interrupt control circuit 40 writes the address of an instruction word of a return destination from the interrupt into the register 31, the pre-interrupt operation state into the register 33, and the operation state corresponding to the interrupt into the register 35. The interrupt control circuit 40 also supplies the branch destination address corresponding to the interrupt to the program counter 13. Here, the instruction read unit 3 reads out an instruction word from the memory 1 in accordance with a supplied branch destination address, and supplies the instruction word to the instruction execution unit 165. After that, the operation returns to the normal operation.

When returning from an interrupt, the instruction execution unit 165 executes an interrupt return instruction, thereby writing the value read out from the register 33 into the register 35. The instruction execution unit 165 also reads out the value from the register 31, and supplies the value as the branch destination address to the instruction read unit 3. Here, the instruction-read unit 3 reads out an instruction word from the memory 1 in accordance with the supplied branch destination address, and supplies the instruction word to the instruction execution unit 41. After that, the operation returns to the normal operation.

As described above, with the processor of the sixth embodiment, it is possible to recover from data disorder due to interference by a program at a branch destination designated through the execution of a branch instruction. Thus, the same effects as with the processor of the first embodiment can be achieved with a simpler structure.

In the processor of the sixth embodiment, there is no need to perform operations, such as the context saving and restoring, at the time of recovery. Thus, the data processing rate can be further increased.

[Seventh Embodiment]

Figure 6:
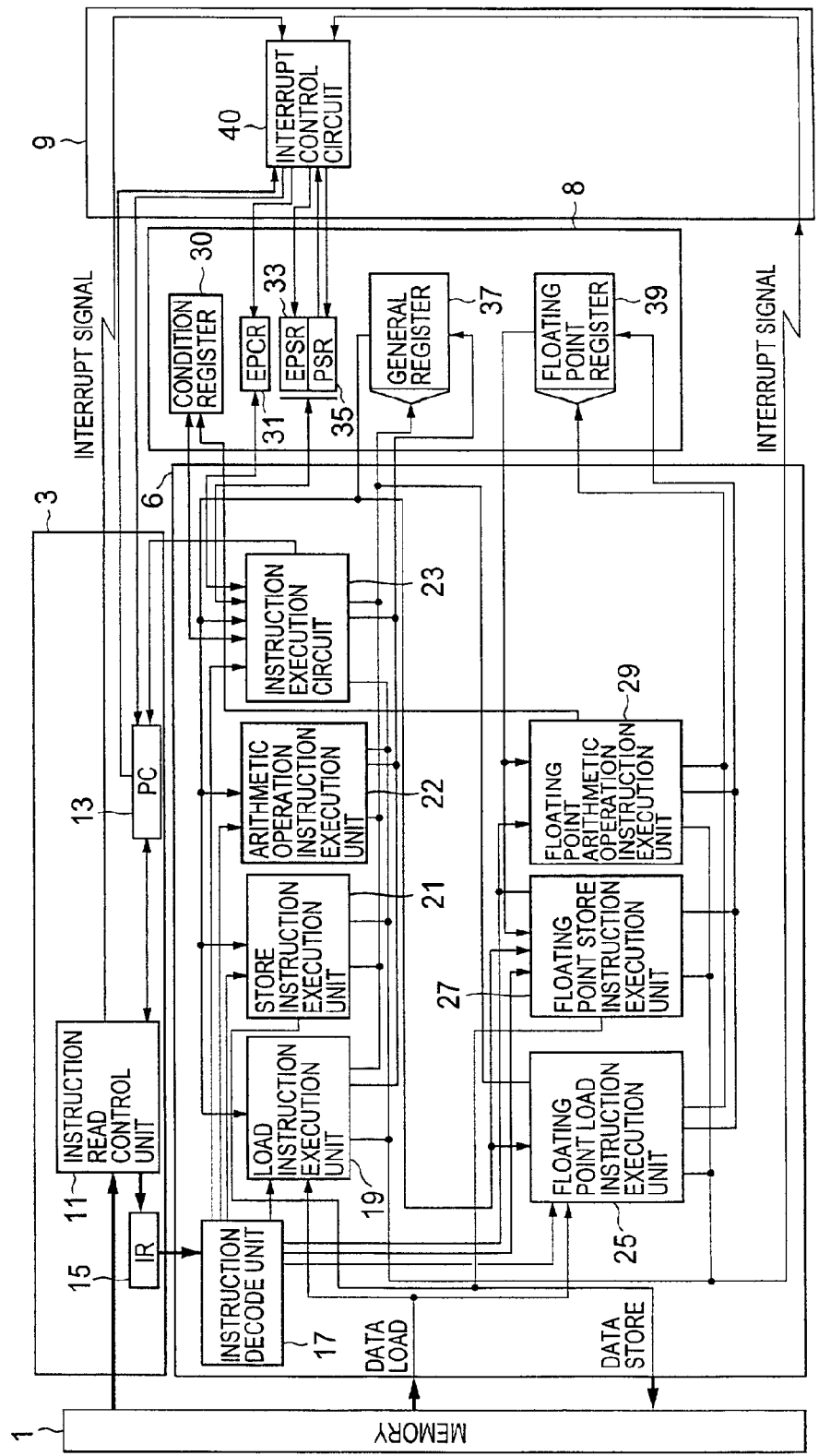
FIG. 6 shows a second example of the conventional processor having a general register and a floating point register.
Figure 7:
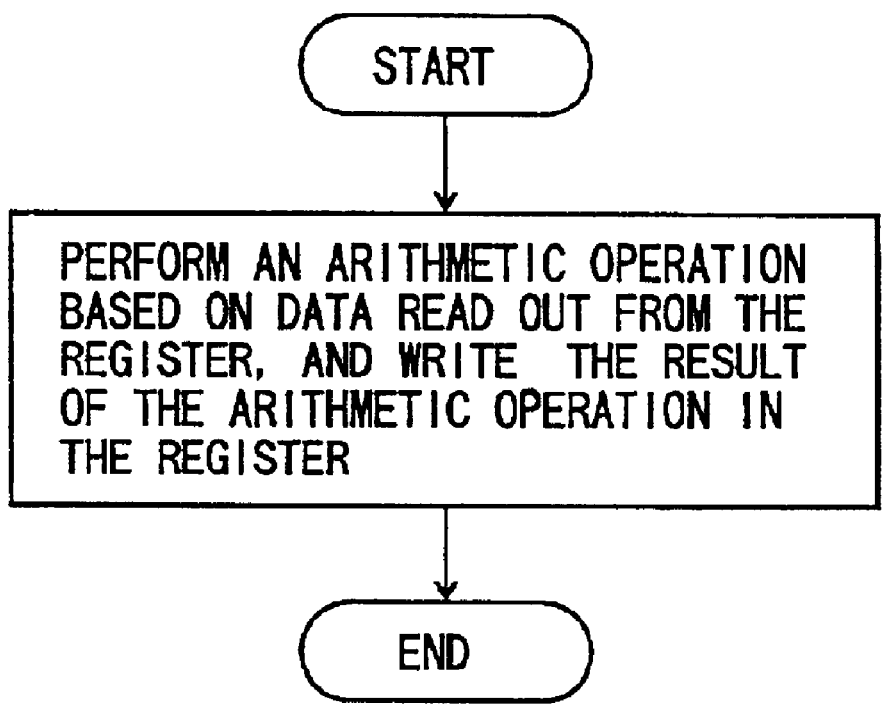
FIG. 7 is a flowchart showing an operation in accordance with an arithmetic operation instruction.
Figure 35:
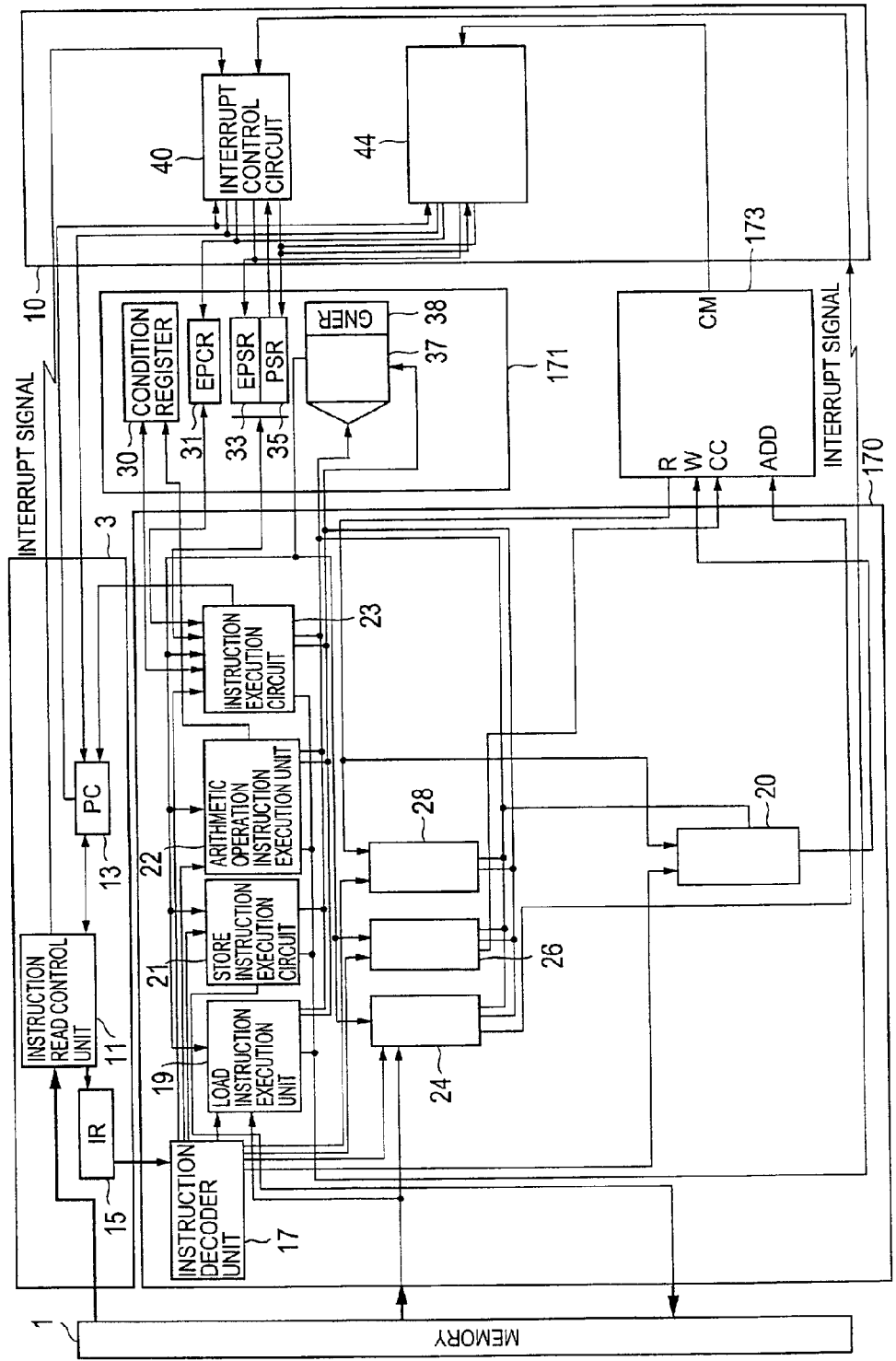
FIG. 35 shows the structure of a processor in accordance with a seventh embodiment of the present invention.

FIG. 35 shows the structure of a processor in accordance with a seventh embodiment of the present invention. As shown in FIG. 35, the processor of this embodiment has the same structure as the conventional processor shown in FIG. 6, except that the processor of this embodiment further comprises a history control unit 173. The processor of this embodiment differs from the processor shown in FIG. 6 also in that an instruction execution unit 170 comprises an exception inhibiting load instruction execution unit 24, a commit instruction execution unit 26, an exception inhibiting history read instruction execution unit 28, and an exception inhibiting history write instruction execution unit 20, that a register control unit 171 further comprises an exception inhibiting flag 38, and that an interrupt control unit 10 further comprises a commit exception interrupt control unit 44.

The history control unit 173 is connected to the exception inhibiting history write instruction execution unit 20, the exception inhibiting load instruction execution unit 24, the commit instruction execution unit 26, the exception inhibiting history read instruction execution unit 28, and the commit exception interrupt control unit 44. The exception inhibiting history write instruction execution unit 20, the commit instruction execution unit 26, and the exception inhibiting history read instruction execution unit 28 are also connected to the instruction decoder unit 17 and the general register 37. The exceptional inhibiting load instruction execution unit 24 is also connected to the memory 1.

The exception inhibiting flag 38 is attached to the general register 37. The commit exception interrupt control unit 44 is also connected to the program counter 13 and the registers 31, 33, and 35.

Figure 37:
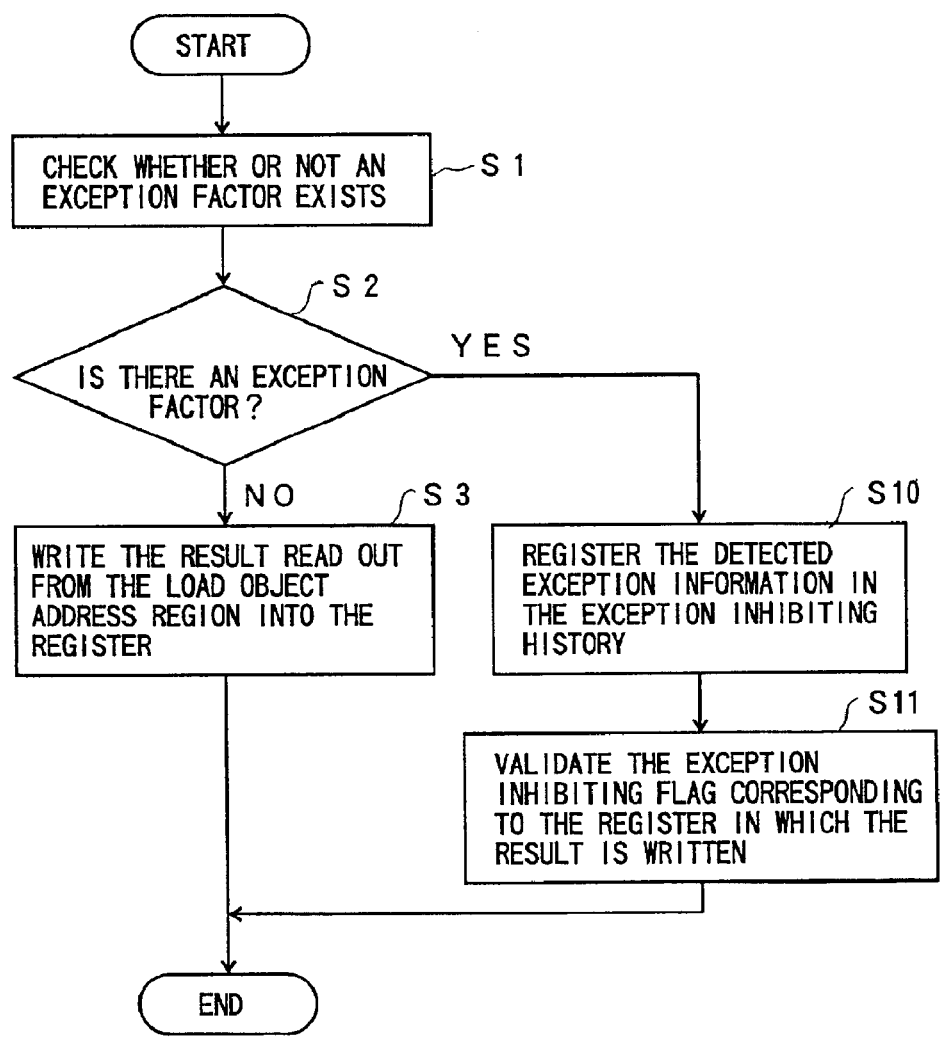
FIG. 37 is a flowchart showing an operation in accordance with an exception inhibiting load instruction.

When receiving an exception inhibiting load instruction, the exception inhibiting load instruction execution unit 24 determines an effective address from a value read out from the general register 37, and reads out data from the region in the memory 1 corresponding to the effective address. As shown in FIG. 37, it is determined whether or not an exception factor exists in the read out data in step S1. If it is determined that there is no exception factor in step S2, the operation moves on to step S3, in which the data read out from the load object address region into the general register 37.

If it is determined that there is an exception factor in step S2, the operation moves on to step S10, a registration command signal is supplied to the history control unit 173, thereby storing the detected exception information in the history control unit 173. In step S11, the exception inhibiting flag 38 corresponding to the register, in which the exception information is stored, is set to the value "1", thereby indicating its effectiveness. The format of the exception inhibiting load instruction is the same as the format of the load instruction shown in FIG. 3.

Figure 38:
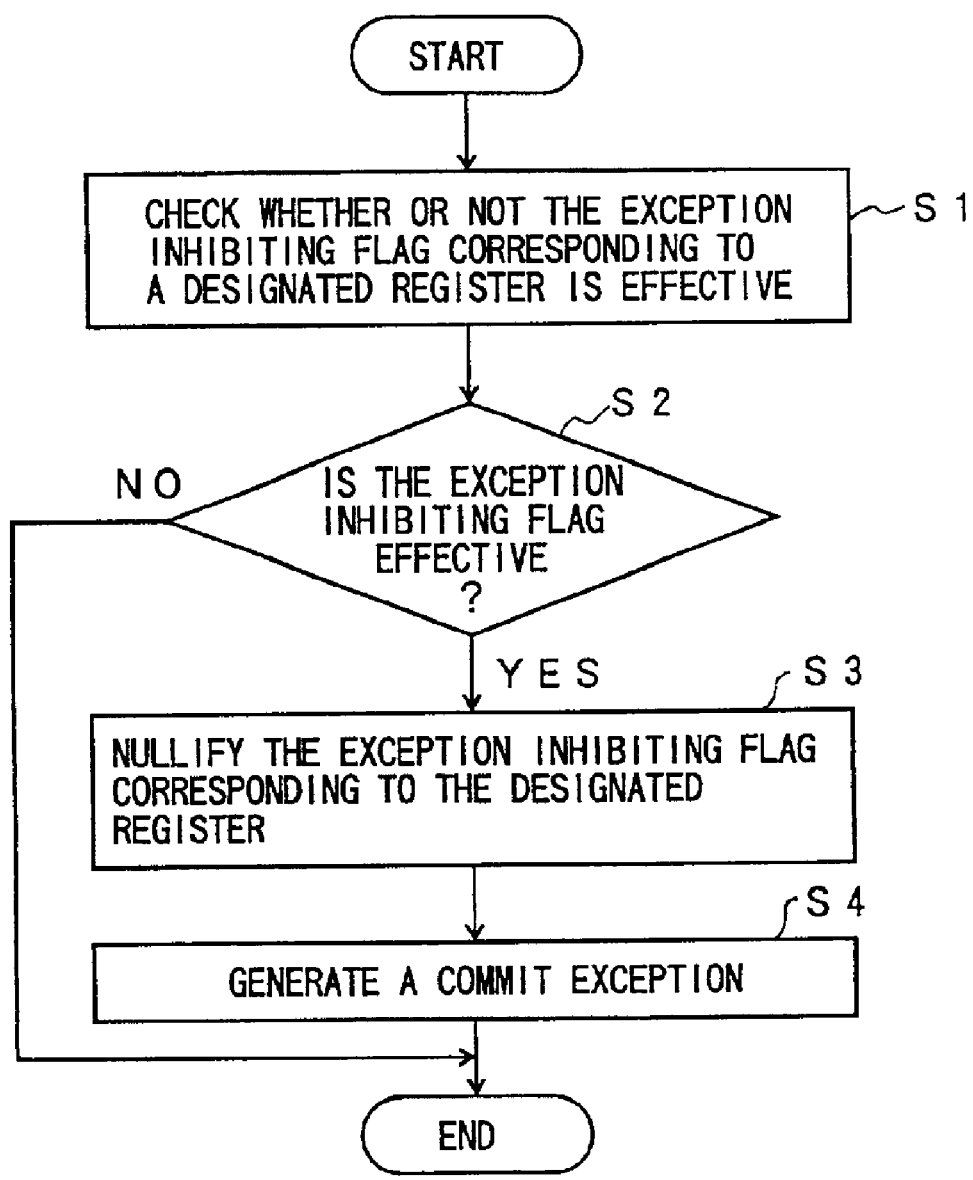
FIG. 38 is a flowchart showing an operation in accordance with a commit instruction.
Figure 39:
FIG. 39 shows the format of the commit instruction.

When receiving a commit instruction, the commit instruction execution unit 26 determines whether or not the exception inhibiting flag 38 corresponding to the register designated by the commit instruction is effective in step S1 shown in FIG. 38. If the exception inhibiting flag 38 is determined to be effective in step S2, the operation moves on to step S3, in which the exception inhibiting flag 38 is set at "0" that indicating invalidity. In step S4, a confirmation command signal is supplied to the history control unit 173, thereby notifying the interrupt control unit 10 that the commit exception occurs. If the exception inhibiting flag 38 is determined to be invalid in step S2, the operation by the commit instruction comes to an end. The format of the commit instruction is made up of an instruction code OP-CODE and a code GR for designating a register, as shown in FIG. 39.

When receiving an exception inhibiting history read instruction, the exception inhibiting history read instruction execution unit 28 supplies a read command signal to the history control unit 173, thereby reading out the exception information from the history control unit 173 and writing the exception information into the general register 37. Likewise, when receiving an exception inhibiting history write instruction, the exception inhibiting history write instruction execution unit 20 supplies the history control unit 173 with data read out from the general register 37 and a write command signal, and writes the read out data in the history control unit 173.

In response to a interrupt-notifying commit signal CM supplied from the history control unit 173, the commit exception interrupt control unit 44 writes an instruction address of a return destination from an interrupt into the register 31, data indicating the pre-interrupt operation state into the register 33, and the operation state corresponding to the interrupt into the register 35. The commit exception interrupt control unit 44 supplies a branch destination address corresponding to the interrupt to the program counter 13.

In response to a confirmation command signal supplied from the commit instruction execution unit 26, the history control unit 173 checks whether or not any exception information is held in the register of a designated register number. If there is exception information held in the register of the designated register number, a commit signal CM indicating that a commit exception has been detected is supplied to the commit exception interrupt control unit 44.

In response to a read command signal supplied from the exception inhibiting history read instruction execution unit 28, the history control unit 173 reads out stored exception information, and supplies the exception information to the exception inhibiting history read instruction execution unit 28. Furthermore, in accordance with a write command signal supplied from the exception inhibiting history write instruction execution unit 20, the history control unit 173 stores supplied data.

Figure 36:
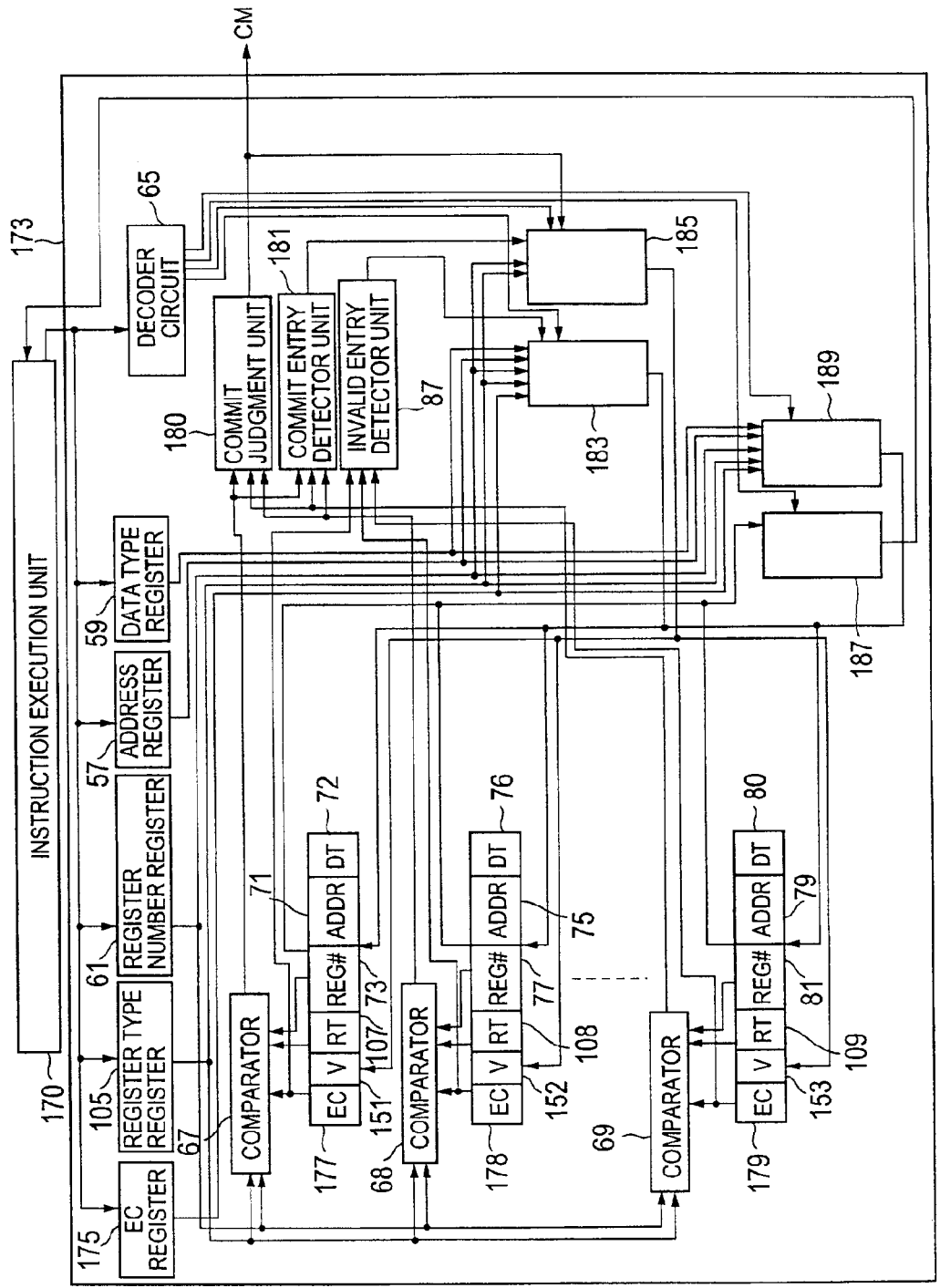
FIG. 36 shows the structure of a history control unit shown in FIG. 35.

FIG. 36 shows the structure of the history control unit 173. As shown in FIG. 36, the history control unit 173 comprises the address register 57, the data type register 59, the register number register 61, an exception factor register 175, the register type register 105, the decoder circuit 65, the comparators 67 to 69, EC fields (EC) 177 to 179, the V fields 151 to 153, the register type fields (RT) 107 to 109, the address fields (ADDR) 71, 75, and 79, the data type fields (DT) 72, 76, and 80, the register number fields (REG#) 73, 77, and 81, a commit judgment unit 180, a commit entry detector unit 181, the invalid entry detector unit 877, an exception inhibiting history registration control unit 183, a commit instruction execution unit 185, an exception inhibiting history read instruction execution unit 187, and an exception inhibiting history write instruction execution unit 189.

The address register 57, the data type register 59, the register number register 61, the register type register 105, the EC register 175, and the decoder circuit 65 are connected to the instruction execution unit 170. The address register 57 holds an effective address for executing an exception inhibiting load instruction. The data type register 59 holds an identification value indicating the size of data subjected to a load/store operation in the execution of the exception inhibiting load instruction. The register number register 61 holds the register number of a register subjected to a write operation in the execution of the exception inhibiting load instruction.

The register type register 105 holds an identification value indicating the type of a register to be operated. The EC register 175 holds an identification value of an exception factor detected in the execution of the exception inhibiting load instruction. Examples of exception factors and identification values are shown in Table 1.

TABLE 1

| Exception factor | identification value |
| --- | --- |
| 0 division | 0 × 28 |
| Data access error | 0 × 32 |

The decoder circuit 65 analyzes a signal supplied from the instruction execution unit 170, and activates the corresponding control unit. More specifically, in response to a supplied registration command signal, the decoder circuit 65 activates the exception inhibiting history registration control unit 183. In response to a confirmation command signal, the decoder circuit 65 activates the commit instruction execution unit 185. In response to a read command signal, the decoder circuit 65 activates the exception inhibiting history read instruction execution unit 187. In response to a write command signal, the decoder circuit 65 activates the exception inhibiting history write instruction execution unit 189.

Meanwhile, the comparators 67 to 69 are connected to the register number register 61, the register type register 105, and the corresponding entries. Here, the plurality of entries constitute an exception inhibiting history table. Each of the entries includes: the EC fields 177 to 179 indicating exception factors; the V fields 151 to 153 holding binary data indicating whether or not an exception has occurred in each corresponding entry; the register type fields 107 to 109 indicating the types of registers in which exception information is stored; the address fields 71, 75, and 79 indicating the effective address of data subjected to an exception operation; the data type fields 72, 76, and 80; and the register number fields 73, 77, 81 each indicating the register number of a register in which exception information is stored.

The data type fields 72, 76, and 80 each hold an identification value corresponding to the type of data, as shown in Table 2.

TABLE 2

| Data type | identification value |
| --- | --- |
| Unsigned byte | 0 |
| Signed byte | 1 |
| Unsigned half word | 2 |
| Signed half word | 3 |
| Word | 4 |
| Double word | 5 |
| Quad word | 6 |

As shown in Table 2, the identification value is "0" for an unsigned byte, "1" for a signed byte, "2" for an unsigned half word, "3" for a signed half word, "4" for a word, "5" for a double word, and "6" for a quad word.

The register type fields 107 to 109 each hold an identification value corresponding to the type of register, as shown in Table 3.

TABLE 3

| Register type | identification value |
| --- | --- |
| General register | 0 |
| Floating point register | 1 |

The comparators 67 to 69 each compare a register designated by a commit instruction with a register that is specified by values stored in the register number fields 73, 77, and 81, and the register type fields 107 to 109. The comparator 67 to 69 each output a signal indicating whether or not the two registers are the same.

The commit judgment unit 180 is connected to the comparators 67 to 69. In accordance with a signal supplied from the comparators 67 to 69, the commit judgment unit 180 determines whether or not a register in which exception information is stored is specified by a commit instruction. The judgment result is outputted to the commit instruction execution unit 185, and a commit signal CM is supplied to the commit exception interrupt control unit 44.

The commit entry detector unit 181 is connected to the comparators 67 to 69. In accordance with a signal supplied from the comparators 67 to 69, the commit entry detector unit 181 detects the number of an entry in which the register number designated by the commit instruction coincides with the register number stored in a predetermined field.

The invalid entry detector unit 87 detects a free entry (invalid entry) in accordance with the information stored in the EC fields 177, 178, and 179 in each entry. The exception inhibiting history registration control unit 183 is connected to the address register 57, the data type register 59, the register number register 61, the register type register 105, the EC register 175, the decoder circuit 65, and the invalid entry detector unit 87. In accordance with a registration signal ADD supplied from the decoder circuit 65, the exception inhibiting history registration control unit 183 writes the exception information into the address fields 71, 75, and 79, the register type fields 107, 108, and 109, and the register number fields 73, 77, and 81 of a free entry detected by the invalid entry detector unit 87.

The commit instruction execution unit 185 is connected to the register number register 61, the register type register 105, the commit judgment unit 180, the commit entry detector unit 181, the decoder circuit 65, and the V fields 151 to 153. If the commit judgment unit 180 determines that the register number specified by a commit instruction coincides with the register number stored in a predetermined field, the commit instruction execution unit 185 writes "1" in the V fields 151 to 153 of the register in which the coinciding register number is stored.

The exception inhibiting history read instruction execution unit 187 reads out exception information from a designated entry and supplies and exception information to the instruction execution unit 170. The exception inhibiting history write instruction execution unit 189 writes the value supplied from the instruction execution unit 170 into the designated entry.

Next, the operation of the processor having the above structure will be described. In the initial stage, a normal operation is performed. In the normal operation, the instruction read unit 3 reads out an instruction word indicated by the program counter 13, and supplies the instruction word to the instruction execution unit 170. The instruction execution unit 170 normally executes a supplied instruction. When receiving an exception inhibiting load instruction and detecting the necessity of an exception operation, however, the instruction execution unit 170 sets the exception inhibiting flag 38 corresponding to the register subjected to a write operation at "1", thereby making the exception inhibiting flag 38 effective. At the same time, the instruction execution unit 170 registers the exception information in the history control unit 173.

When receiving a commit instruction, the instruction execution unit 170 checks whether or not the exception inhibiting flag 38 corresponding to the register number designated in the general register 37 is effective. If the exception inhibiting flag 38 is effective, a commit exception inhibited through the history control unit 173 is generated. In the normal operation, the above steps are repeated.

When an interrupt occurs, in accordance with an interrupt signal supplied from the instruction read unit 3 or the instruction execution unit 170, the interrupt control circuit 40 writes an instruction word address at a return destination from an interrupt in the register 31, the pre-interrupt operation state in the register 33, and the operation state corresponding to the interrupt in the register 35. The interrupt control circuit 40 also supplies a branch destination address corresponding to the interrupt to the program counter 13. Here, the instruction read unit 3 reads out an instruction word from the memory 1 in accordance with the branch destination address supplied from the interrupt control unit 10, and then supplies the instruction word to the instruction execution unit 170. After that, the operation returns to the normal operation described above.

When returning from an interrupt, the instruction execution unit 170 executes an interrupt return instruction so as to write the value from the register 33 into the register 35. Also, the instruction execution unit 170 reads out the value from the register 31, and supplies the value as a branch destination address to the instruction read unit 3. Here, the instruction read unit 3 reads out an instruction word from the memory 1 in accordance with the supplied branch destination address, and then supplies the branch destination address to the instruction execution unit 170. After that, the operation returns to the normal operation.

Figure 40:
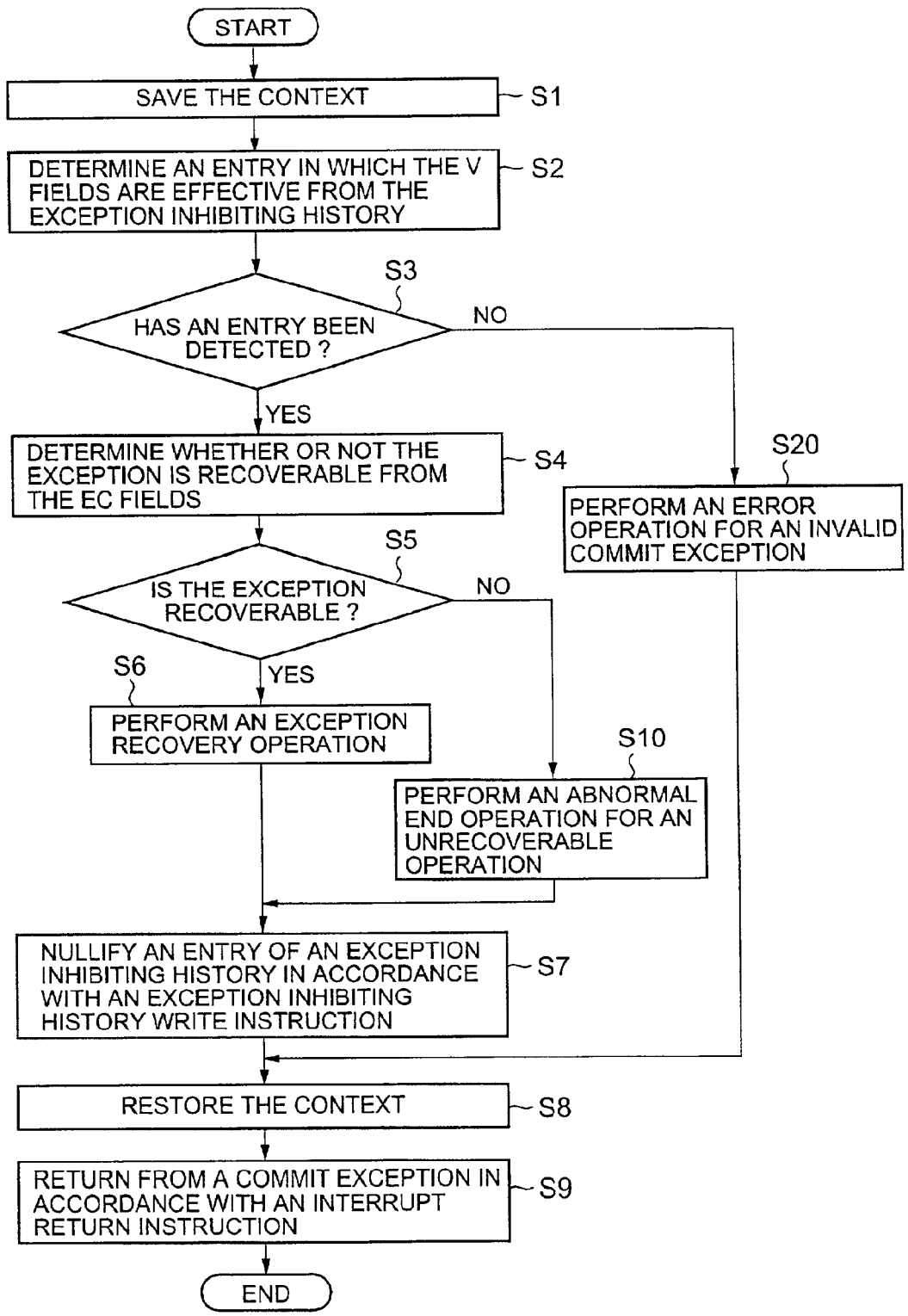
FIG. 40 is a flowchart showing an interrupt operation in a commit exception.

FIG. 40 is a flowchart of an interrupt operation program in a commit exception operation in the processor of this embodiment. As shown in FIG. 40, a context is saved in step S1, and an entry in which the V fields are effective is detected in the exception inhibiting history table in step S2. In step S3, it is determined whether or not an effective entry has been detected. If no entry has been detected, the operation moves on to step S20, in which the commit exception is handled as an error. The operation then moves on to step S8.

On the other hand, if an effective entry has been detected in step S3, the operation moves on to step S4, in which it is determined whether or not the exception operation is recoverable based on the data recorded in the EC fields. If the exception operation is determined to be unrecoverable in step S5, the operation moves on to step S10, in which an abnormal end operation is performed. If the exception operation is determined to be recoverable in step S5, the operation moves on to step S6, in which the exception operation is performed. In step S7, in accordance with an exception inhibiting history write instruction, the entry on the exception inhibiting history table is nullified.

In step S8, the context is restored, and, in step S9, the operation returns from the commit exception in accordance with an interrupt return instruction.

As described so far, in accordance with the seventh embodiment of the present invention, when there is a need to maintain an exception operation because of the instruction execution order, the exception information required for executing the exception operation is stored in the history control unit 173. Only when it is determined that the maintained exception operation should be executed in the main operation, is the exception operation performed in accordance with the exception information stored in the history control unit 173. After that, the main operation is continued, thereby increasing the operation speed.

[Second Embodiment]

Figure 41:
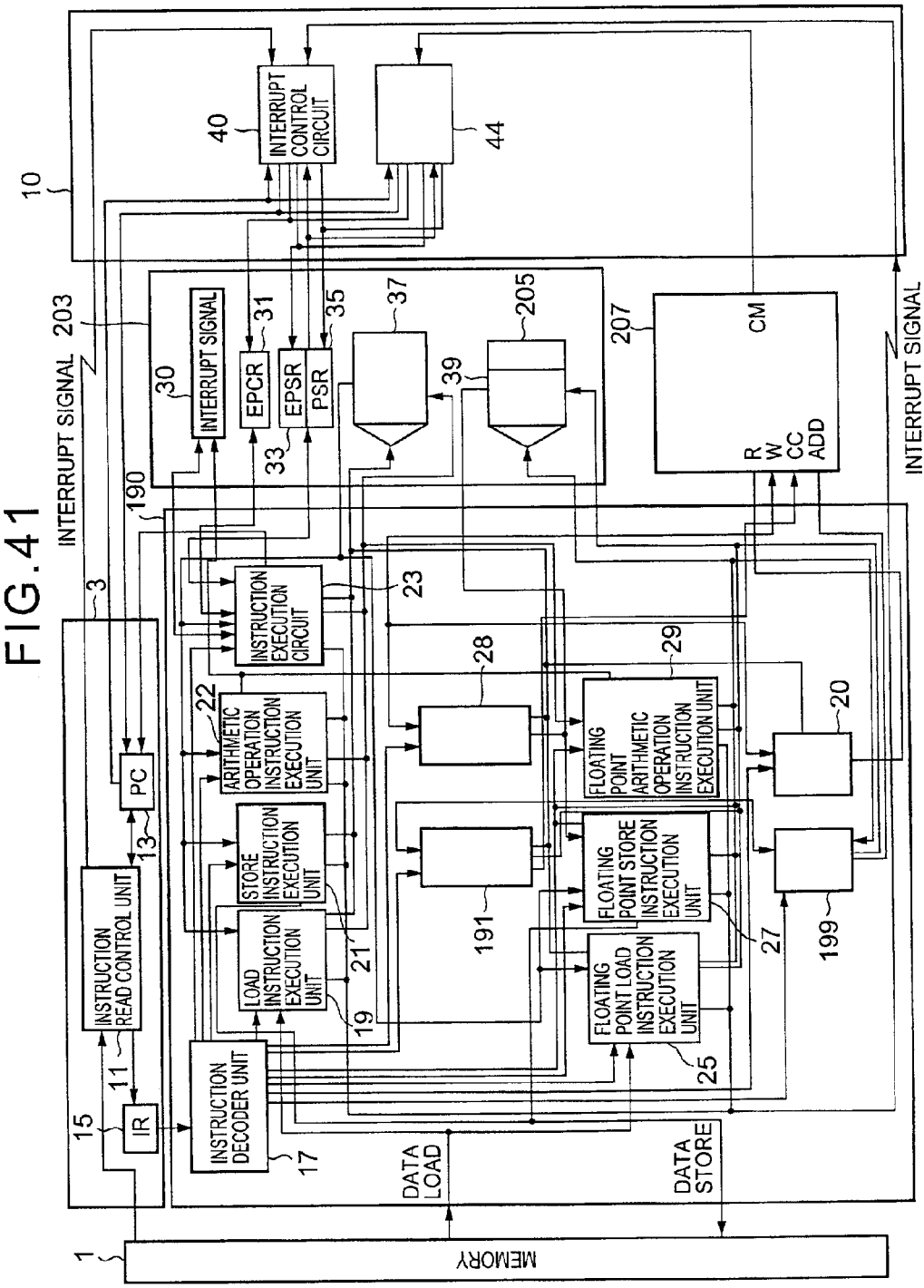
FIG. 41 shows the structure of a processor in accordance with an eighth embodiment of the present invention.

FIG. 41 shows the structure of a processor of an eighth embodiment of the present invention. As shown in FIG. 41, the processor of this embodiment has the same structure as the processor of the seventh embodiment shown in FIG. 35, except that an instruction execution unit 190 comprises the floating point load instruction execution unit 25, the floating point store instruction execution unit 27, the floating point arithmetic operation instruction execution unit 29, a floating point commit instruction execution unit 191, and an exception inhibiting/floating point arithmetic operation instruction execution unit 199. A history control unit 207 of this embodiment has a different structure from the history control unit 173 of the seventh embodiment. Furthermore, a register control unit 203 further comprises the floating point register 39 and an exception inhibiting flag 205.

The floating point load instruction execution unit 25 is connected to the memory 1, the instruction decoder unit 17, and the general register 37. The floating point store instruction execution unit 27 and the floating point arithmetic operation instruction execution unit 29 is connected to the instruction decoder unit 17 and the floating point register 39. The floating point store instruction execution unit 27 is connected to the general register 37. The floating point arithmetic operation instruction execution unit 29 is connected to the condition register 30. The floating point load instruction execution unit 25, the floating point store instruction execution unit 27, and the floating point arithmetic operation instruction execution unit 29 are connected to the interrupt control circuit 40.

The floating point commit instruction execution unit 191 is connected to the instruction decoder unit 17, the exception inhibiting/floating point arithmetic operation instruction execution unit 199, the history control unit 207, the floating point store instruction execution unit 27, and the floating point register 39. The exception inhibiting/floating point arithmetic operation instruction execution unit 199 is also connected to the instruction decoder unit 17, the floating point register 39, and the history control unit 207.

When receiving a floating point load instruction, the floating point load instruction execution unit 25 reads out data form the region in the memory 1 corresponding to an effective address determined based on a value read out from the general register, and writes the data into the floating point register 39. When an interrupt is detected at the time of executing the floating point load instruction, the floating point load instruction execution unit 25 supplies an interrupt signal to the interrupt control circuit 40.

When receiving a floating point store instruction, the floating point store instruction execution unit 27 reads out data from the region in the floating point register 39 corresponding to an effective address determined based on the value read out from the general register 37, and writes the data into the region in the memory 1 corresponding to the effective address. If an interrupt is detected at the time of executing the floating point store instruction, the floating point store instruction execution unit 27 supplies an interrupt signal to the interrupt control circuit 40.

When receiving a floating point arithmetic operation instruction, the floating point arithmetic operation instruction execution unit 29 performs an arithmetic operation based on a value read out from the floating point register 39, and writes the operation result into the floating point register 39.

When receiving an exception inhibiting/floating point arithmetic operation from the instruction decoder unit 17, the exception inhibiting/floating point arithmetic instruction execution unit 199 performs a floating point arithmetic operation based on a value read out from the floating point register 39, and writes the operation result into the floating point register 39. If an interrupt is detected at the time of instruction execution, the exception inhibiting/floating point arithmetic operation instruction execution unit 199 puts "1" into the exception inhibiting flag 205 corresponding to the register number of a write register in the floating point register 39. The exception inhibiting/floating point arithmetic operation instruction execution unit 199 supplies a registration command signal to the history control unit 207, and stores exception information into the history control unit 207.

When receiving a floating point commit instruction from the instruction decoder unit 17, the floating point commit instruction execution unit 191 sets the exception inhibiting flag 205 at "0" and supplies a confirmation command signal to the history control unit 207, if the exception inhibiting flag 205 corresponding to the register number of a designated register in the floating point register 39 is "1". By doing so, a commit signal CM is supplied from the history control unit 207 to the interrupt control unit 10, so that the interrupt control unit 10 is notified of the generation of the commit exception. The bits in the exception inhibiting flag 205 are arranged for the entries in the floating point register 39.

Figure 42:
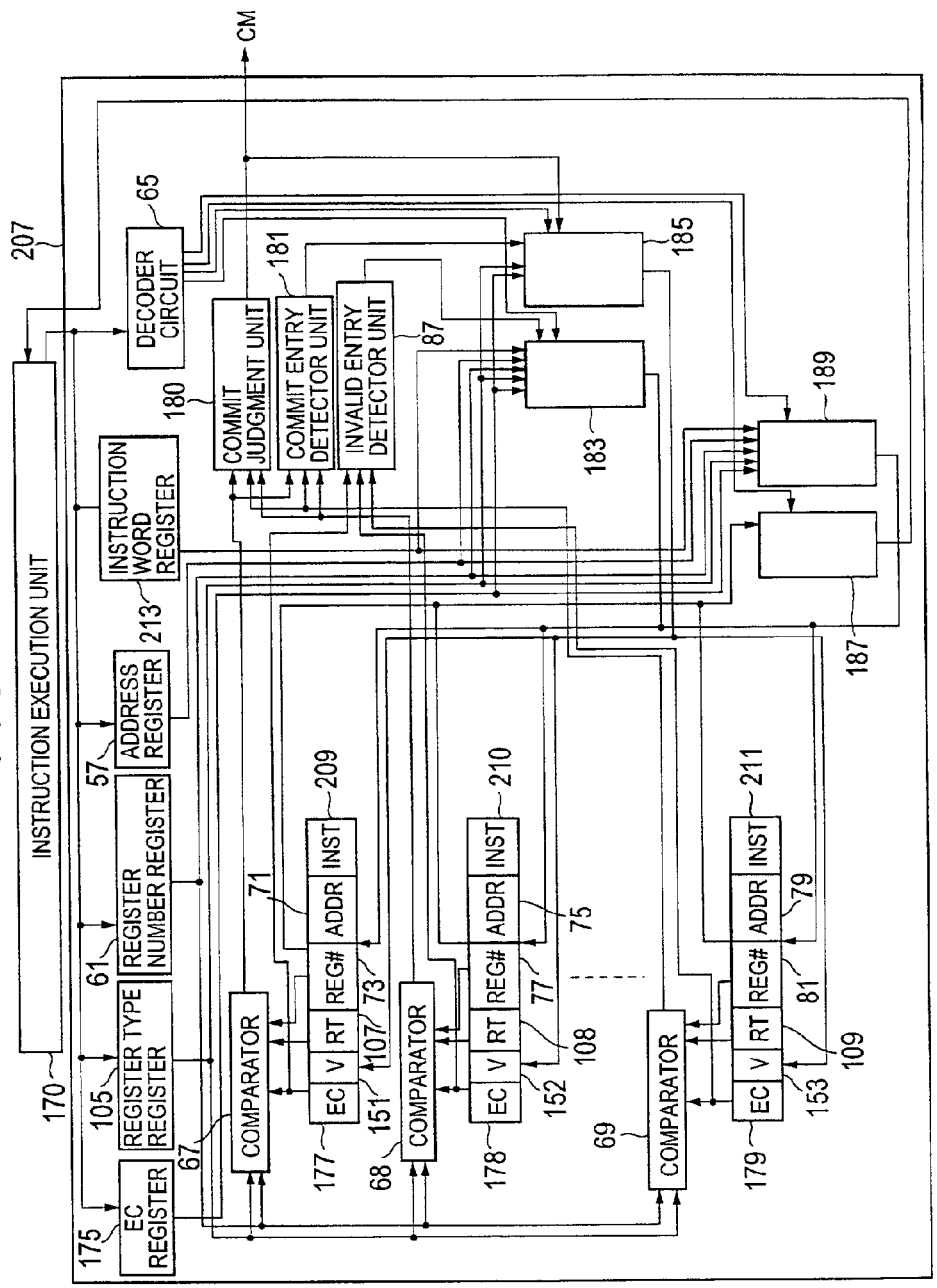
FIG. 42 shows the structure of a history control unit shown in FIG. 41.

FIG. 42 shows the structure of the history control unit 207 shown in FIG. 41. As shown in FIG. 42, the history control unit 207 has the same structure as the history control unit 173 shown in FIG. 36, except that the history control unit 207 further comprises an instruction word register 213, and that each entry includes instruction word fields 209 to 211 that represent an instruction word of an exception start instruction that starts an exception operation.

The input terminal of the instruction word register 213 is connected to the instruction execution unit 170, while its output terminal is connected to the exception inhibiting history registration control unit 183 and the exception inhibiting history write instruction execution unit 189. The instruction word register 213 holds an instruction word of an exception start instruction supplied from the instruction execution unit 170. The exception inhibiting history write instruction execution unit 189 writes the value indicating the above instruction word in the instruction word fields 209 to 211.

The exception inhibiting history read instruction execution unit 187 reads out the value indicating the instruction word from the instruction word fields 209 to 211, and supplies the value to the instruction execution unit 170.

Figure 43:
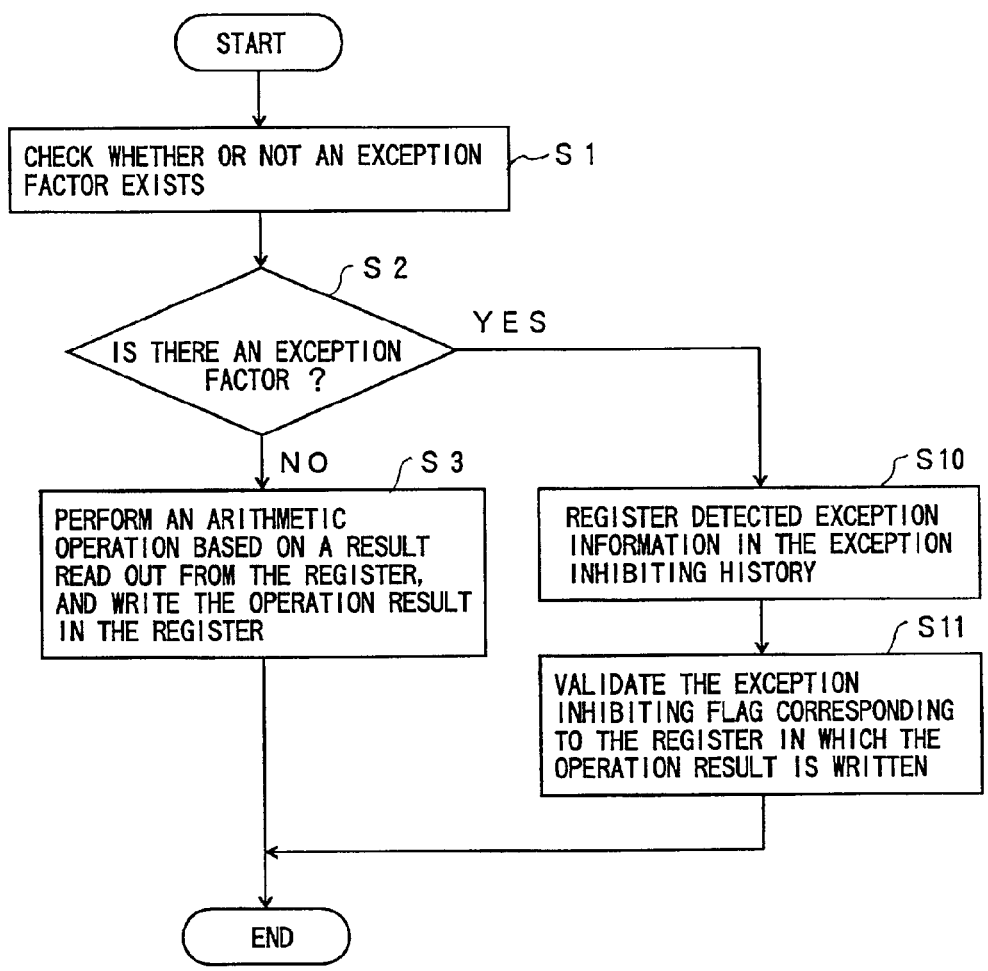
FIG. 43 is a flowchart showing an operation in accordance with an exception inhibiting floating point arithmetic operation instruction.

FIG. 43 is a flowchart showing an operation in accordance with an exception inhibiting/floating point arithmetic operation instruction. As shown in FIG. 43, it is determined whether or not an exception factor exists in the read data in step S1. If it is determined that there is no exception factor in step S2, the operation moves on to step S3, in which an arithmetic operation is performed based on the read data, and the operation result is written in the floating point register 39.

If it is determined that there is an exception factor in step S2, the operation moves on to step S10, in which a registration command signal is supplied to the history control unit 207, thereby registering exception information such as the detected instruction word in the history control unit 207. In step S11, the exception inhibiting flag 205 corresponding to a register in which the exception information is written is set at "1" and thus validated.

In accordance with the eighth embodiment, an exception start instruction word is held as exception information, and after the exception operation, the main operation is resumed sequentially from the exception start instruction. Thus, the same effects as with the processor of the seventh embodiment can be achieved, and the operation reliability can be increased.

[Ninth Embodiment]

Figure 44:
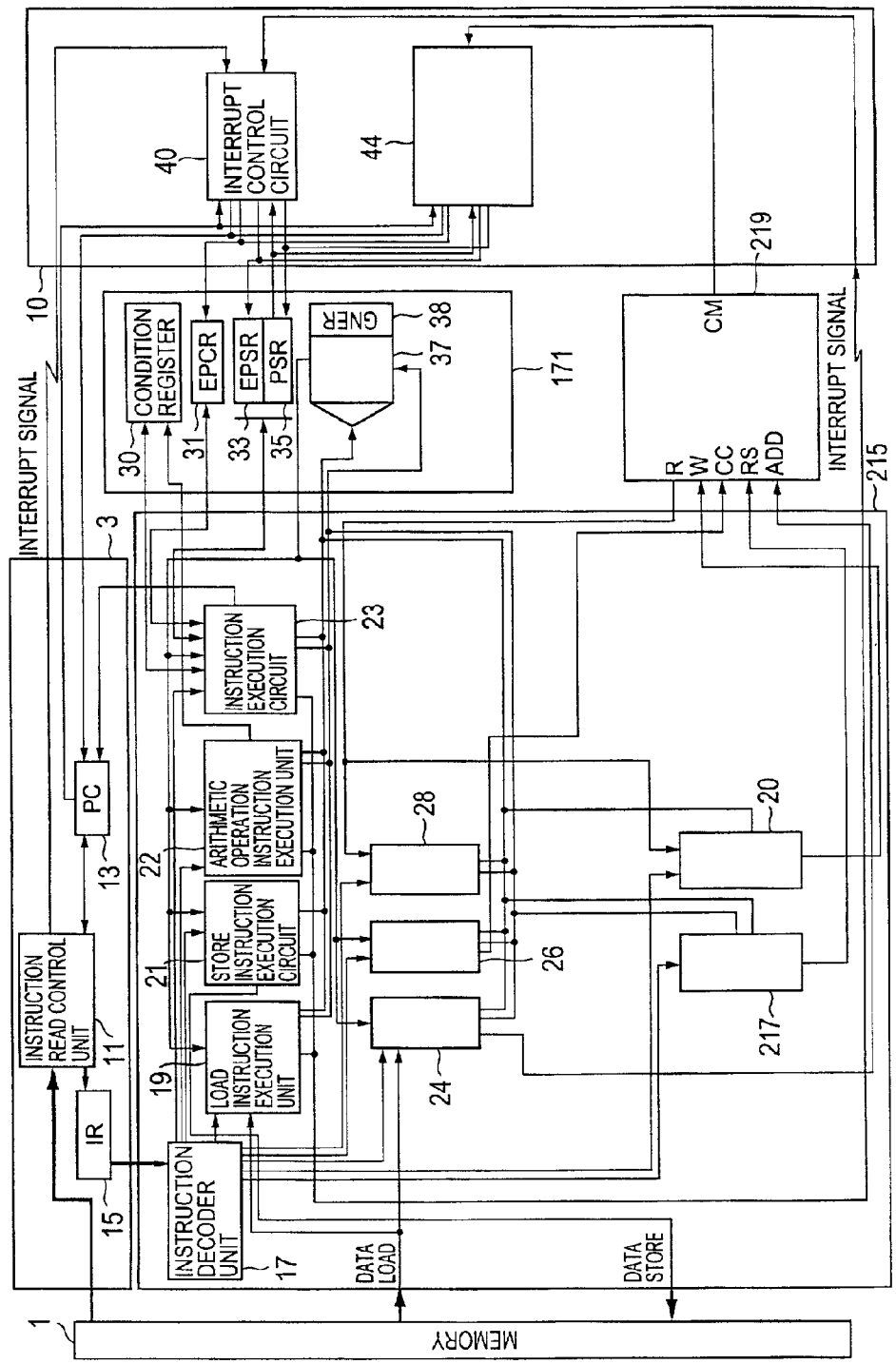
FIG. 44 shows the structure of a processor in accordance with a ninth embodiment of the present invention.
Figure 45:
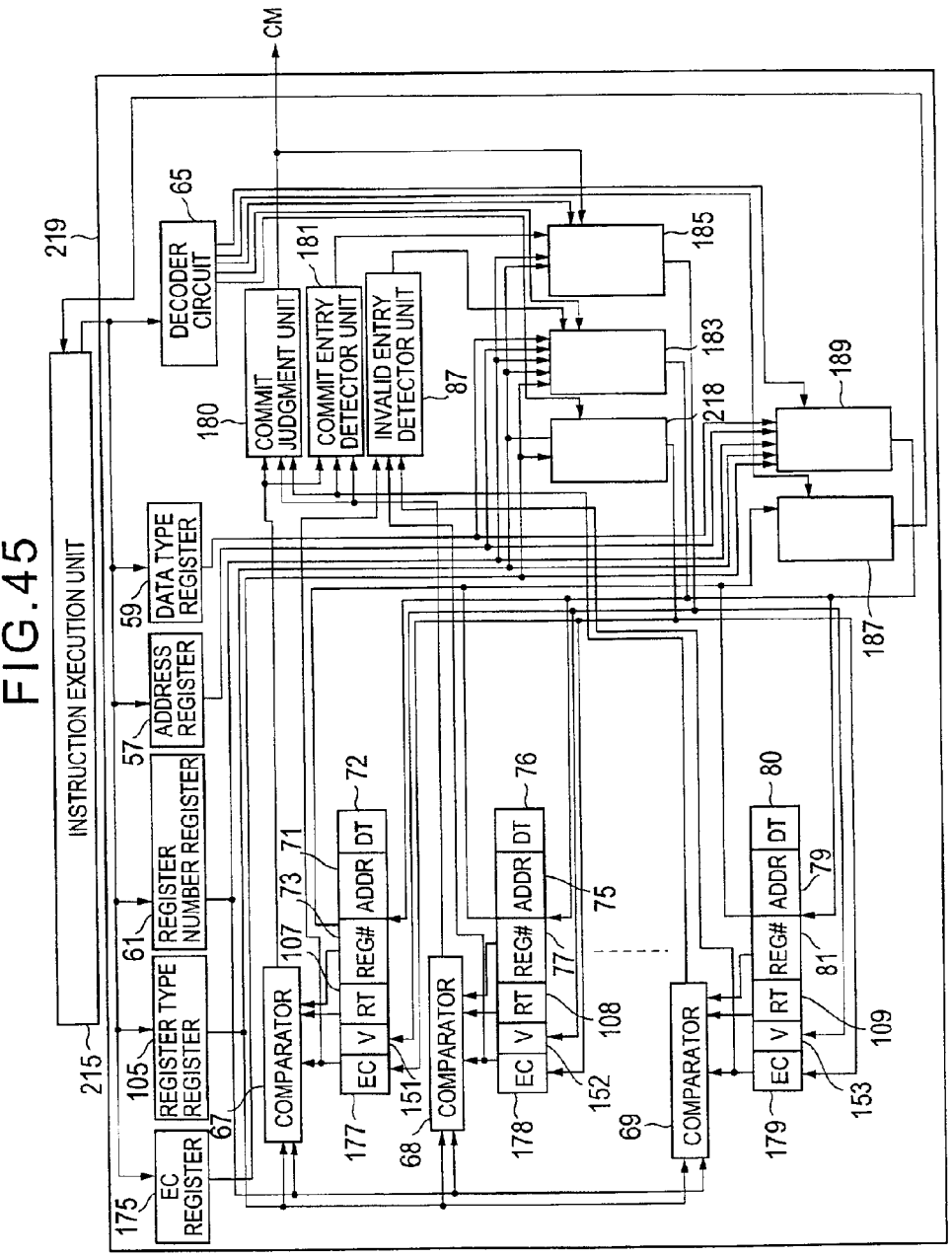
FIG. 45 shows the structure of a history control unit shown in FIG. 44.

FIG. 44 shows the structure of a processor in accordance with a ninth embodiment of the present invention. As shown in FIG. 44, the processor of this embodiment has the same structure as the processor of the seventh embodiment shown in FIG. 35, except that an instruction execution unit 215 further comprises an exception inhibiting history nullifying control unit 217, and that a history control unit 219 includes a history table nullifying unit 218, as shown in FIG. 45.

Here, the input terminal of the exception inhibiting history nullifying control unit 217 is connected to the instruction decoder unit 17, while its output terminal is connected to the general register 37 and the history control unit 219.

Figure 46:
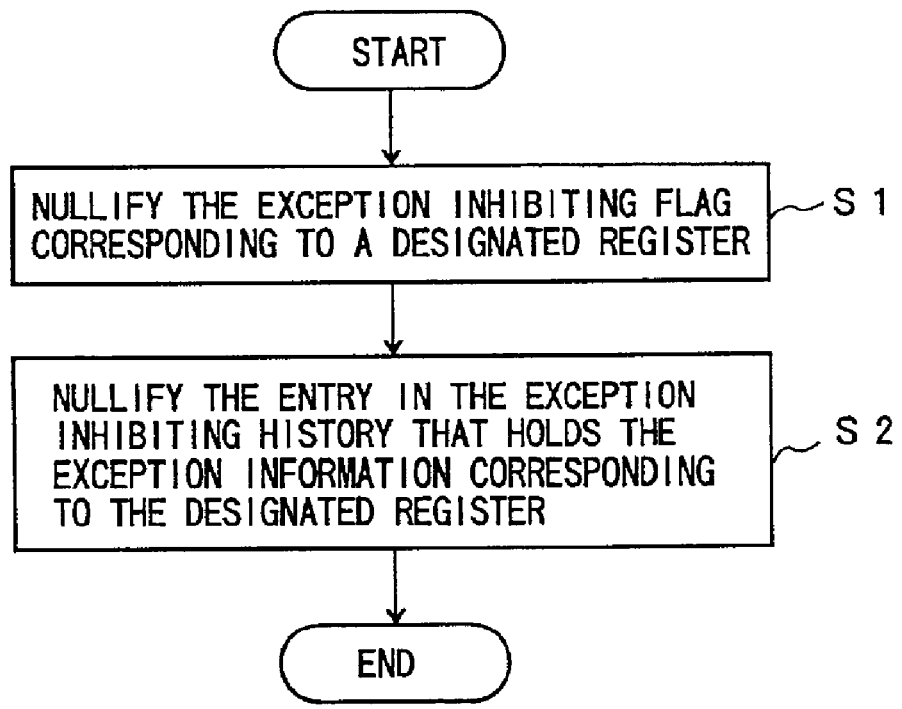
FIG. 46 is a flowchart showing an operation in accordance with an exception inhibiting flag nullifying instruction.

When receiving an exception inhibiting flag nullifying instruction, the exception inhibiting history nullifying control unit 217 nullifies the exception inhibiting flag 38 corresponding to a designated register, as shown in step S1 of FIG. 46. In step S2, if the exception information corresponding to the register number of the designated register is stored, a reset signal RS for nullifying an entry that holds the exception information is supplied to the history control unit 219.

In accordance with the reset signal RS, the history table nullifying unit 218 in the history control unit 219 nullifies the entry of the history table that holds the exception information corresponding to the designated register by nullifying the EC fields of the entry.

With the processor of this embodiment, the same effects as with the processor of the seventh embodiment can be obtained. Also, the exception inhibiting flag nullifying instruction is executed so as to nullify the exception inhibiting flag. Thus, a plurality of speculative instructions can be moved, and the operation speed can be increased.

[Tenth Embodiment]

Figure 47:
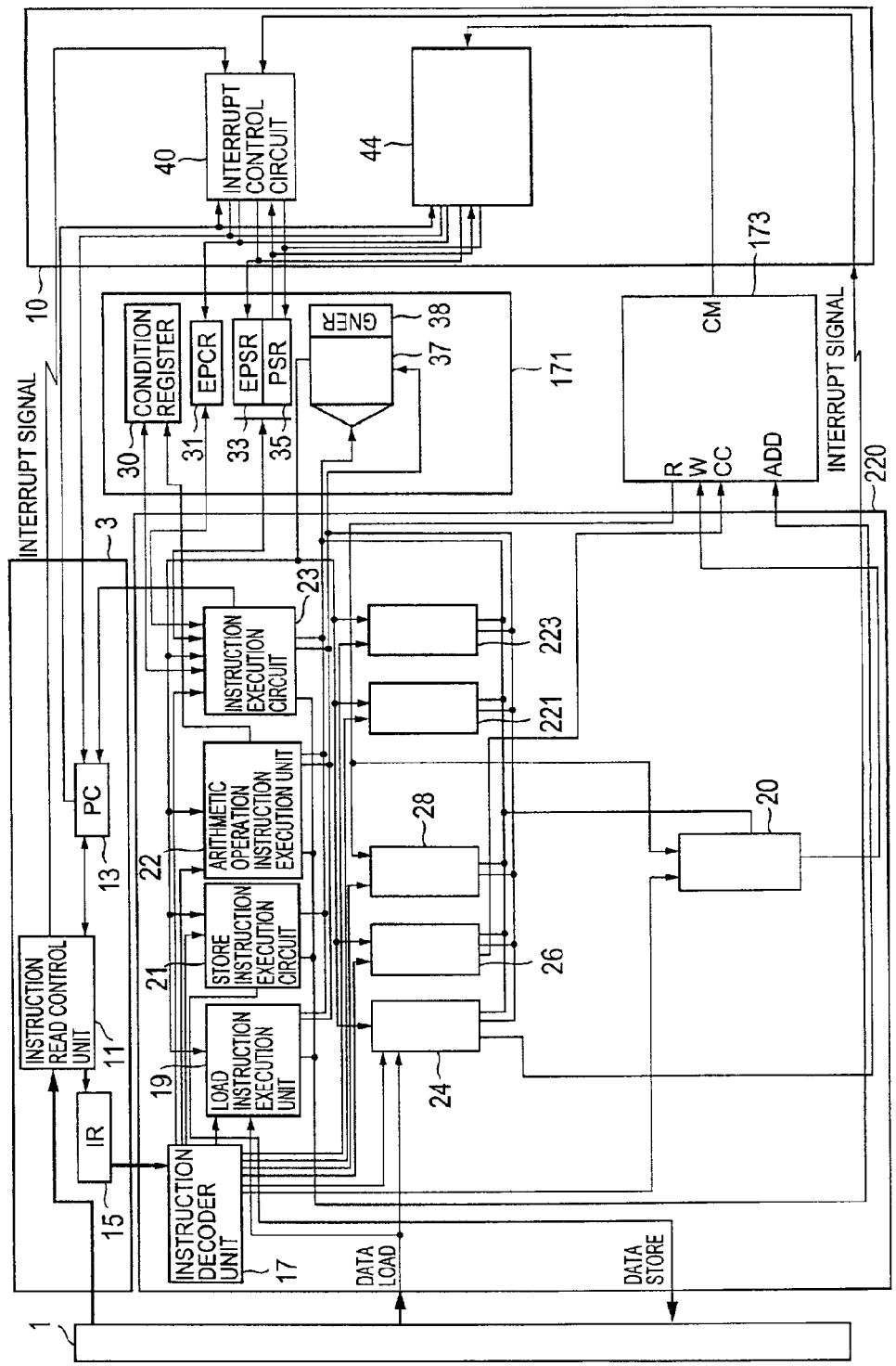
FIG. 47 shows the structure of a processor in accordance with a tenth embodiment of the present invention.

FIG. 47 shows the structure of a processor in accordance with a tenth embodiment of the present invention. As shown in FIG. 47, the processor of this embodiment has the same structure as the processor of the seventh embodiment shown in FIG. 35, except that an instruction execution unit 220 further comprises an exception inhibiting flag read instruction execution unit 221 and an exception inhibiting flag write instruction execution unit 223.

The exception inhibiting flag read instruction execution unit 221 and the exception inhibiting flag write instruction execution unit 223 are both connected to the instruction decoder unit 17 and the general register 37 at the input terminals, and only to the general register at the output terminals.

In response to an exception inhibiting flag read instruction supplied from the instruction decoder unit 17, the exception inhibiting flag read instruction execution unit 221 reads out the value of the exception inhibiting flag 38, and writes the value into the general register 37. On the other hand, in response to an exception inhibiting flag write instruction execution unit 223, the exception inhibiting flag write instruction execution unit 223 reads out data from the general register 37, and writes the data into the exception inhibiting flag 38.

With the processor of this embodiment, the same effects as the processor of the seventh embodiment can be obtained, and the value of the exception inhibiting flag 38 can be saved in the general register 37. Thus, superimposed speculative instruction movement can be realized, and the operation speed can be increased.

[Eleventh Embodiment]

Figure 48:
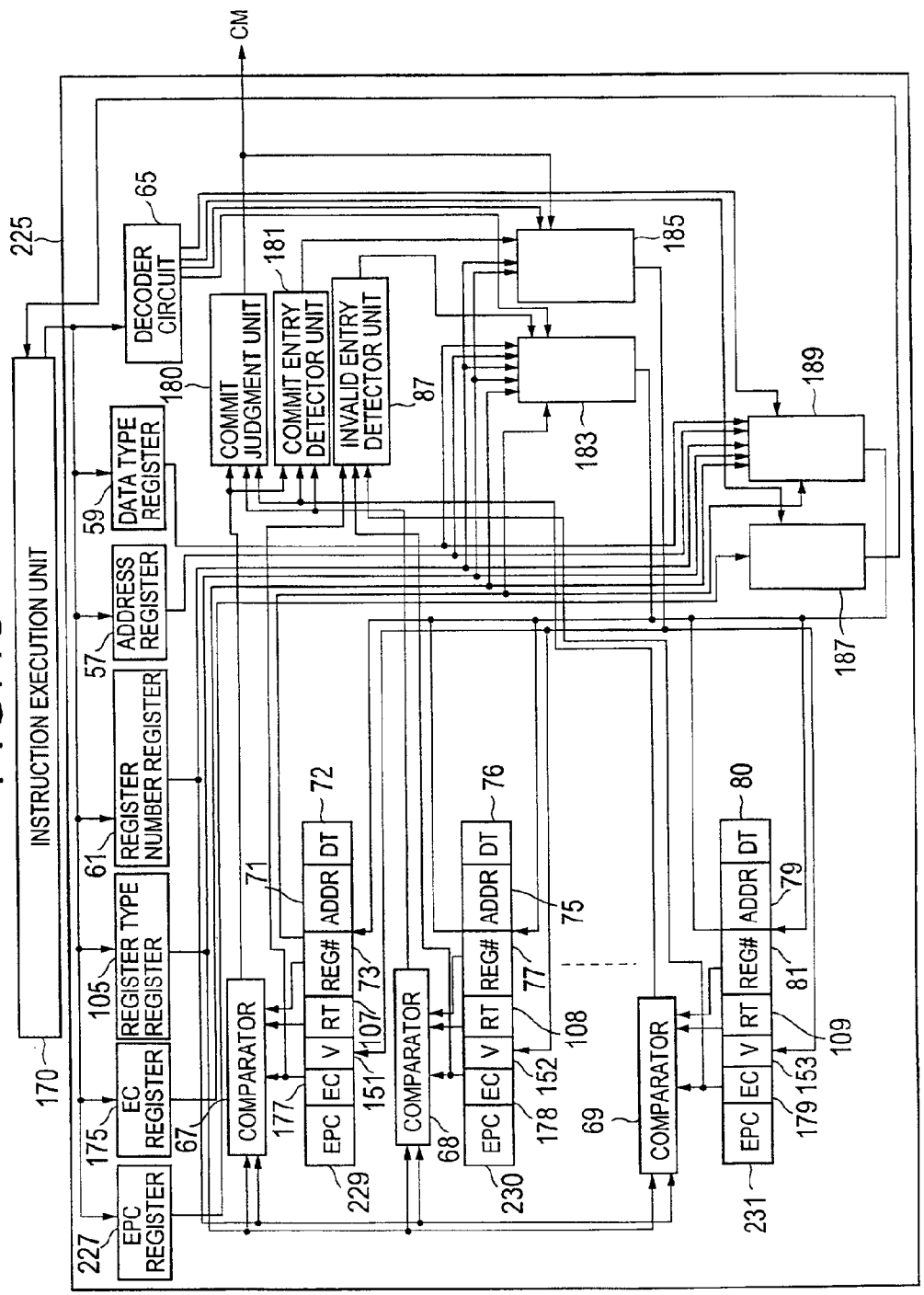
FIG. 48 shows the structure of a history control unit of a processor in accordance with an eleventh embodiment of the present invention.

A processor in accordance with an eleventh embodiment of the present invention has the same structure as the processor of the seventh embodiment shown in FIG. 35, except the structure of the history control unit. FIG. 48 shows the structure of a history control unit 225 of the eleventh embodiment. The history control unit 225 has the same structure as the history control unit 173 of the seventh embodiment shown in FIG. 36, except that the history control unit 225 further comprises an exception PC register (EPC register) 227, and that each of the entries constituting the exception inhibiting history table includes EPC fields 229 to 231.

The input terminal of the exception PC register 227 is connected to the instruction execution unit 170, while the output terminal of the exception PC register 227 is connected to the exception inhibiting history registration control unit 183 and the exception inhibiting history write instruction execution unit 189. The exception PC register 227 holds the instruction address of an exception inhibiting load instruction that is an exception start instruction. The instruction address of an exception start instruction is recorded in each corresponding one of the EPC fields 229 to 231.

Figure 49:
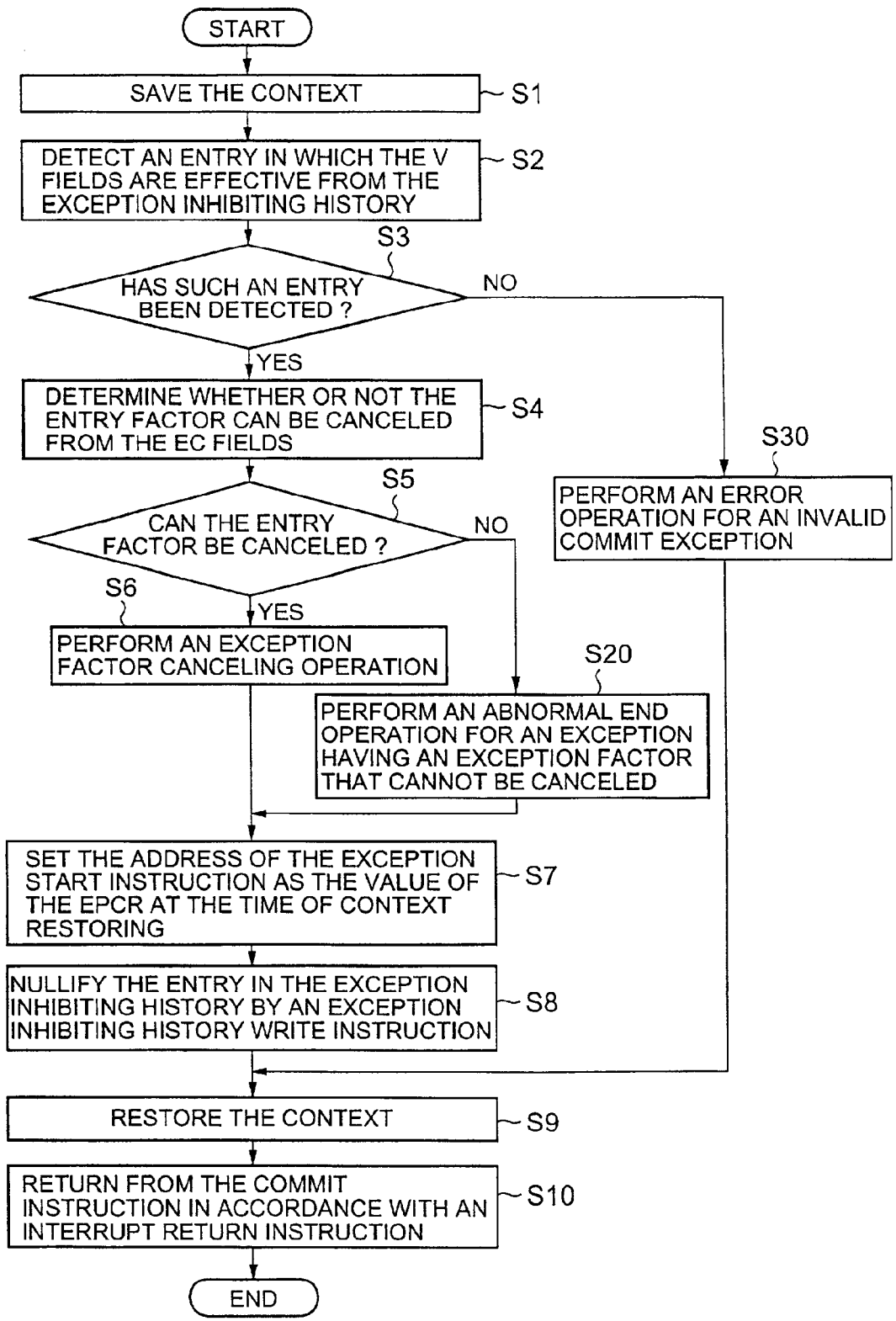
FIG. 49 is a flowchart showing an interrupt operation in a commit exception.

FIG. 49 is a flowchart showing an interrupt operation in a commit exception caused in the processor of the eleventh embodiment. In step S1, the context is saved. In step S2, an entry in which the V fields are effective is detected on the exception inhibiting history table. In step S3, it is determined whether or not an effective entry has been detected. If no effective entry has been detected, the operation moves on to step S30, in which the commit exception is determined to be invalid and handled as an error. The operation then moves on to step S9.

On the other hand, if an effective entry has been detected in step S3, the operation advances to step S4, in which it is determined whether or not the exception factor can be canceled. If the exception factor cannot be canceled, the operation moves on to step S20, in which an abnormal end operation is performed. The operation then moves on to step S7.

If it is determined that the exception factor can be canceled in step S5, the operation advances to step S6, in which an exception factor canceling operation is performed. In step S7, the instruction address of an exception start instruction is set as the value of the register 31 at the time of context restoring. In step S8, in accordance with an exception inhibiting history write instruction, the entry in the exception inhibiting history table is nullified.

In step S9, the context in the main operation is restored. In step S10, in response to an interrupt return instruction, the operation returns from the commit exception.

As described above, with the processor of this embodiment, the same effects as with the processor of the seventh embodiment can be achieved. Since the instruction address of an exception start instruction is stored in the exception inhibiting history table, the operation returns to the exception start instruction after the cancellation of the exception factor. Thus, the main operation can be surely continued.

[Twelfth Embodiment]

Figure 50:
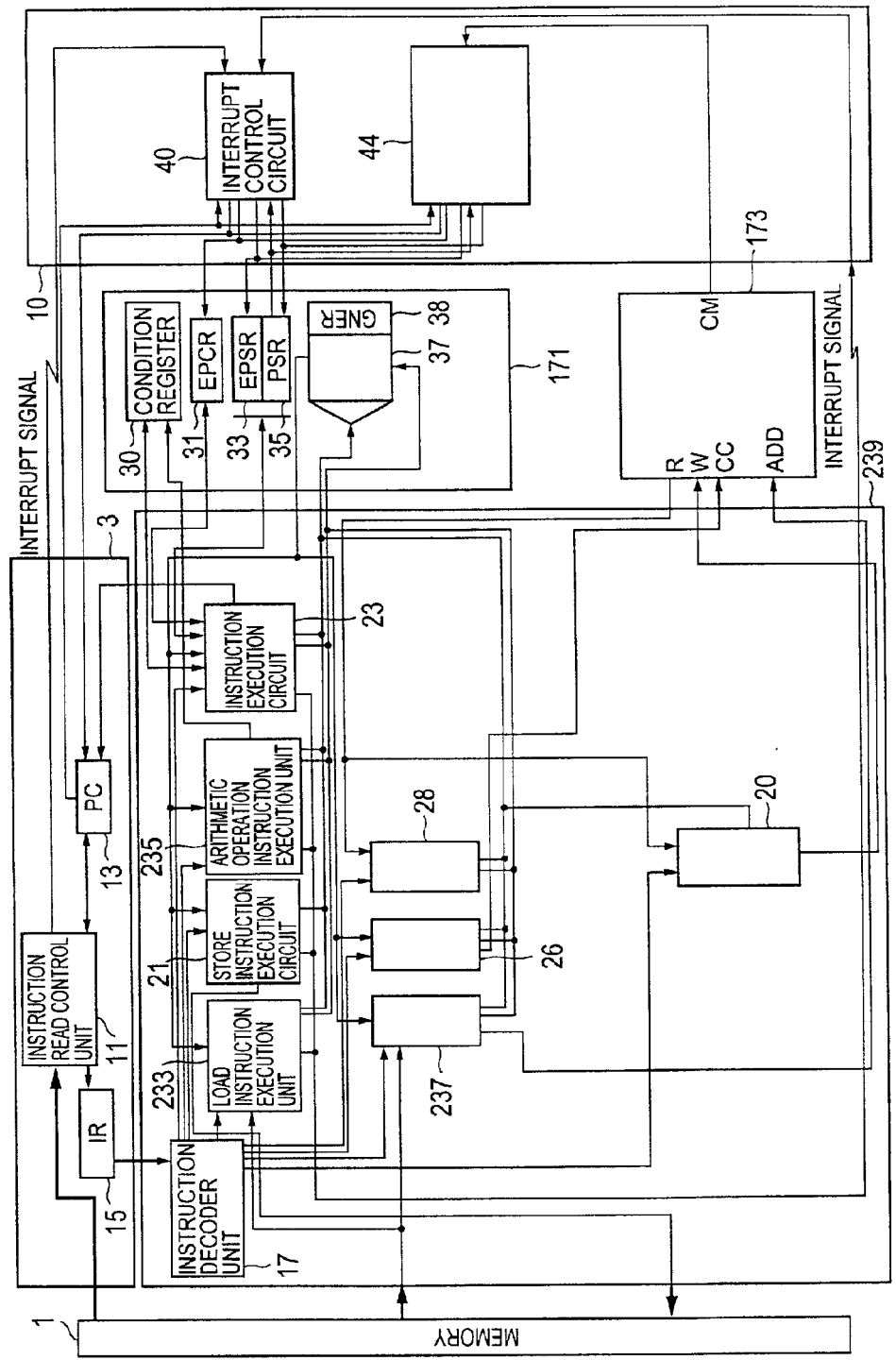
FIG. 50 shows the structure of a processor in accordance with a twelfth embodiment of the present invention.

FIG. 50 shows the structure of a processor in accordance with a twelfth embodiment of the present invention. As shown in FIG. 50, the processor of this embodiment has the same structure as the processor of the seventh embodiment shown in FIG. 35, except that the structures of a load instruction execution unit 233, an arithmetic operation instruction execution unit 235, and an exception inhibiting load instruction execution unit 237 in an instruction execution unit 239 are different from those in the instruction execution unit 170 shown in FIG. 35.

Figure 51:
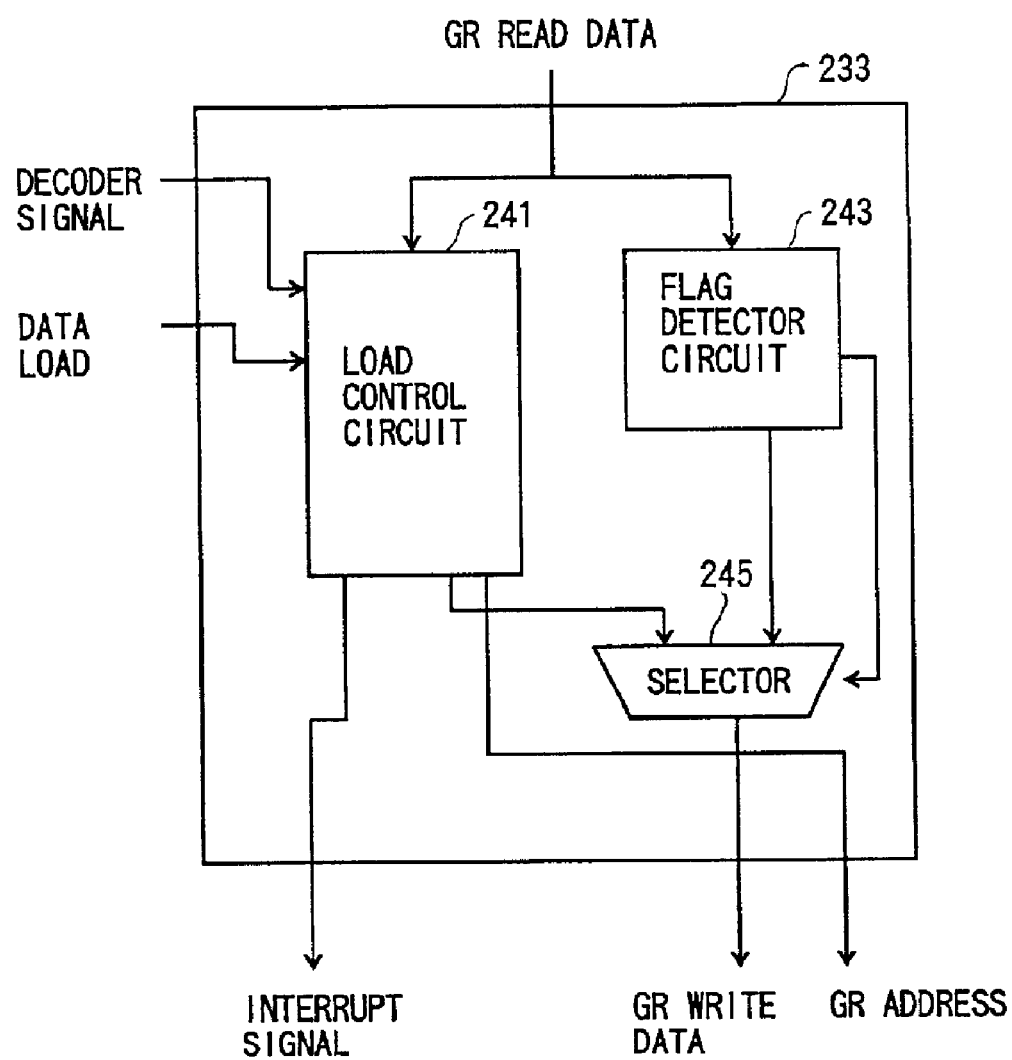
FIG. 51 shows the structure of a load instruction execution unit shown in FIG. 50.

FIG. 51 shows the structure of a load instruction execution unit 233 shown in FIG. 50. As shown in FIG. 51, the load instruction execution unit 233 comprises a load control circuit 241, a flag detector circuit 243, and a selector 245. The input terminal of the load control circuit 241 is connected to the instruction decoder unit 17, the memory 1, and the general register 37. The output terminal of the load control circuit 241 is connected to the interrupt control circuit 40, the general register 37, and the selector 245. The input terminal of the flag detector circuit 243 is connected to the general register, while its output terminal is connected to the selector 245. The output terminal of the selector 245 is connected to the general register.

Figure 53:
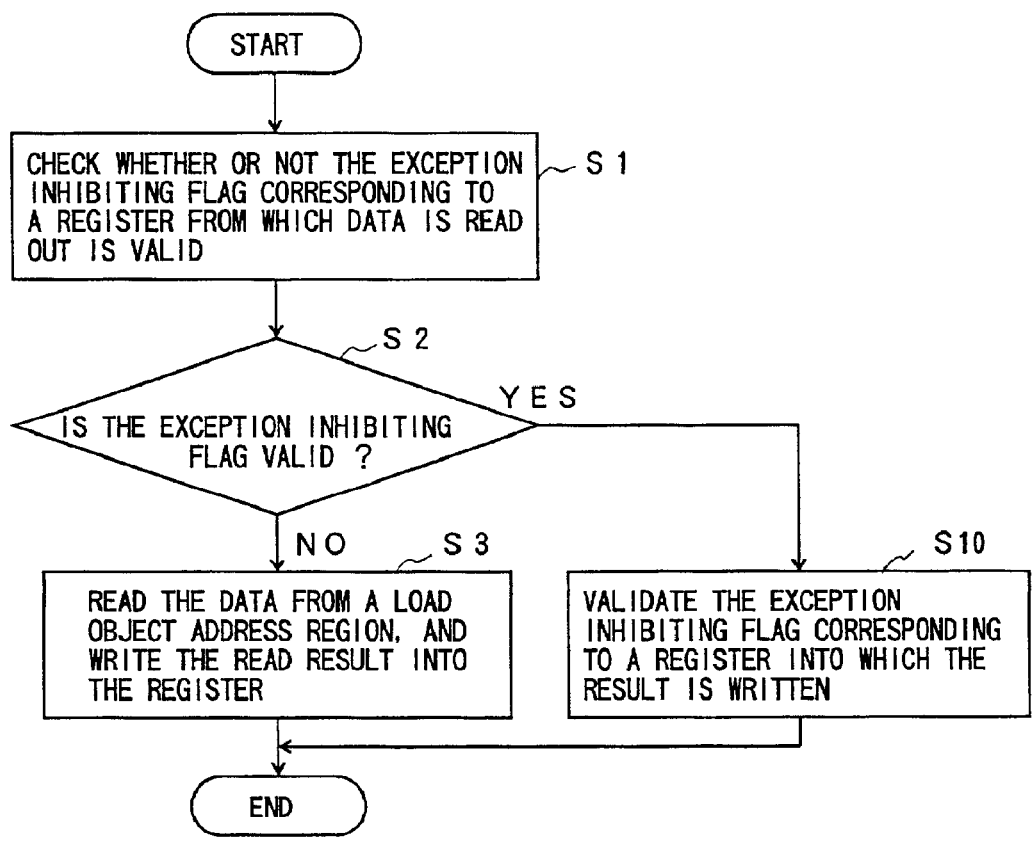
FIG. 53 is a flowchart showing an operation in accordance with a load instruction in the twelfth embodiment.

FIG. 53 is a flowchart showing an operation of the load instruction execution unit having the above structure. In step S1, the flag detector circuit 243 determines whether or not the exception inhibiting flag 38 corresponding to the register from which data is read out is effective in accordance with GR read data. If the exception inhibiting flag 38 is determined to be invalid, the operation advances to step S3, in which data supplied from the load control circuit 241 is selectively outputted as GR write data from the selector 245 to the general register 37.

The GR read data is made up of data read out from the general register 37 and the value of the exception inhibiting flag 38 corresponding to the data.

On the other hand, if the flag detector circuit 243 determines that the exception inhibiting flag 38 corresponding to the register, from which data is read out, is effective in step S2, the operation moves on to step S10, in which a signal that validates the exception inhibiting flag 38 corresponding to a data write register is supplied from the flag detector circuit 243 and selectively outputted through the selector 245.

Figure 52:
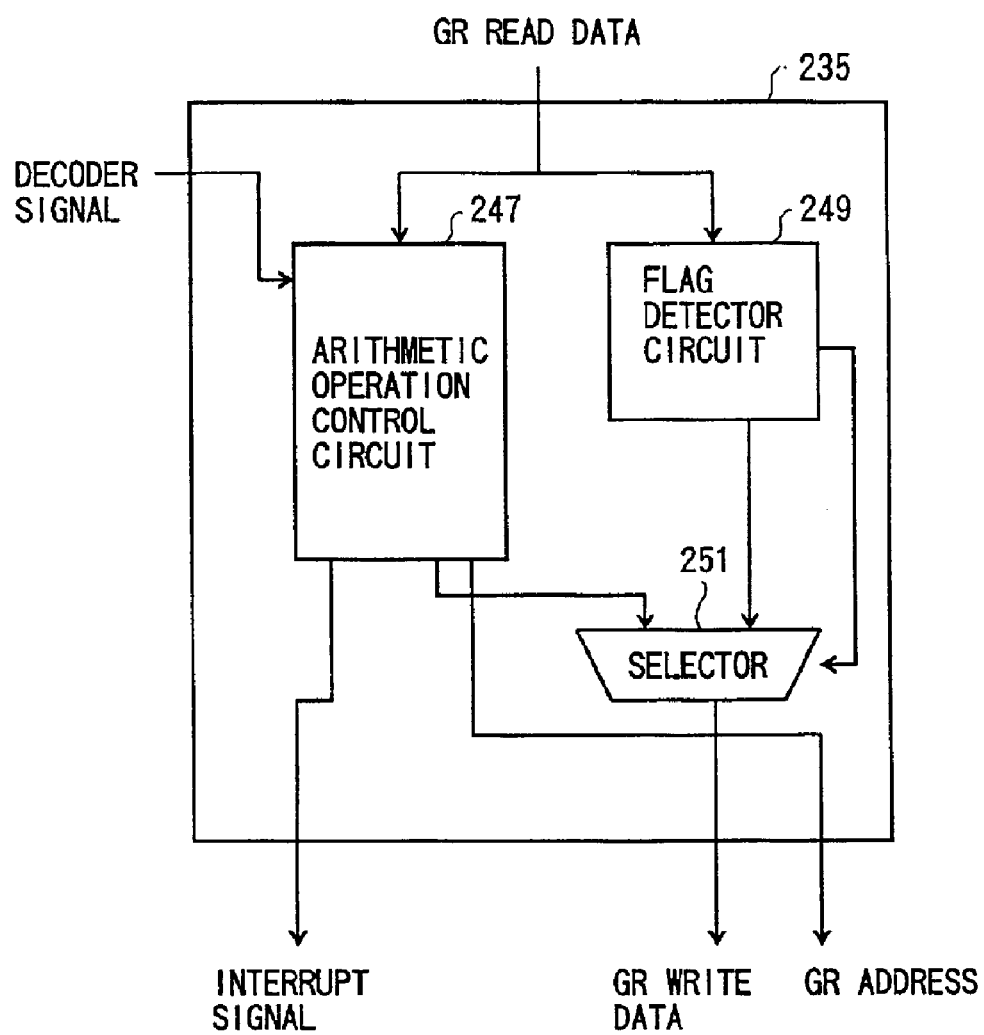
FIG. 52 shows the structure of an arithmetic operation instruction execution unit shown in FIG. 50.

FIG. 52 shows the structure of the arithmetic operation instruction execution unit 235 shown in FIG. 50. As shown in FIG. 52, the arithmetic operation instruction execution unit 235 comprises an arithmetic operation control circuit 247, a flag detector circuit 249, and a selector 251. The input terminal of the arithmetic operation control circuit 247 is connected to the instruction decoder unit 17 and the general register 37. The output terminal of the arithmetic operation control circuit 247 is connected to the interrupt control circuit 40, the general register 37, and the selector 251. The input terminal of the flag detector circuit 249 is connected to the general register 37, while its output terminal is connected to the selector 251. The output terminal of the selector 251 is connected to the general register 37.

Figure 54:
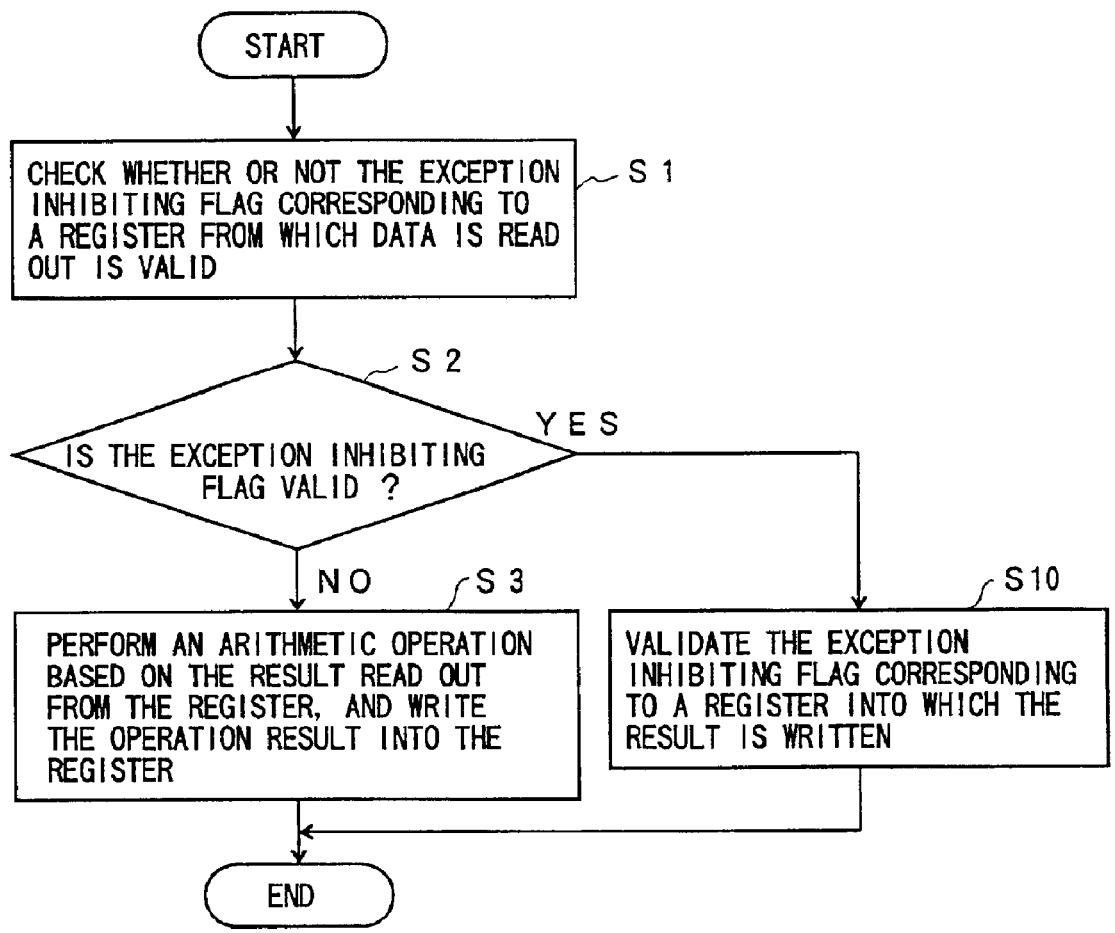
FIG. 54 is a flowchart showing an operation in accordance with an arithmetic operation instruction in the twelfth embodiment.

FIG. 54 is a flowchart showing an operation by the arithmetic operation instruction execution unit 235 having the above structure. In step S1, the flag detector circuit 243 determines whether or not the exception inhibiting flag 38 corresponding to a register from which data is read is effective, in accordance with the GR read data. If the exception inhibiting flag 38 is determined to be invalid in step S2, the operation advances to step S3, in which data supplied from the arithmetic operation control circuit 247 is selectively outputted as the GR write data from the selector 251 to the general register 37.

On the other hand, if the exception inhibiting flag 38 is determined to be effective in step S2, the operation moves on to step S10, in which a signal for validating the exception inhibiting flag 38 corresponding to a data write register is supplied from the flag detector circuit 243 and selectively outputted from the selector 251.

Figure 55:
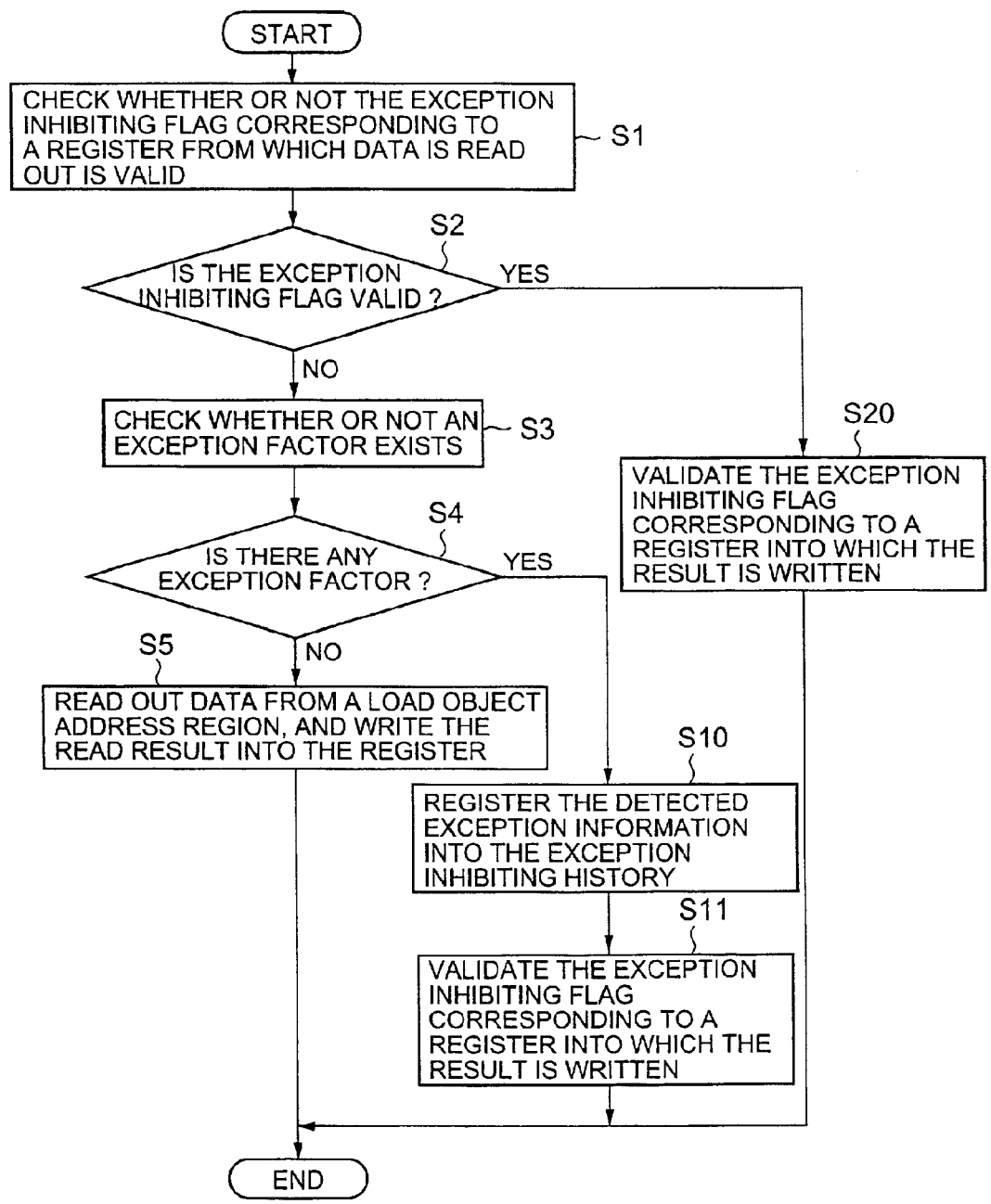
FIG. 55 is a flowchart showing an operation in accordance with an exception inhibiting load instruction in the twelfth embodiment.

The structure of and the operation by the exception inhibiting load instruction execution unit 237 of this embodiment are the same as the structures of and the operations by the load instruction execution unit 233 and the arithmetic operation instruction execution unit 235. FIG. 55 is a flowchart of the operation by the exception inhibiting load instruction execution unit 237 of this embodiment.

As shown in FIG. 55, in step S1, it is determined whether or not the exception inhibiting flag 38 corresponding to a data read register is effective, in accordance with the GR read data. If the exception inhibiting flag 38 is determined to be invalid in step S2, the operation advances to step S3, in which it is determined whether or not an exception factor exists in the read data.

On the other hand, if the exception inhibiting flag 38 corresponding to the data read register is determined to be effective in step S2, the operation moves on to step S20, in which a signal for validating the exception inhibiting flag 38 corresponding to a write register is outputted.

If it is determined that there is no exception factor in step S4, the operation advances to step S5, in which the data read out from a load object address region is written in the general register 37.

On the other hand, if it is determined that there is an exception factor in step S4, the operation moves on to step S10, in which a registration command signal is supplied to the history control unit 173, thereby registering the detected exception information in to the history control unit 173. In step S11, the exception inhibiting flag 38 corresponding to the register, in which the exception information is stored, is set at "1" and thus validated.

As described so far, if the exception inhibiting flag 38 corresponding to a register from which data is read out is effective, the exception inhibiting flag 38 corresponding to a register into which the execution result is written is also validated. Accordingly, the effective information of the exception inhibiting flag 38 can be propagated, and instructions depending on speculatively moved instructions can be moved. Thus, more freedom can be allowed in movement of speculative instructions, and the operation speed can be further increased.

[Thirteenth Embodiment]

Figure 8:
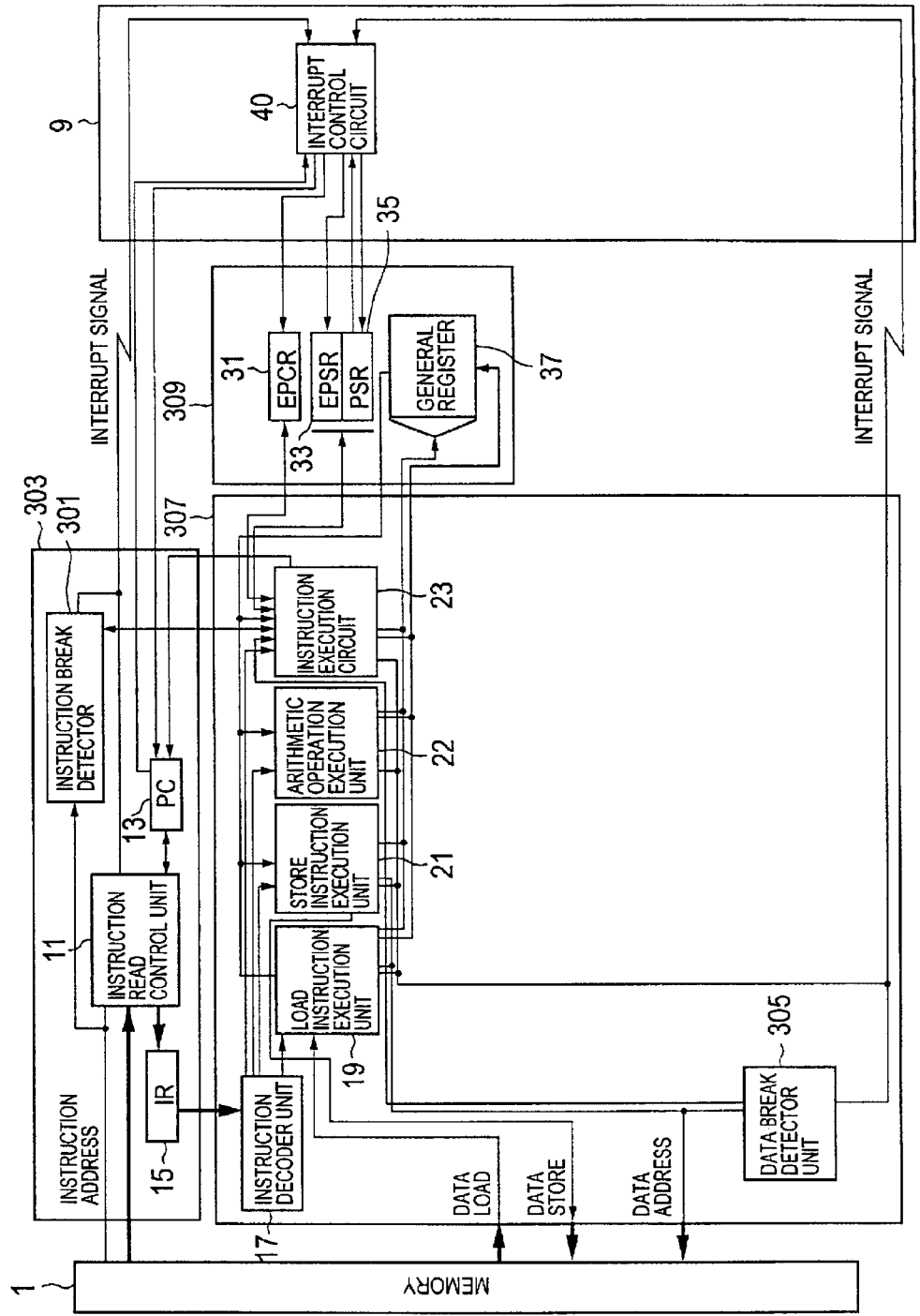
FIG. 8 shows a third example of the conventional processor.
Figure 9:
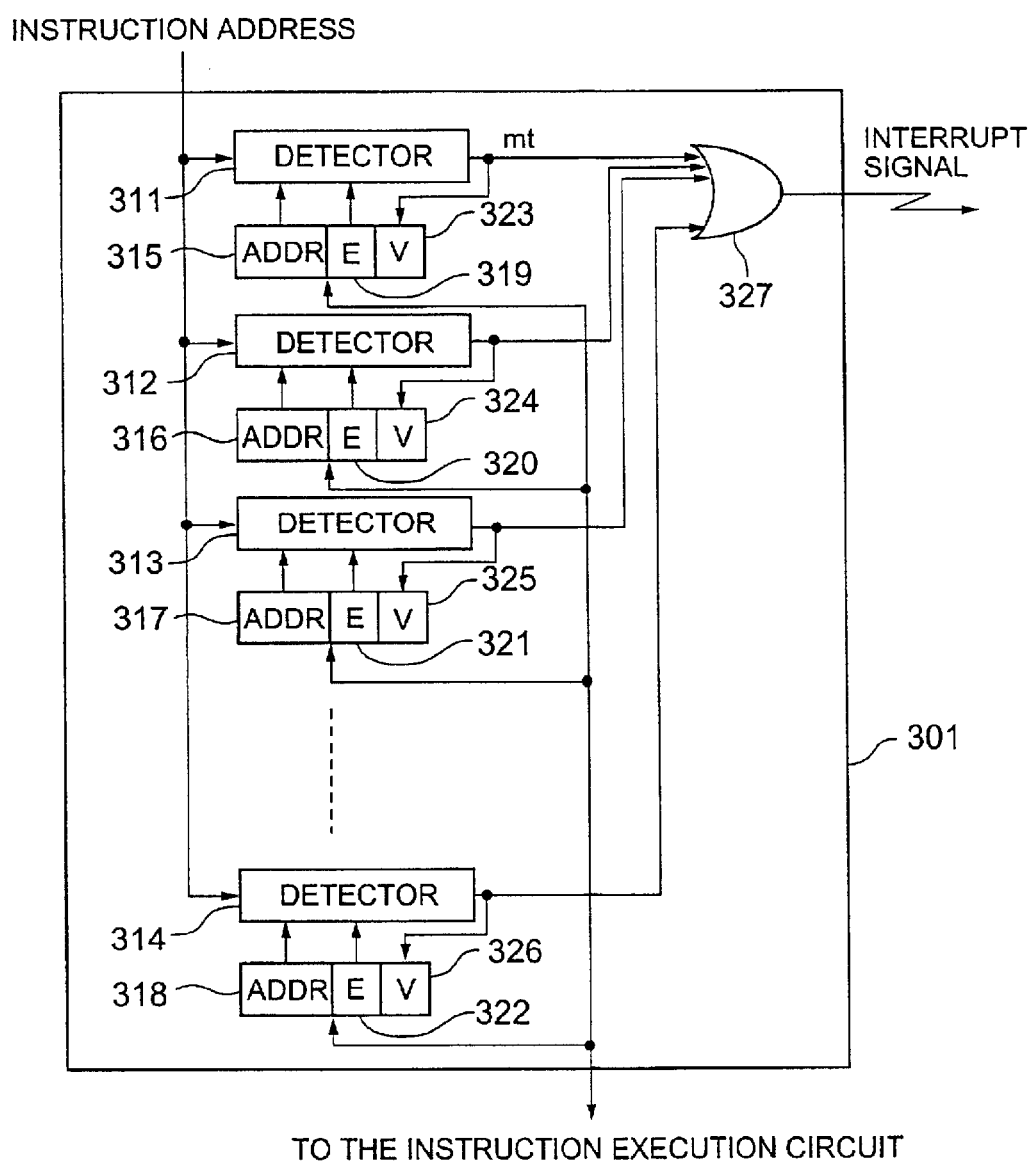
FIG. 9 shows the structure of an instruction break detector unit shown in FIG. 8.
Figure 56:
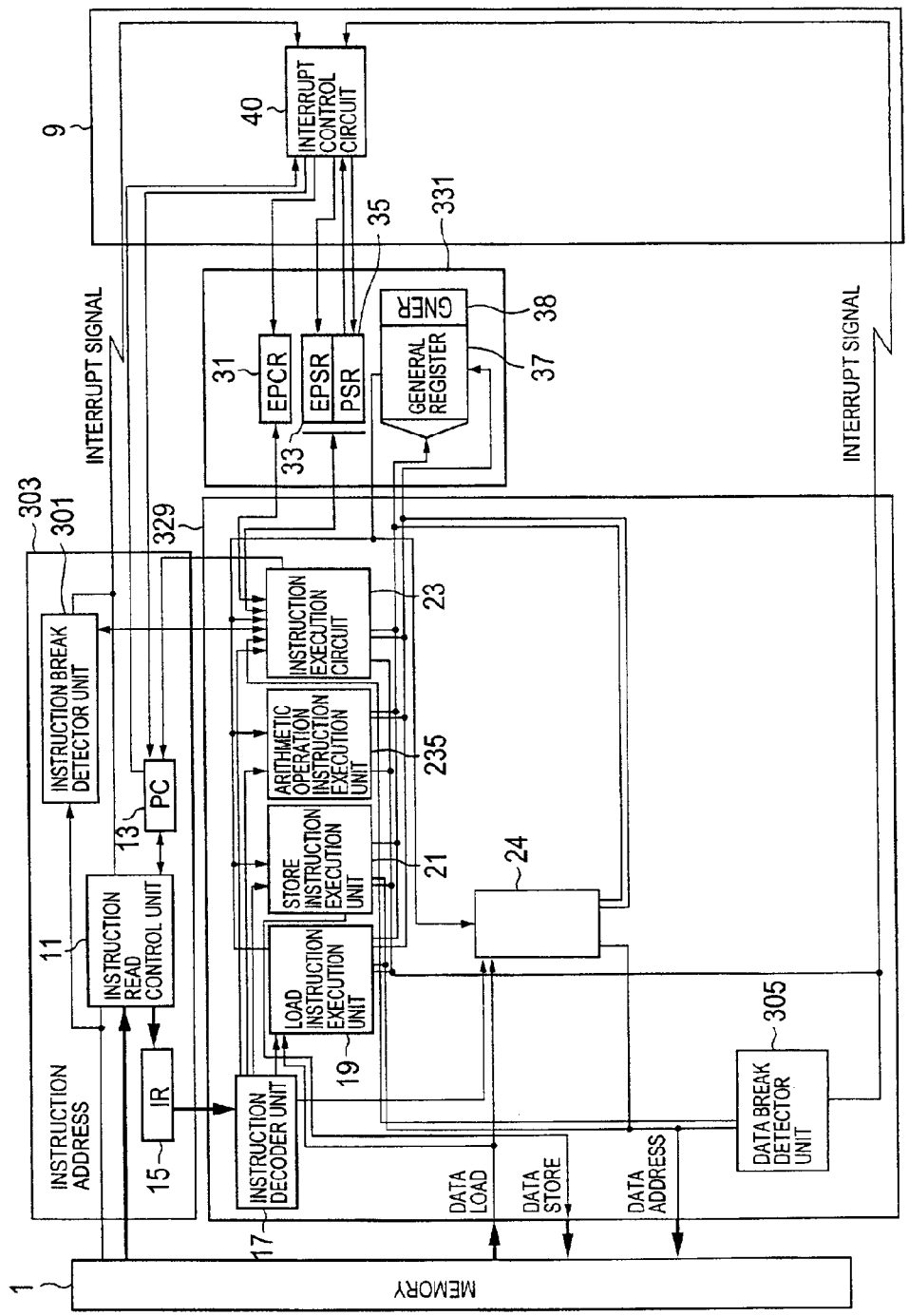
FIG. 56 shows the structure of a processor in accordance with a thirteenth embodiment of the present invention.

FIG. 56 shows the structure of a processor in accordance with a thirteenth embodiment of the present invention. As shown in FIG. 56, the processor of this embodiment has the same structure as the conventional processor shown in FIG. 8, except that a register control unit 331 further comprises the exception inhibiting flag 38, and that an instruction execution unit 329 further includes the exception inhibiting load instruction execution unit 24. With the addition of the exception inhibiting flag 38, the structure of the arithmetic operation instruction execution unit 235 becomes different from the structure of the arithmetic operation instruction execution unit 22 shown in FIG. 8.

Figure 57:
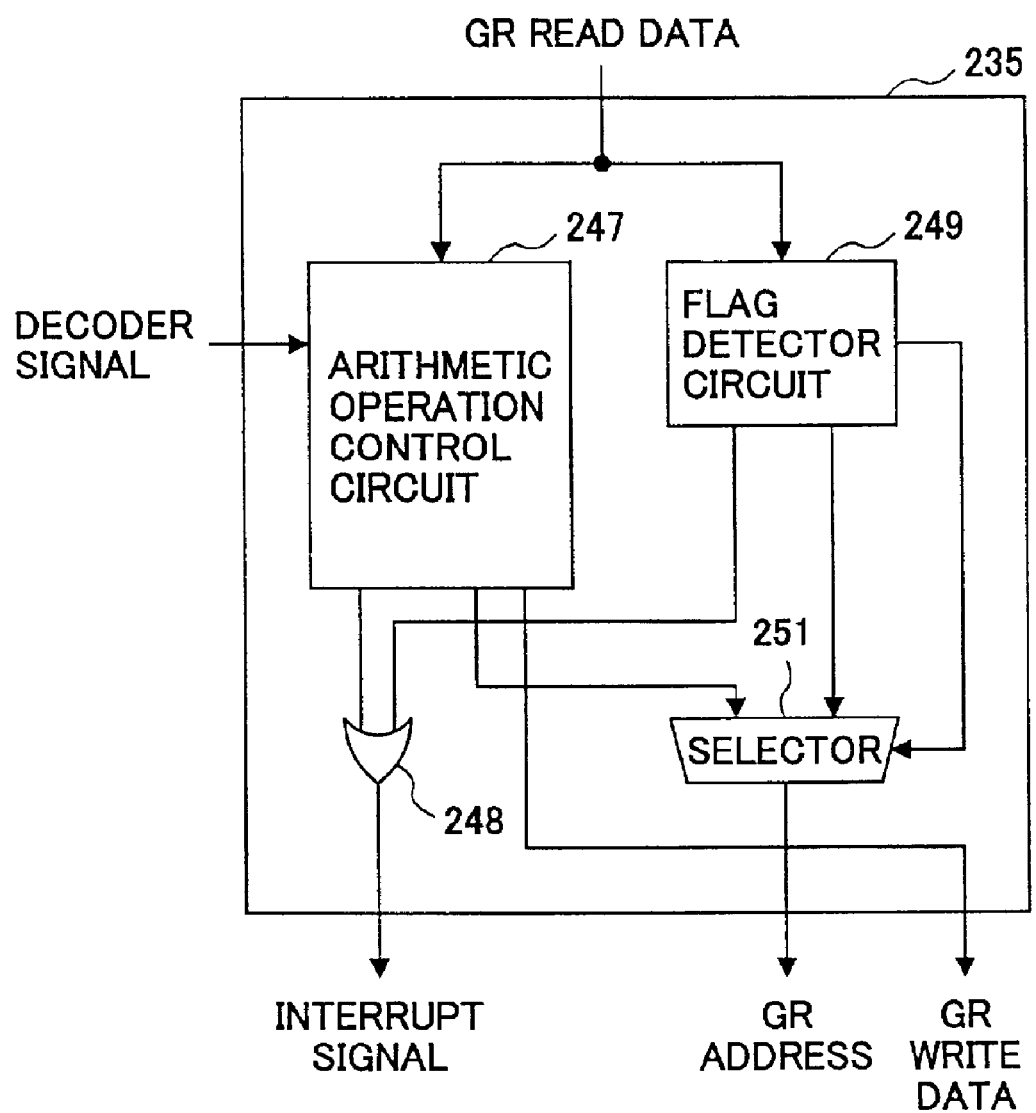
FIG. 57 shows the structure of an arithmetic operation instruction execution unit shown in FIG. 56.

As shown in FIG. 57, the arithmetic operation instruction execution unit 235 comprises the arithmetic operation control circuit 247, the flag detector circuit 249, and the selector 251, and an OR circuit 248. The input terminal of the arithmetic operation control circuit 247 is connected to the instruction decoder unit 17 and the general register 37. The output terminal of the arithmetic operation control circuit 247 is connected to the interrupt control circuit 40 via the OR circuit 248, and also to the general register 37 and the selector 251. The input terminal of the flag detector circuit 249 is connected to the general register 37, while its output terminal is connected to the selector 251 and the OR circuit 248. The output terminal of the selector 251 is connected to the general register 37.

As shown in FIG. 56, the exception inhibiting load instruction execution unit 24 is connected to the memory 1, the instruction decoder unit 17, and the general register 37. The exception inhibiting flag 38 is attached to the general register 37.

In the processor having the above structure, when receiving an exception inhibiting load instruction from the instruction decoder unit 17, the exception inhibiting load instruction execution unit 24 determines an effective address from the value read out from the general register 37, and reads out the data from the region in the memory 1 corresponding to the effective address. When reading out the data, the exception inhibiting load instruction execution unit 24 then checks whether or not an exception factor such as a data break exists.

If it is determined that there is no exception factor, the data read out from the load object address region in the memory 1 is written in the general register 37.

On the other hand, if it is determined that there is an exception factor, the identification value for identifying the detected exception factor is stored in the general register 37. At this point, the exception inhibiting flag 38 corresponding to the register, in which the identification value is stored, is set at "1". Examples of identification values for identifying the exception factor are shown in Table 1, which is shown in conjunction with the description of the seventh embodiment.

The bits of the exception inhibiting flag 38 correspond to the respective entries of the general register 37. When no exception factor is detected, the exception inhibiting flag 38 is "0". When an exception factor is detected in the execution of an exception inhibiting load instruction, the exception inhibiting flag 38 is "1".

In this embodiment, an exception inhibiting load instruction table, a commit point table, a commit break point table, and an exception inhibiting data break history table.

The exception inhibiting load instruction table comprises data that is made up of pairs each including the instruction address of an exception inhibiting instruction and the identification number of a control path in which the exception inhibiting load instruction is included. More specifically, the exception inhibiting load instruction table is made up of (a0, p0), (a1, p1), . . . (ai, pi), as shown in FIG. 62. Likewise, as shown in FIG. 63, the commit point table comprises data that is made up of combinations each consisting of the identification number of a control path, an instruction address that indicates the position at which the control path is determined in the inherent execution order, and an identification number of another control path that is nullified by determining the control path. More specifically, the data contained in the commit point table is made up of (p0, B0, sp0), (p1, b1, sp1), . . . , and (pj, bj, spj).

As shown in FIG. 64, the commit break point table contains data that is made up of an instruction address that indicates the position at which a control path is determined by the inherent execution order, and an identification number of a control path corresponding to the instruction address. More specifically, the data contained in the commit break point table is made up of (b0, p0), (b1, p1), . . . , (bk, pk).

As shown in FIG. 65, the exception inhibiting data break history table contains data that is made up of an identification number of a control path including an instruction subjected to a break operation, an instruction address of the instruction, and the effective address of the instruction. More specifically, the data contained in the exception inhibiting data break history table is made up of (p0, c0, ec0), (p1, c1, ec1), . . . , and (pl, cl, edl).

In the following, an operation performed by the processor having the above structure will be described. The operation described below is performed by executing predetermined software consisting of programmed instructions.

Figure 58:
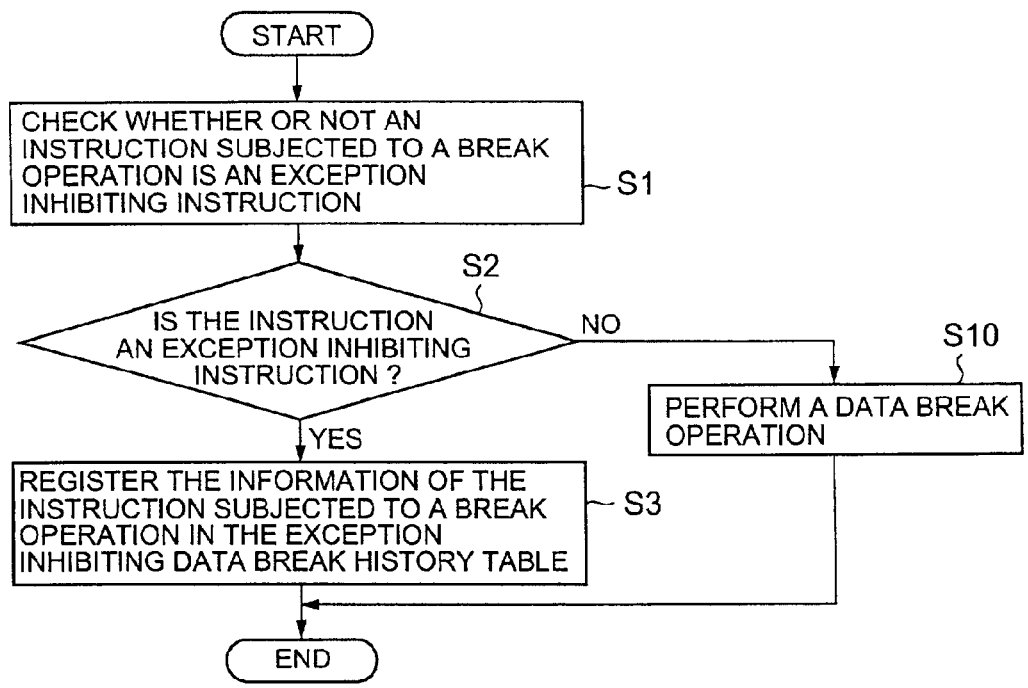
FIG. 58 is a flowchart showing an operation performed by the processor of FIG. 56 when a data break is detected.

FIG. 58 is a flowchart showing an operation performed by the processor of FIG. 56 when a data break is detected. As shown in FIG. 58, in step S1, when the instruction break detector unit 301 detects an instruction subjected to a break operation, the arithmetic operation instruction execution unit 235 determines whether or not the detected instruction is an exception inhibiting instruction by an instruction comparison operation. If the detected instruction is determined to be an exception inhibiting instruction in step S2, the operation advances to step S3. If the detected instruction is determined not to be an exception inhibiting instruction in step S2, the operation moves on to step S10.

In step S3, the information of the instruction subjected to a break operation is registered in the exception inhibiting data break history table stored in the memory 1, and the operation comes to an end. Meanwhile, in step S10, a data break operation is performed, and the operation comes to an end.

Figure 59:
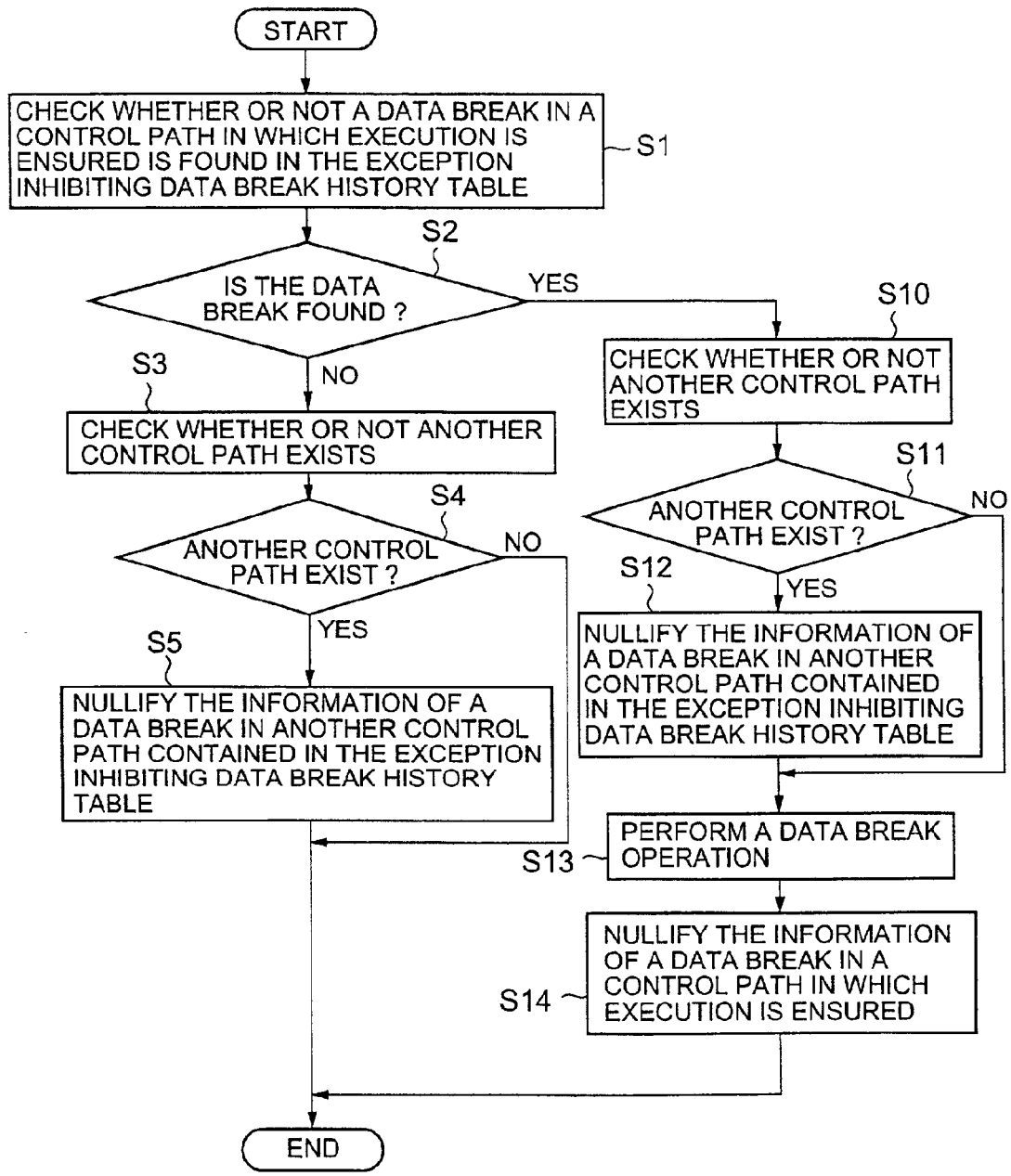
FIG. 59 is a flowchart showing an operation performed by the processor of FIG. 56 when the execution of an instruction is ensured in the inherent order.

FIG. 59 is a flowchart showing an operation performed by the processor shown in FIG. 56 when the execution of instructions is ensured in the inherent order through the execution of a branch instruction. As shown in FIG. 59, in step S1, it is determined whether or not a data break in the control path in which the execution is ensured is found in the exception inhibiting data break history table stored in the memory 1. In step S2, the arithmetic operation instruction execution unit 235 determines through an exception comparison operation whether or not the data break in the control path is found in the exception inhibiting data break history table stored in the memory 1. If the data break is found in the exception inhibiting data break history table, the operation moves on to step S10. On the other hand, the data break is not found in the exception inhibiting data break history table, the operation advances to step S3.

In step S3, it is determined whether or not the information of a data break in another control path is found in the exception inhibiting data break history table. If the arithmetic operation instruction execution unit 235 determines that the information is found in the exception inhibiting data break history table in step S4, the operation advances to step S5. If the arithmetic operation instruction execution unit 235 determines that the information is not found in the exception inhibiting data break history table in step S4, the operation comes to an end. In step S5, the information of the data break in another control path contained in the exception inhibiting data break history table is nullified, thereby finishing the operation.

In step S10, it is determined whether or not the information of a data break in another control path is found in the exception inhibiting data break history table. If the arithmetic operation instruction execution unit 235 determines that the information is found in the exception inhibiting data break history table in step S11, the operation advances to step S12. If the arithmetic operation instruction execution unit 235 determines that the information is not found in the exception inhibiting data break history table in step S11, the operation moves to step S13.

In step S12, the information of the data break in another control path contained in the exception inhibiting data break history table is nullified. In step S13, a data break operation is performed on the data break detected in step S2. In step S14, the information of the data break in a control path in which the execution contained in the exception inhibiting data break history table is contained, i.e., the information of the operation performed in step S13, is nullified, thereby finishing the operation.

Figure 60:
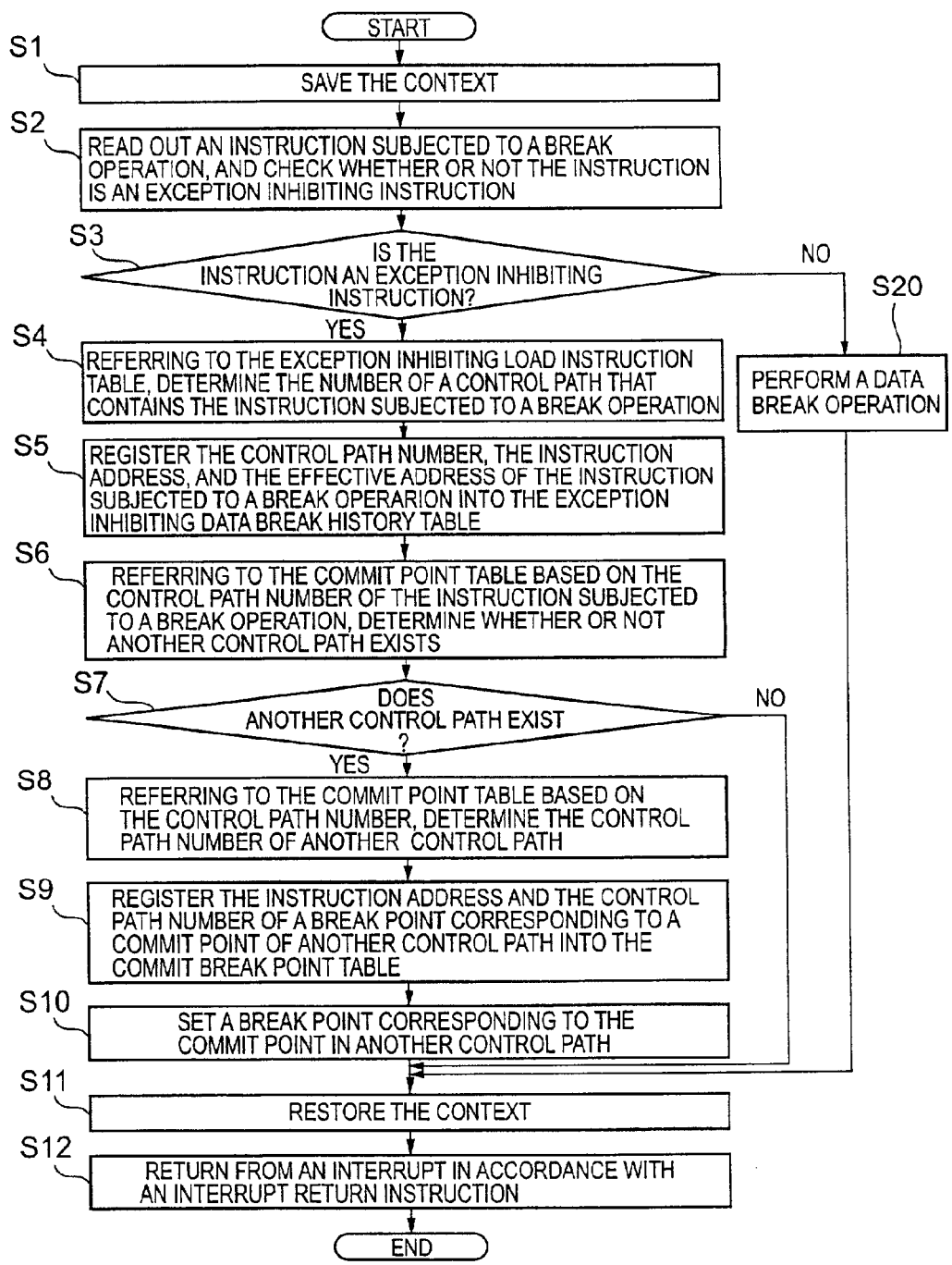
FIG. 60 is a flowchart showing an operation performed by the processor of FIG. 56 in accordance with an interrupt operation program in a data break interrupt operation.

FIG. 60 is a flowchart showing an operation performed by the processor of FIG. 56 when a data break interrupt operation is performed in accordance with an interrupt operation program. As shown in FIG. 60, in step S1, the context is saved. In step S2, an instruction subjected to a break operation, and the arithmetic operation instruction execution unit 235 determines whether or not the instruction is an exception inhibiting instruction. If the instruction is determined to be an exception inhibiting instruction in step S3, the operation advances to step S4. If the instruction is determined not to be an exception inhibiting instruction in step S3, the operation moves on to step S20.

In step S4, the number of a control path that contains the instruction subjected to a break operation is determined with reference to the exception inhibiting load instruction table. In step S5, the control path number that contains the instruction subjected to a break operation, the instruction address, and the effective address are registered in the exception inhibiting data break history table stored in the memory 1. In step S6, Referring to the commit point table stored in the memory 1 based on the control path number, it is determined whether or not another control path exists. If the arithmetic operation instruction execution unit 235 determines that another control path exists through a comparison operation in step S7, the operation advances to step S8. If the arithmetic operation instruction execution unit 235 determines that another control path does not exist in step S7, the operation moves on to step S11.

In step S8, the number of the detected control path is determined. In step S9, the instruction address of a break point corresponding to the commit point of another control path, and the control path number are registered in the commit break point table. In step S10, the break point corresponding to the commit point of another control path is set.

In step 11, the context saved in step S1 is restored. In step S20, a data break operation is performed, and the operation then moves on to step S11. In step S12, an interrupt return instruction is executed, so as to return the operation from a data break interrupt operation to the execution of the inherent program, thereby ending the interrupt operation.

Figure 61:
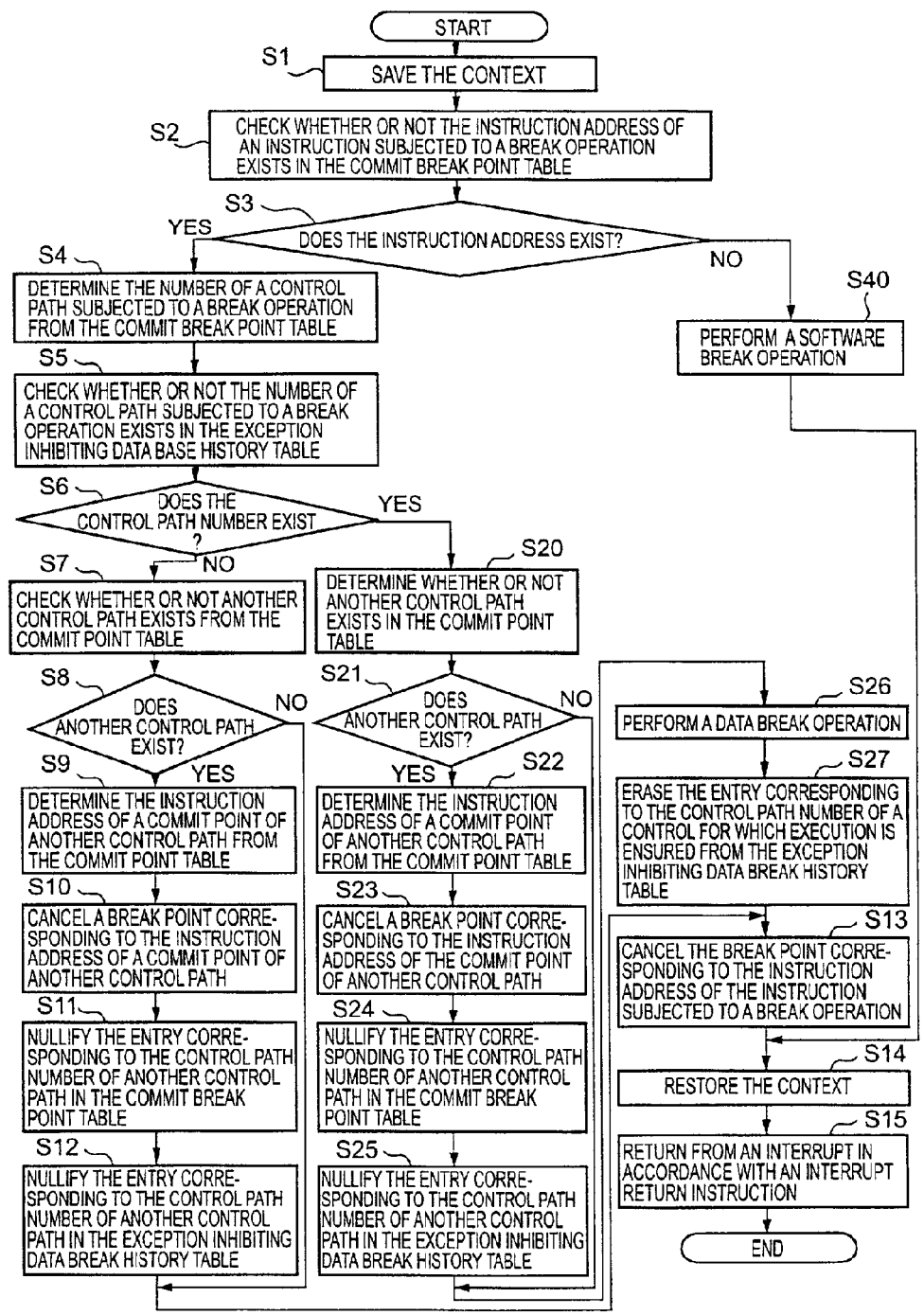
FIG. 61 is a flowchart showing an operation performed by the processor of FIG. 56 when a software break interrupt operation in accordance with an interrupt operation program.

FIG. 61 is a flowchart showing an operation performed by the processor of FIG. 56, when a software break interrupt operation is performed in accordance with an interrupt operation program. As shown in FIG. 61, in step S1, the context is saved. In step S2, it is determined whether or not the instruction address of an instruction subjected to a break operation exists in the commit break point table. If the arithmetic operation instruction execution unit 235 determines that the instruction address exists in the commit break point table through a comparison operation in step S3, the operation advances to step S4. If the arithmetic operation instruction execution unit 235 determines that the instruction address does not exist in the commit break point table in step S3, the operation moves on to step S40.

In step S4, the control path number corresponding to the instruction address of the address subjected to a break operation is determined from the commit break point table. In step S5, the arithmetic operation instruction execution unit 235 determines whether or not the control path number exists in the exception inhibiting data break history table. If the control path number is found in step S6, the operation moves on to step S20. If the control path number is not found in step S6, the operation advances to step S7. In step S7, the arithmetic operation instruction execution unit 235 determines whether or not another control path exists in the commit point table through a comparison operation. If the arithmetic operation instruction execution unit 235 determines that another control path exists in step S8, the operation advances to step S9. If the arithmetic instruction execution unit 235 determines that another control path does not exist, the operation moves on to step S13.

In step S9, the instruction address of a commit point of another control path detected in step S8 is determined. In step S10, a break point corresponding to the instruction address is canceled by restoring the inherent instruction. In step S11, the entry corresponding to the number of another control path is nullified in the commit break point table. In step S12, in the exception inhibiting data break history table, the entry corresponding to the number of another control path is nullified.

In step S13, the break point corresponding to the instruction address of the instruction subjected to a break operation is canceled. In step S14, the context is restored. In step S15, an interrupt return instruction is executed so as to return from the interrupt operation. At this point, the interrupt operation is finished.

Meanwhile, in step S20, the arithmetic operation instruction execution unit 235 determines whether or not another control path exists in the commit point table through a comparison operation. If the arithmetic operation instruction execution unit 235 determines that another control path exists in the commit point table in step S21, the operation advances to step S22. If the arithmetic operation instruction execution unit 235 determines that another control path does not exists in the commit point table in step S21, the operation moves on to step S26.

In step S22, the instruction address of a commit point in another control path detected in step S21 is determined. In step S23, the break point corresponding to the instruction address is canceled by restoring the inherent instruction. In step S24, the entry corresponding to the number of another control path is nullified in the commit break point table. In step S25, the entry corresponding to the number of another control path is nullified in the exception inhibiting data break history table.

In step S26, a data break operation is performed. In step S27, the entry corresponding to the number of the control path for which execution is ensured is erased from the execution inhibiting data break history table, and the operation moves on to step S14.

Meanwhile, in step S40, a software break operation is performed, and the operation then moves on to step S14.

As described so far, by executing software that realizes the above operation, interruptions to the execution of the program due to a data break caused by an instruction that is not ensured in the inherent order of speculatively moved instructions can be avoided. Thus, a processor having higher data processing ability and operation reliability can be obtained.

[Fourteenth Embodiment]

Figure 66:
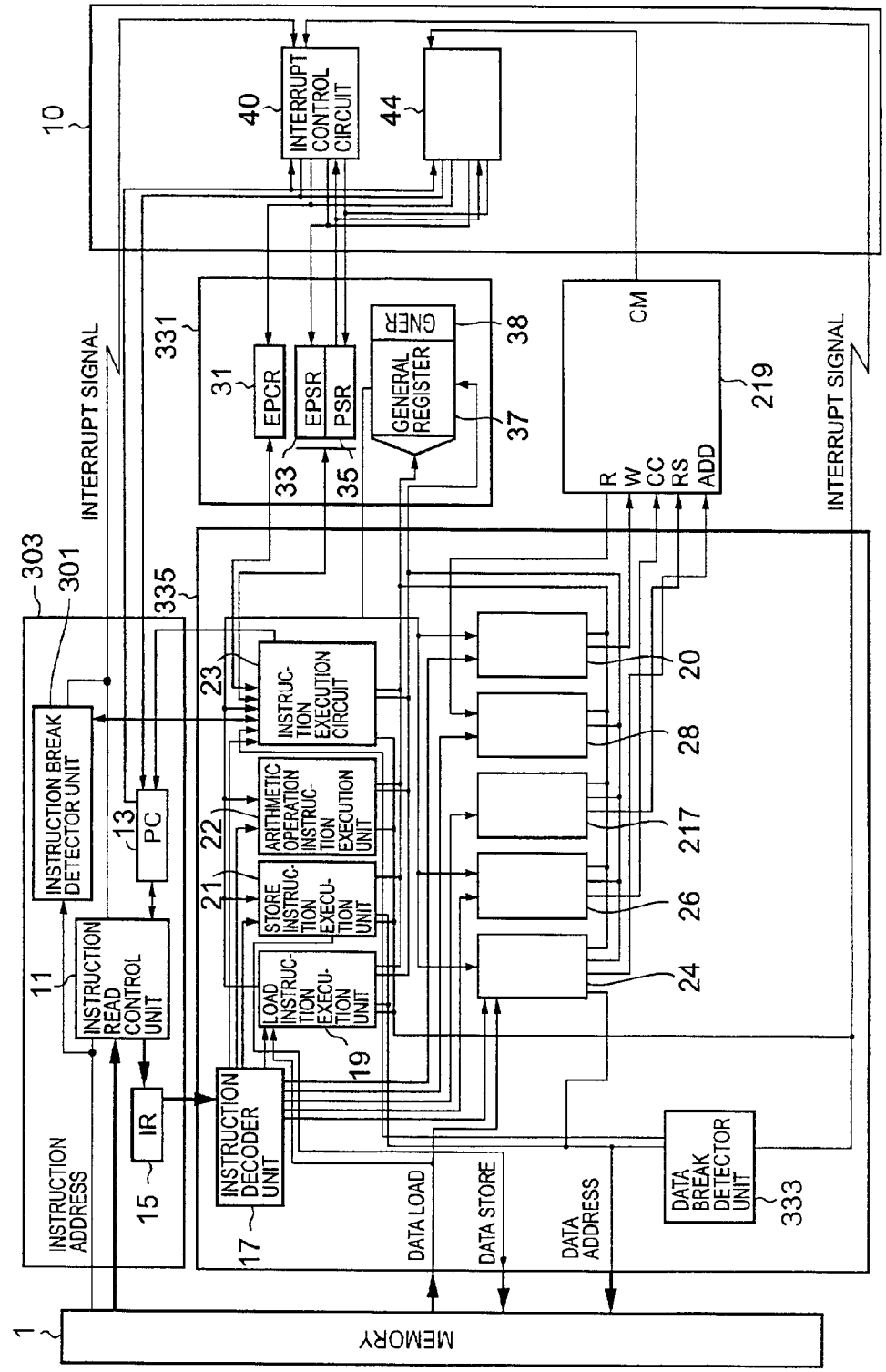
FIG. 66 shows the structure of a processor in accordance with a fourteenth embodiment of the present invention.

FIG. 66 shows the structure of a processor in accordance with a fourteenth embodiment of the present invention. As shown in FIG. 66, the processor of this embodiment has the same structure as the processor of the thirteenth embodiment shown in FIG. 56, except that the processor of this embodiment further comprises the history control unit 219, and that an instruction execution unit 335 includes the exception inhibiting history confirmation control unit 26, the exception inhibiting flag nullifying instruction execution unit 217, the exception inhibiting history read instruction execution unit 28, and the exception inhibiting history write instruction execution unit 20. The processor of this embodiment further comprises the interrupt control unit 10 that includes the commit exception interrupt control unit 44.

The structure of a data break detector unit 333 included in the instruction execution unit 335 differs from the structure of the conventional data break detector unit 305, as will be described later in detail.

The history control unit 219 is connected to the exception inhibiting history write instruction execution unit 20, the exception inhibiting load instruction execution unit 24, the exception inhibiting history confirmation control unit 26, the exception inhibiting history read instruction execution unit 28, the exception inhibiting flag nullifying instruction execution unit 217, and the commit exception interrupt control unit 44. The exception inhibiting history write instruction execution unit 20, the exception inhibiting history confirmation control unit 26, the exception inhibiting history read instruction execution unit 28, and the exception inhibiting flag nullifying instruction execution unit 217, are also connected to the instruction decoder unit 17 and the general register 37.

The commit exception interrupt control unit 44 is further connected to the program counter 13 and the registers 31, 33, and 35. The data break detector unit 333 is also connected to the instruction decoder unit 17.

When receiving a commit instruction, the exception inhibiting history confirmation control unit 26 checks whether or not the exception inhibiting flag 38 corresponding to a register designated by the commit instruction in the general register 37 is valid. If the exception inhibiting flag 38 is determined to be "1" and valid, the exception inhibiting flag is set to "0" and thus made nullified. A confirmation signal is then supplied to the history control unit 219. Here, the interrupt control unit 10 is notified of the fact that a commit exception has occurred. If the exception inhibiting flag 38 is determined to be invalid, the operation by the commit instruction comes to an end.

When receiving an exception inhibiting history read instruction, the exception inhibiting history read instruction execution unit 28 reads out the exception information from the history control unit 219, and writes the exception information into the general register 37. Likewise, when receiving an exception inhibiting history write instruction, the exception inhibiting history write instruction execution unit 20 supplies the data read out from the general register 37 and a write signal to the history control unit 219, and writes the read data into the history control unit 219. When receiving an exception inhibiting flag nullifying instruction, the exception inhibiting flag nullifying instruction execution unit 217 sets the exception inhibiting flag 38 corresponding to the register number of a designated register in the general register 37 at "0", and supplies a nullifying signal to the history control unit 219, thereby nullifying the exception information corresponding to the designated register.

In accordance with an interrupt notifying commit signal CM supplied from the history control unit 219, the commit exception interrupt control unit 44 writes the instruction address of a return destination from an interrupt into the register 31, data indicating the pre-interrupt operation state into the register 33, and the operation state corresponding to the interrupt into the register 35. Also, a branch destination address corresponding to the interrupt is supplied to the program counter 13.

In accordance with a registration signal ADD supplied from the exception inhibiting load instruction execution unit 24, the history control unit 219 registers exception information into the exception inhibiting history table. In accordance with a confirmation signal CC supplied from the exception inhibiting history confirmation control unit 26, the history control unit 219 checks whether or not exception information is stored at the register number of a designated register. If exception information is stored at the register number of the designated register, a commit signal CM indicating the detection of a commit exception is supplied to the commit exception interrupt control unit 44.

In response to a read signal R supplied from the exception inhibiting history read instruction execution unit 28, the history control unit 219 reads out the stored exception information, and supplies the exception information to the exception inhibiting history read instruction execution unit 28. In response to a write signal W supplied from the exception inhibiting history write instruction execution unit 20, the history control unit 219 stores the supplied data. In response to a reset signal RS supplied from the exception inhibiting flag nullifying instruction execution unit 217, the history control unit 219 nullifies the entry, if the exception information of a designated register number is stored.

Figure 10:
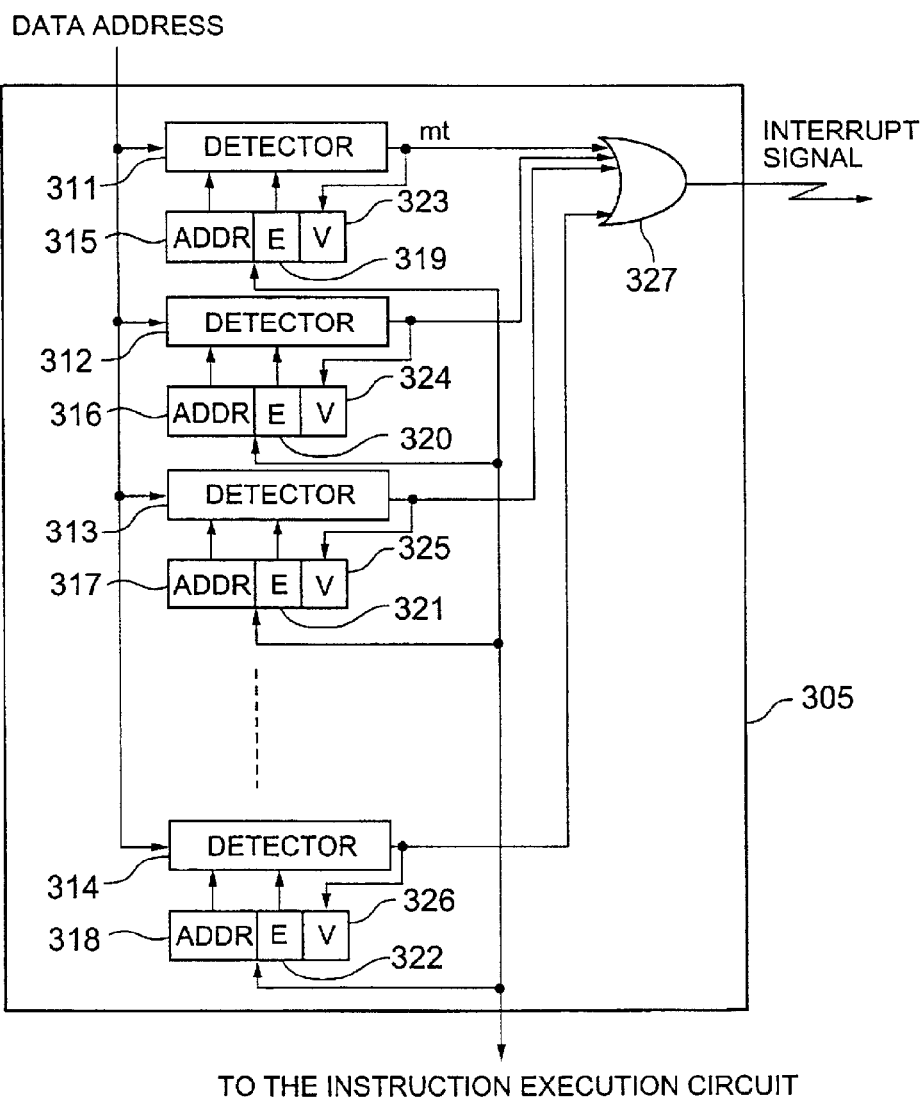
FIG. 10 shows the structure of a data break detector unit shown in FIG. 8.
Figure 11:
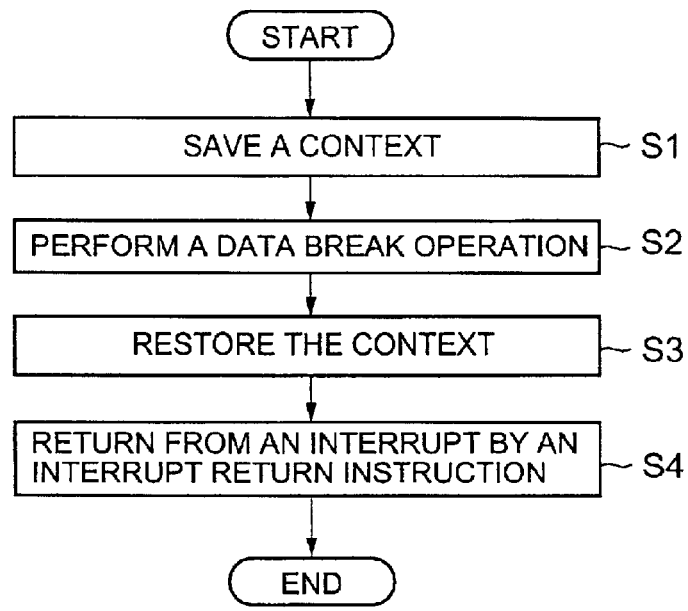
FIG. 11 is a flowchart showing a data break interrupt operation by an interrupt operation program.
Figure 67:
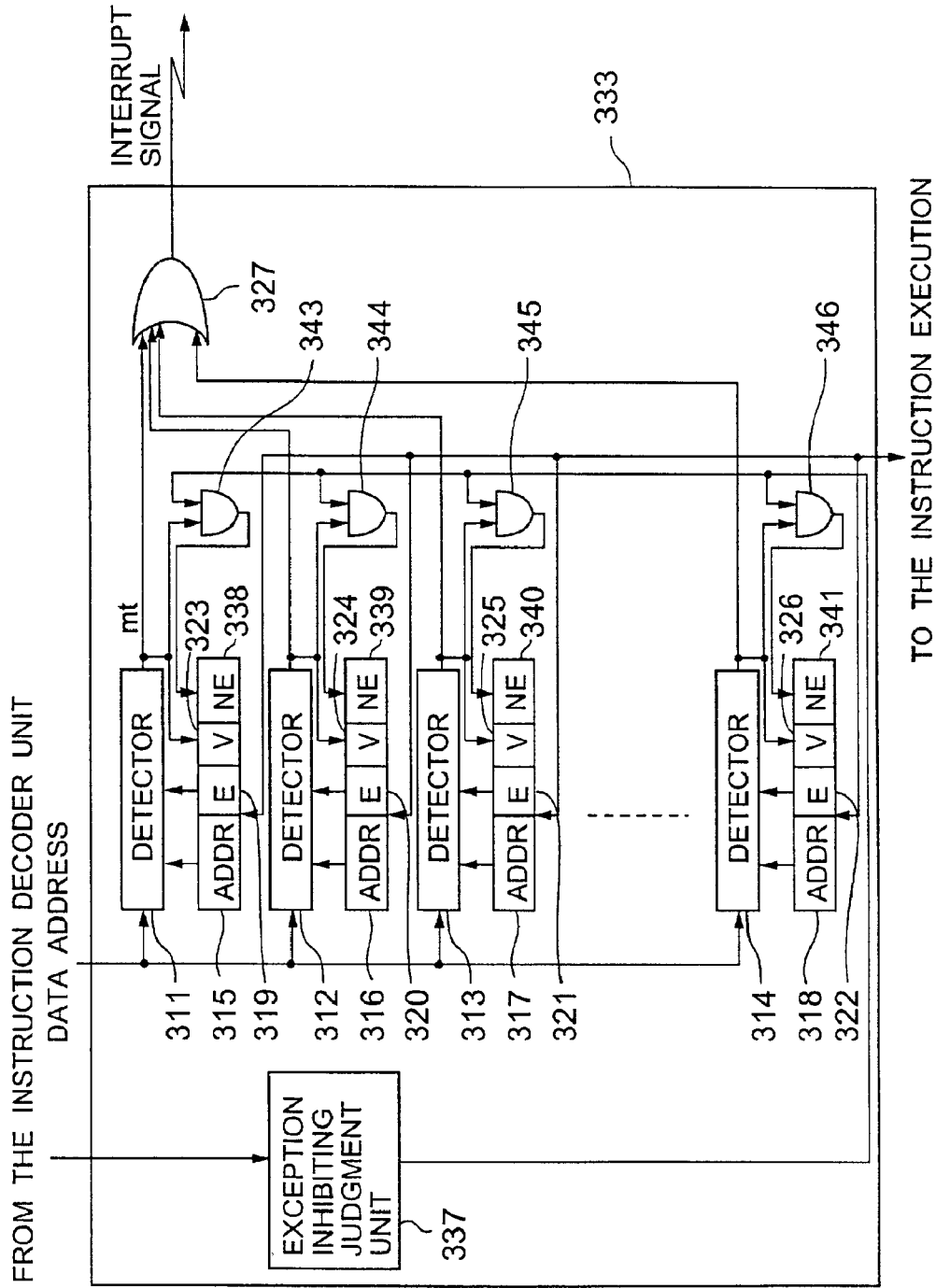
FIG. 67 shows the structure of a data break detector unit shown in FIG. 66.

FIG. 67 shows the structure of the data break detector unit 33 shown in FIG. 66. As shown in FIG. 67, the data break detector unit 333 of this embodiment has the same structure as the conventional data break detector unit 305 shown in FIG. 10, except that the data break detector unit 333 of this embodiment further comprises an exception inhibiting judgment unit 337 connected to the instruction decoder unit 17. The data break detector unit 333 of this embodiment further differs from the conventional data break detector unit 305 in that NE fields 338 to 341 are attached to the V fields 323 to 326, respectively, and AND circuits 343 to 346 are included. The input terminal of each of the AND circuits 343 to 346 is connected to each corresponding one of the detectors 311 to 314 and the exception inhibiting judgment unit. The output terminal of each of the AND circuits 343 to 346 is connected to each corresponding one of the NE fields 338 to 341.

The NE fields 338 to 341 indicate whether or not a data break has been detected in response to an exception inhibiting instruction, and constitute a data break point register. When the NE fields 338 to 341 are "0", no data break has been detected for an exception inhibiting instruction. When the NE fields 338 to 341 are "1", a data break has already been detected in response to an exception inhibiting instruction.

The exception inhibiting judgment unit 337 determines whether or not a break object instruction is an exception inhibiting instruction. When data break conditions are satisfied, the output value of the exception inhibiting judgment unit 337 is written in the corresponding one of the NE fields 338 to 341.

Figure 68:
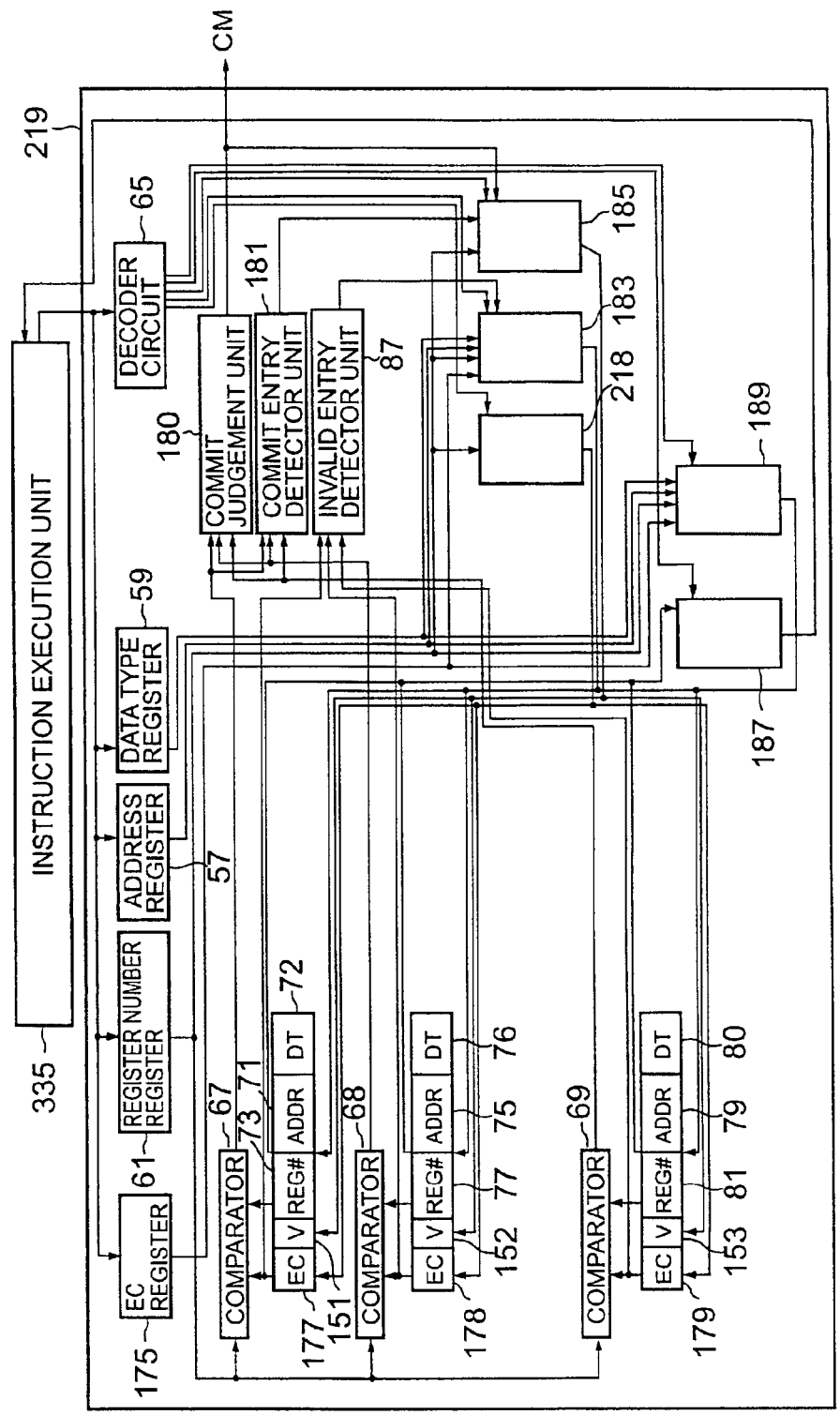
FIG. 68 shows the structure of a history control unit shown in FIG. 66.

FIG. 68 shows the structure of the history control unit 219 shown in FIG. 66. As shown in FIG. 68, the history control unit 219 comprises the address register 57, the data type register 59, the register number register 61, the exception factor register 175, the decoder circuit 65, the comparators 67 to 69, the EC fields 177 to 179, the V fields 151 to 153, the address fields 71, 75, and 79, the data type fields 72, 76, and 80, the register number fields 73, 77, and 81, the commit judgment unit 180, the commit entry detector unit 181, the invalid entry detector unit 87, the exception inhibiting history registration control unit 183, the exception inhibiting history confirmation control unit 185, the exception inhibiting history read instruction execution unit 187, the exception inhibiting history write instruction execution unit 189, and the history table nullifying unit 218.

The address register 57, the data type register 59, the register number register 61, the EC register 175, and the decoder circuit 65 are connected to the instruction execution unit 335. The address register 57 holds an effective address used for executing an exception inhibiting load instruction. The data type register 59 holds the identification value indicating the size of data subjected to a load/store operation in the execution of the exception inhibiting load instruction. The register number register 61 holds the register number of a register in which data is written in the execution of the exception inhibiting load instruction.

The EC register 175 holds the identification value of an exception factor detected in the execution of the exception inhibiting load instruction. Examples of the exception factor and the identification value are shown in Table 1.

The decoder circuit 65 analyzes a signal supplied form the instruction execution unit 335, and activates the corresponding control unit. More specifically, in response with a supplied registration signal, the decoder circuit 65 activates the exception inhibiting history registration control unit 183. In response to a confirmation signal, the decoder circuit 65 activates the exception inhibiting history confirmation control unit 185. In response to a read signal, the decoder circuit 65 activates the exception inhibiting history read instruction execution unit 187. In response to a write signal, the decoder circuit 65 activates the exception inhibiting history instruction execution unit 189. In response to a nullifying signal, the decoder circuit 65 activates the history table nullifying unit 218.

Meanwhile, the comparators 67 to 69 are connected to the register number register 61 and the corresponding entries. The plurality of entries constitute the exception inhibiting history table. Each of the entries includes: the EC fields 177 to 179 indicating exception factors; the V fields 151 to 153, which are binary data indicating whether or not an exception has occurred in each corresponding entry; the address fields 71, 75, and 79 indicating the effective address of data subjected to exception handling; the data type fields 72, 76, and 80 indicating the type of data subjected to a load operation; and the register number fields 73, 77, and 81 indicating the register number of a register in which exception information is written.

The data type fields 72, 76, and 80 each hold an identification value corresponding to the type of data, and examples of identification values are shown in Table 2, which is shown in conjunction with the description of the seventh embodiment.

As shown in Table 2, the identification value is "0" for an unsigned byte, "1" for a signed byte, "2" for an unsigned half word, "3" for a signed half word, "4" for a word, "5" for a double word, and "6" for a quad word.

For an entry in which the EC fields 177 to 179 are valid, the comparators 67 to 69 each compare a register designated by a commit instruction with a register in which exception information specified by values stored in the register number fields 73, 77, and 81. If the two registers are the same, a signal indicating the coincidence is outputted.

The commit judgment unit 180 is connected to the comparators 67 to 69, and, in accordance with a signal supplied from the comparators 67 to 69, the commit judgment unit 180 determines whether or not a register in which exception information is stored is designated by a commit instruction. The commit judgment unit 180 then outputs the judgment result to the exception inhibiting history confirmation control unit 185, and supplies a commit signal CM to the commit exception interrupt control unit 44.

The commit entry detector unit 181 is connected to the comparators 67 to 69, and, in accordance with a signal supplied from the comparators 67 to 69, the commit entry detector unit 181 detects an entry number in which the register number designated by the commit instruction coincides with the register number recorded in a predetermined field.

The invalid entry detector unit 87 detects a free entry (invalid entry), in accordance with the information in the EC fields 177, 178, and 179 of each of the entries. The exception inhibiting history registration control unit 183 is connected to the address register 57, the data type register 59, the register number register 61, the EC register 175, the decoder circuit 65, and the invalid entry detector unit 87. In accordance with a registration signal ADD supplied form the decoder circuit 65, the exception inhibiting history registration control unit 183 writes the exception information into the EC fields 177, 178, and 179, the address fields 71, 75, and 79, the register number fields 73, 77, and 81, and the data type fields 72, 76, and 80 of the free entry detected by the invalid entry detector unit 87.

The exception inhibiting history confirmation control unit 185 is connected to the register number register 61, the commit judgment unit 180, the commit entry detector unit 181, the decoder circuit 65, and the V fields 151 to 153. When the commit judgment unit 180 determines that the register number designated by a commit instruction coincides with the register number of the result write register recorded in a predetermined field, the exception inhibiting history confirmation control unit 185 write "1" in the V fields of the register in which the coinciding register number is stored.

The exception inhibiting history read instruction execution unit 187 reads out exception information from a designated entry, and supplies the read data to the instruction execution unit 335. The exception inhibiting history write instruction execution unit 189 writes the value supplied from the instruction execution unit 335 via the EC register 175, the register number register 61, the address register 57, the data type register 59, into an entry designated by an exception inhibiting history write instruction. The history table nullifying unit 218 nullifies the EC fields 177, 178, and 179 of the entry designated by an exception inhibiting flag nullifying instruction supplied from the decoder circuit 65.

Figure 69:
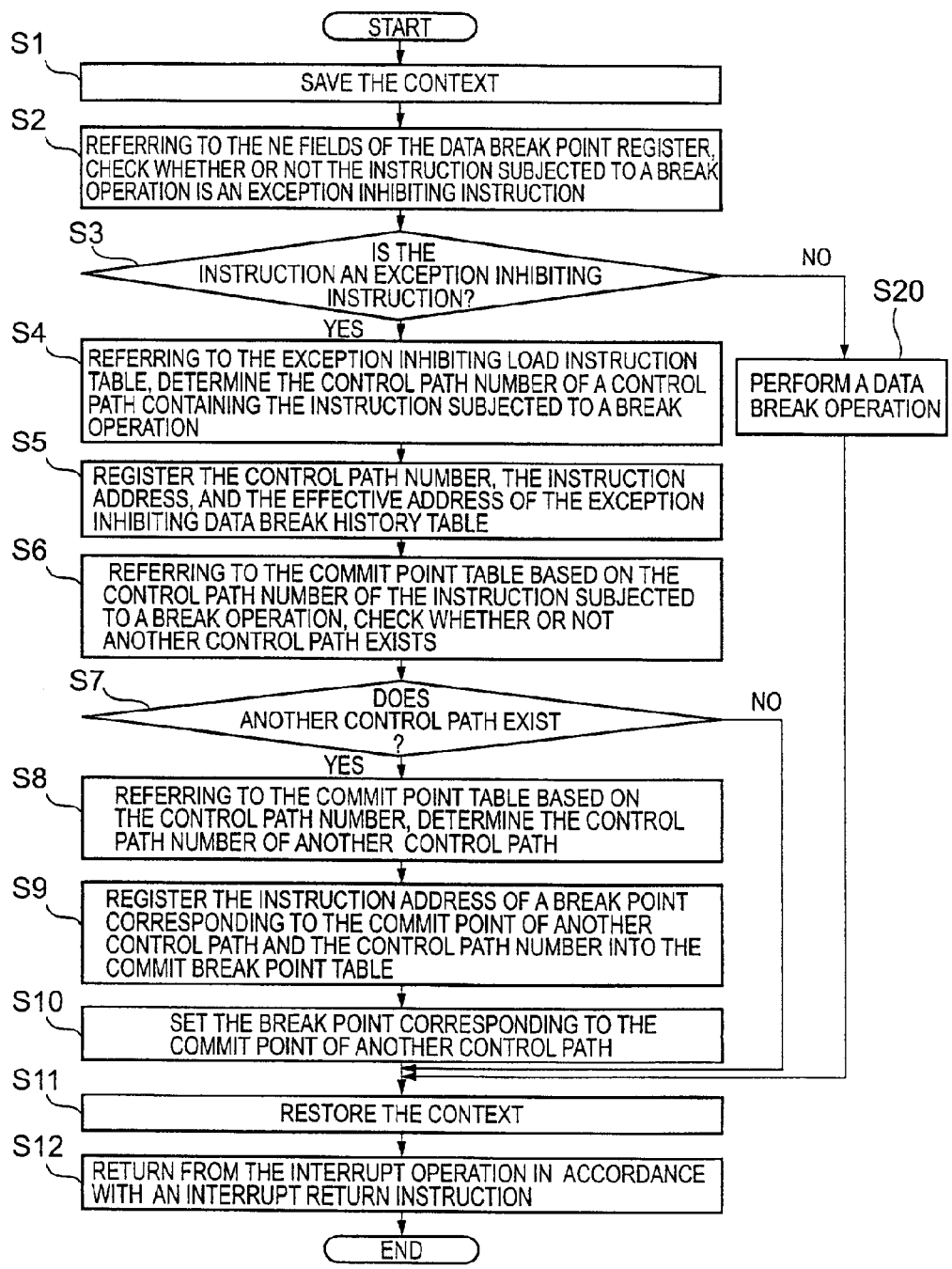
FIG. 69 is a flowchart showing a data break interrupt operation performed by the processor of FIG. 66 in accordance with an interrupt operation program.

FIG. 69 is a flowchart showing a data break interrupt operation in accordance with an interrupt operation program in the processor shown in FIG. 66. Like the processor of the thirteenth embodiment of the present invention, the processor of this embodiment stores the exception inhibiting load instruction table, the commit point table, the commit break point table, and the exception inhibiting data break history table in a predetermined address region in the memory 1.

As shown in FIG. 69, in step S1, the context is saved. In step S2, it is determined whether or not an instruction subjected to a break operation is an exception inhibiting instruction, with reference to the NE fields 338 to 341 of the data break point register contained in the data break detector unit 333. If the instruction is determined to be an exception inhibiting instruction because the NE fields 338 to 341 hold the value "1" in step S3, the operation advances to step S4. If the instruction is determined not to be an exception inhibiting instruction because the NE fields 338 to 341 hold the value "0" in step S3, the operation moves on to step S20.

In step S4, the control path number of a control path that contains the instruction subjected to a break operation is determined from the exception inhibiting load instruction table. In step S5, the control path number of the control path containing the instruction, the instruction address, and the effective address are registered in the exception inhibiting data break history table stored in the memory 1. In step S6, based on the control path number, it is determined whether or not another control path exists, with reference to the commit point table stored in the memory 1.

If the arithmetic operation instruction execution unit 22 determines that another control path exists through a comparison operation in step S7, the operation advances to step S8. If the arithmetic operation instruction execution unit 22 determines that no other control path exists in step S7, the operation moves on to step S11.

In step S8, the control path number of the detected another control path is determined. In step S9, the control path number of the detected another control path and the instruction address of a break point corresponding to the commit point of the detected another control path are registered in the commit break point table. In step S10, the break point corresponding to the commit point of the detected another control path is set.

In step S11, the context saved in step S1 is restored. In step S20, a data break operation is performed, and the operation then moves on to step S11. In step S12, an interrupt return instruction is executed so that the operation returns to the data break interrupt operation to the inherently programmed operation. At this point, the interrupt operation comes to an end.

It should be noted that the software break interrupt operation by the interrupt operation program performed by the processor of this embodiment is the same as the operation performed by the processor shown in the flowchart of FIG. 61.

As described so far, in accordance with this embodiment, the history control unit 219 registers exception information in the exception inhibiting history table. The data break detector unit 333 writes the value "1", which indicates the exception operation should be retained, in the NE fields 338 to 341. The data break detector unit 333 then executes a commit instruction so as to perform the retained exception operation in accordance with the exception information. By doing so, interruptions to the execution of the program due to a data break caused by an instruction that is not ensured in the inherent execution order of speculatively moved instructions can be avoided. Thus, a processor having high data processing ability and operation reliability can be obtained.

[Fifteenth Embodiment]

Figure 70:
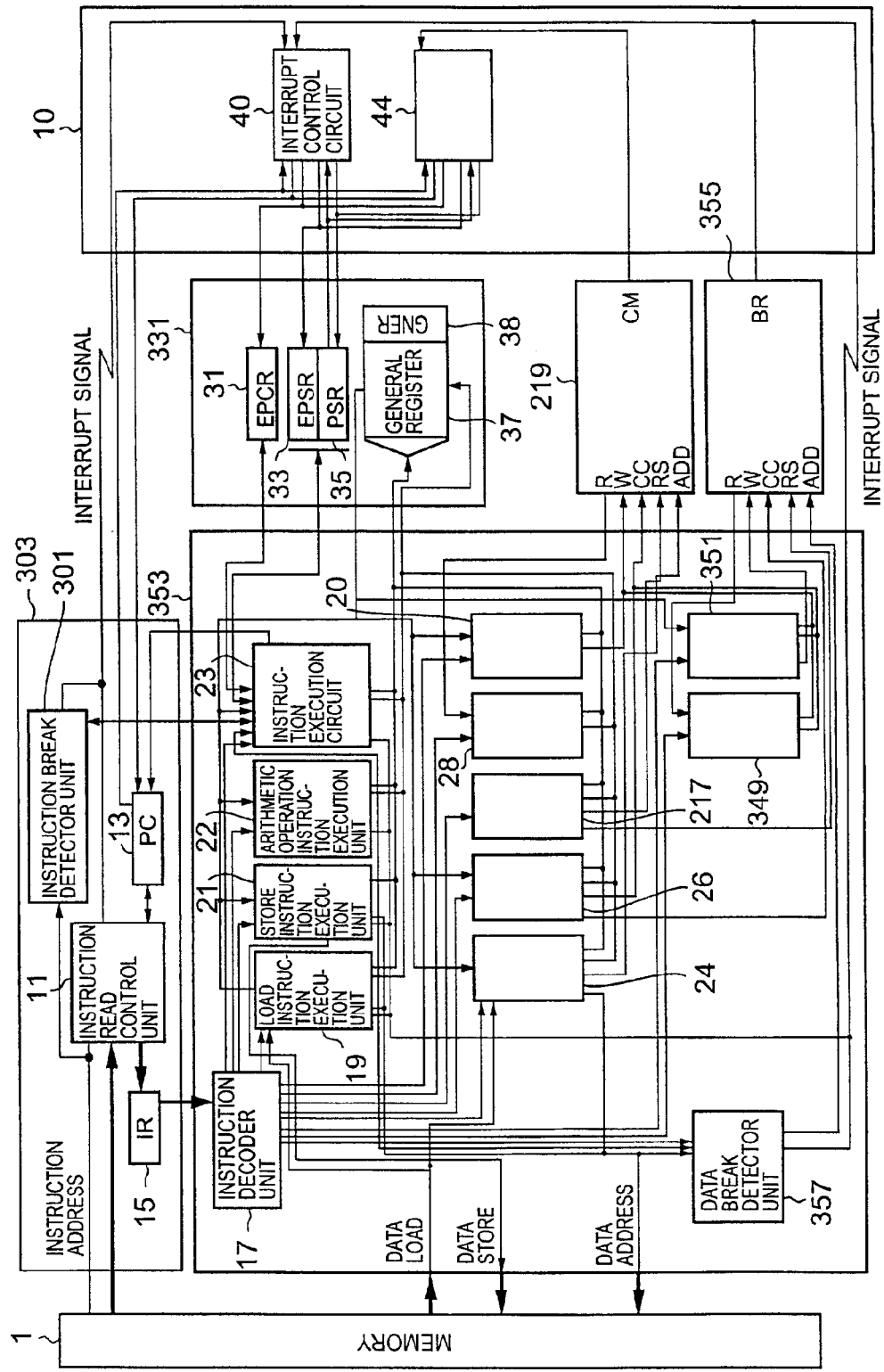
FIG. 70 shows the structure of a processor in accordance with a fifteenth embodiment of the present invention.

FIG. 70 shows the structure of a processor in accordance with a fifteenth embodiment of the present invention. As shown in FIG. 70, the processor of this embodiment has the same structure as the processor of the fourteenth embodiment shown in FIG. 66, except that the processor of this embodiment further comprises a break history control unit 355, and that an instruction execution unit 353 comprises a break history read instruction execution unit 349 and a break history write instruction execution unit 351. Also, the structure of a data break detector unit 357 in the instruction execution unit 353 differs from the structure of the data break detector unit 333 shown in FIG. 66.

The break history read instruction execution unit 349 is connected to the instruction decoder unit 17, the break history control unit 355, and the history control unit 219. The break history write instruction execution unit 351 is connected to the instruction decoder unit 17, the general register 37, the history control unit 219, and the break history control unit 355. The break history control unit 355 is also connected to the exception inhibiting history confirmation control unit 26, the exception inhibiting flag nullifying instruction execution unit 217, the data break detector unit 357, and the commit exception interrupt control unit 44.

Besides the function described in the fourteenth embodiment, the exception inhibiting history confirmation control unit 26 has a function to supply a confirmation signal CC to the break history control unit 355 through the exception of a commit instruction. Also, in addition to the function described in the fourteenth embodiment, the exception inhibiting flag nullifying instruction execution unit 217 has a function to supply a reset (nullifying) signal RS to the break history control unit 355 through the execution of an exception inhibiting flag nullifying instruction.

When receiving a break history read instruction from the instruction decoder unit 17, the break history read instruction execution unit 349 supplies a read signal R to the break history control unit 355, thereby reading out an exception inhibiting data break history table. The break history read instruction execution unit 349 then writes the read result into the general register 37. When receiving a break history write instruction from the instruction decoder unit 17, the break history write instruction execution unit 351 supplies the break history control unit 355 with a write signal W and the data read out from the general register 37.

In accordance with a registration signal ADD supplied from the data break detector unit 357, the break history control unit 355 registers data break information in an exception inhibiting data break history table unit. In response to a supplied confirmation signal CC, it is determined whether or not data break information is held at a designated register number. If there is data break information held at the designated register number, the commit exception interrupt control unit 44 is notified by a break signal BR that a break interrupt has been detected. Furthermore, in response to a supplied nullifying signal RS, if the data break information is held at the designated register number, the entry is nullified. In accordance with a supplied read signal R, the data read out from the exception inhibiting data break history table unit is supplied to the break history read instruction execution unit 349. In accordance with a supplied write signal W, the value supplied from the break history write instruction execution unit 351 is written in the exception inhibiting data break history table unit.

Figure 71:
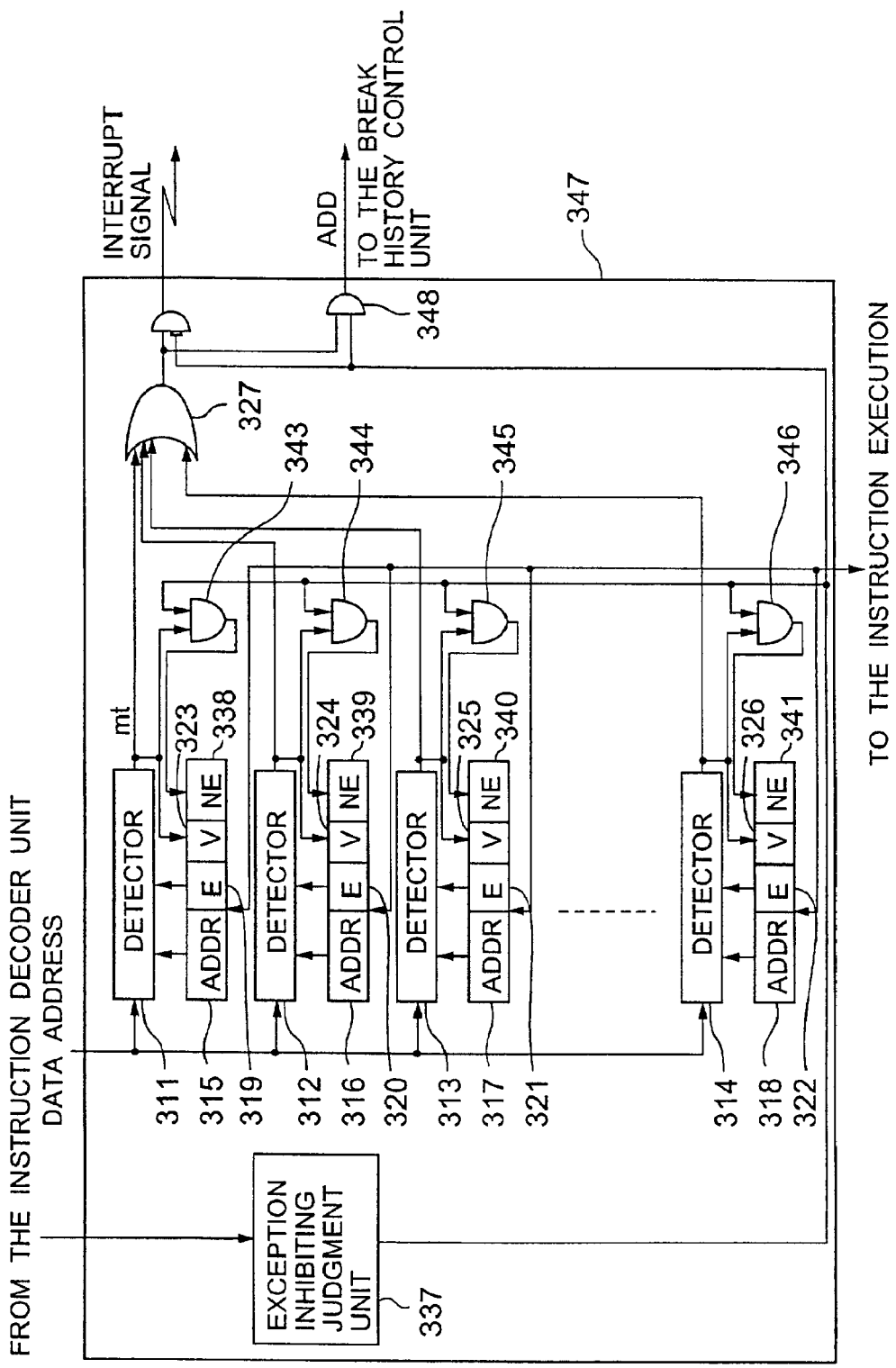
FIG. 71 shows the structure of a data break detector point shown in FIG. 70.

FIG. 71 shows the structure of the data break detector unit 347 shown in FIG. 70. As shown in FIG. 71, the data break detector unit 347 of this embodiment has the same structure as the data break detector unit 333 shown in FIG. 67, except that the output terminal of the data break detector unit 347 includes an AND circuit 348 connected to the break history control unit 355.

The detectors 311 to 314 determine whether or not the data break conditions are satisfied. More specifically, the effective address of a load/store instruction that is not an exception inhibiting instruction is compared with the address stored in the address fields. If the two addresses coincide with each other, "1" is written in a corresponding V field, and a signal mt that indicates the establishment of the data break is outputted. Also, if the effective address of an exception inhibiting instruction coincides with the address stored in the address fields, a registration signal ADD is supplied to the break history control unit 355 via the OR circuit 327.

Figure 72:
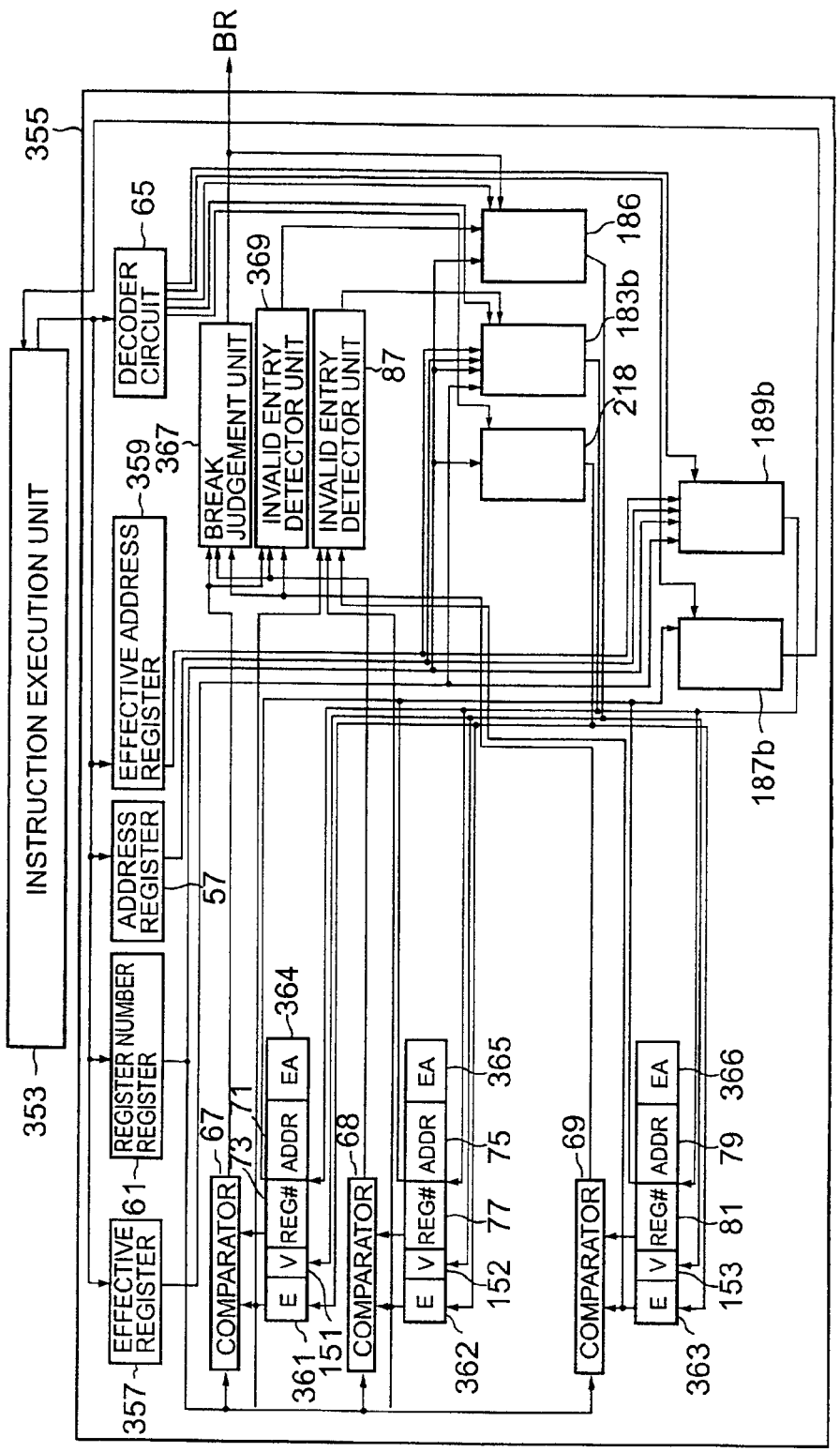
FIG. 72 shows the structure of a break history control unit shown in FIG. 70.

FIG. 72 shows the structure of the break history control unit 355 shown in FIG. 70. As shown in FIG. 72, the break history control unit 355 of this embodiment has a structure similar to that of the history control unit 219 shown in FIG. 68. The break history control unit 355 of this embodiment comprises the address register 57, an effective address register 359, the register number register 61, an effective register 357, the decoder circuit 65, the comparators 67 to 69, E fields 361 to 363, the V fields 151 to 153, the address fields 71, 75, and 79, EA fields 364 to 366, the register number fields 73, 77, and 81, a break judgment unit 367, a break entry detector unit 369, the invalid entry detector unit 87, a break history registration control unit 183b, a break history confirmation control unit 186, a break history read instruction execution unit 187b, a break history write instruction execution unit 189b, and the history table nullifying unit 218.

The address register 57 the effective address register 359, the register number register 61, the effective register 357, and the decoder circuit 65, are connected to the instruction execution unit 353. The address register 57 holds the instruction address of an address subjected to a break operation. The effective address register 359 holds the effective address of the instruction subjected to a break operation. The register number register 61 holds the register number of a register in which data is written in the execution of an exception inhibiting load instruction.

The effective register 357 may be formed by an effective flag that holds data indicating whether or not the data break information is valid. When the effective flag is "0", the entry is invalid. When the effective flag is "1" the entry is valid.

The decoder circuit 65 analyzes a signal supplied from the instruction execution unit 353, and activates a corresponding control unit. More specifically, the decoder circuit 65 activates the break history registration control unit 183b in response to a registration signal ADD; activates the break history confirmation control unit 186 in response to a confirmation signal CC; activates the break history read instruction execution unit 187b in response to a read signal R; activates the break history write instruction execution unit 189b in response to a write signal W; and activates the history table nullifying unit 218 in response to a nullifying signal RS.

The comparators 67 to 69 are connected to the register number register 61 and the corresponding entries. The plurality of entries constitute the exception inhibiting data break history table. Each of the entries includes: the E fields 361 to 363 that digitally indicates whether or not the entry is valid; the V fields 151 to 153 that digitally indicates whether or not a data break has occurred in the entry; the address fields 71, 75, and 79, which hold the instruction address of a registered data break; the EA fields 364 to 366, which hold the effective address of a registered data break; and the register number fields 73, 77, and 81, which indicate the register number of a register in which the result of the registered data break is written.

The comparators 67 to 69 compare a value recorded in the register number fields 73, 77, and 81, with the register number stored in the register number register 61. The comparators 67 to 69 then output a signal that indicates whether or not the two values coincide with each other.

The break judgment unit 367 is connected to the comparators 67 to 69. In accordance with the signal supplied from the comparators 67 to 69, the break judgment unit 367 determines whether or not a register in which the data break information is stored is designated by a commit instruction. The judgment result is outputted to the break history confirmation control unit 186, and a break signal BR is supplied to the commit exception interrupt control unit 44.

The break entry detector unit 369 is connected to the comparators 67 to 69. In accordance with the signal supplied from the comparators 67 to 69, the break entry detector unit 369 detects the entry number of an entry that stores the register number of a register designated by a commit instruction among register numbers designating result write objects registered in the exception inhibiting data break history table. In accordance with the information in the E fields 361 to 363 of each entry, the invalid entry detector unit 87 detects a free entry (an invalid entry) in the exception inhibiting data break history table.

The break history registration control unit 183b is connected to the address register 57, the effective address register 359, the register number register 61, the effective register 357, the decoder circuit 65, and the invalid entry detector unit 87. In accordance with a registration signal ADD supplied from the decoder circuit 65, the break history registration control unit 183b writes the data break information into the E fields 361 to 363, the address fields 71, 75, and 79, the register number fields 73, 77, and 81, and the EA fields 364 to 366 of a free entry detected by the invalid entry detector unit.

The break history confirmation control unit 186 is connected to the register number register 61, the break judgment unit 367, the break entry detector unit 369, the decoder circuit 65, and the V fields 151 to 153. When the break judgment unit 367 determines that the register number of a register designated by a commit instruction coincides with the register number of a register in which result data is to be written and which is registered in the exception inhibiting data break history, the break history confirmation control unit 186 writes "1" in the V fields 151 to 153 of an entry in which the register number is stored.

The break history read instruction execution unit 187b reads out the data break information from an entry designated by an exception inhibiting data break history read instruction, and supplies the data break information to the instruction execution unit 353. The break history write instruction execution unit 189b writes the value supplied from the instruction execution unit 353, via the effective register 357, the register number register 61, the address register 57, and the effective address register 359, into the entry designated by an exception inhibiting data break history write instruction. The history table nullifying unit 218 nullifies the E fields 361 to 363 of the entry designated by an exception inhibiting flag nullifying instruction supplied from the decoder circuit 65.

As described so far, with the processor of this embodiment, the same effects as with the processor of the fourteenth embodiment can be achieved. Also, the break history control unit 355 registers the data break information of data breaks to be retained into the exception inhibiting data break history table, and performs a data break operation retained by executing a commit instruction in accordance with the break information. Accordingly, the program required for data processing can be further shortened. Thus, the memory capacity required for executing the program can be reduced, and high-speed data processing can be realized.

[Sixteenth Embodiment]

Figure 73:
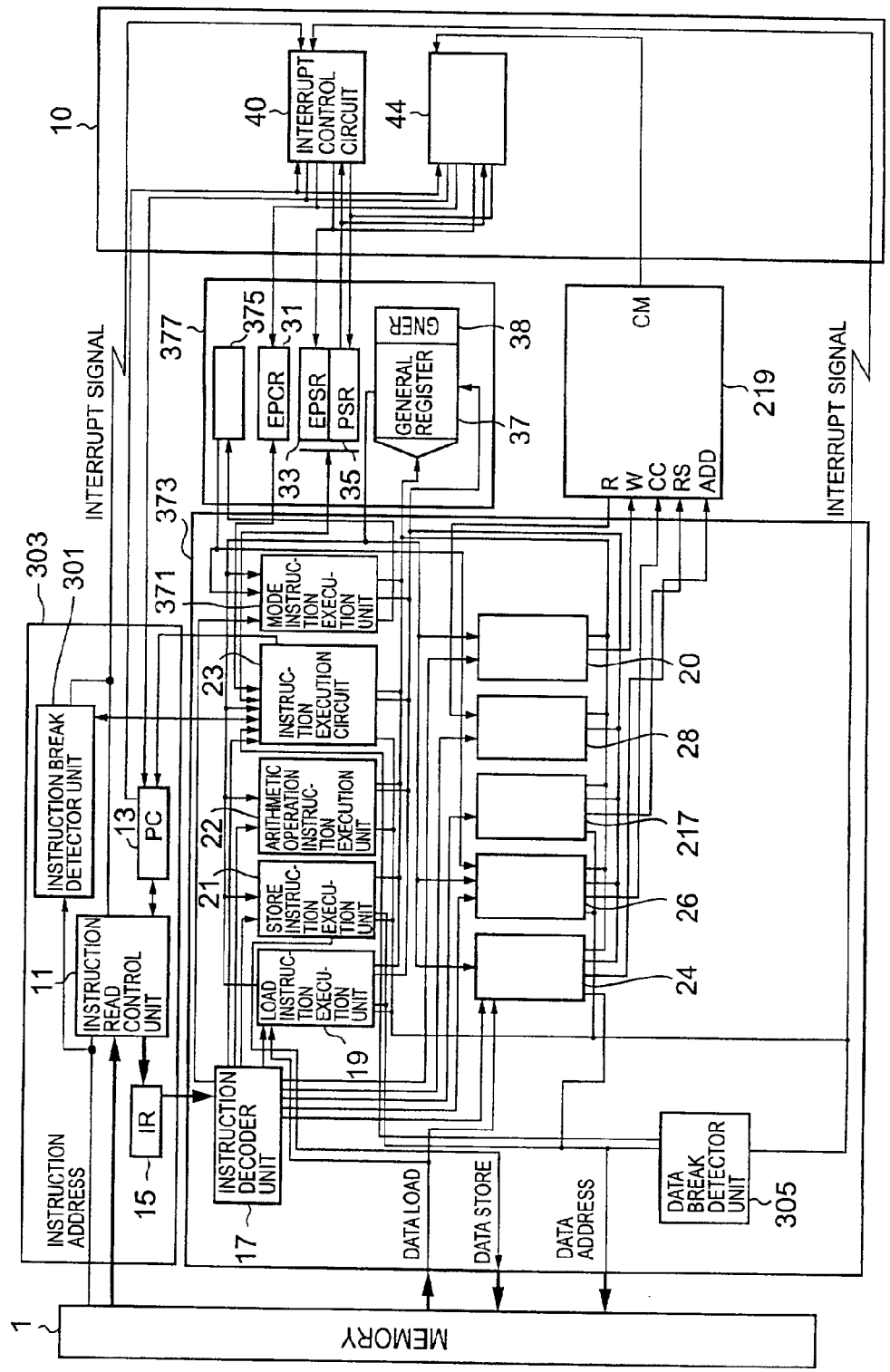
FIG. 73 shows the structure of a processor in accordance with a sixteenth embodiment of the present invention.

FIG. 73 shows the structure of a processor in accordance with a sixteenth embodiment of the present invention. As shown in FIG. 73, the processor of this embodiment has the same structure as the processor of the fourteenth embodiment, except that an instruction execution unit 373 of this embodiment further comprises a mode instruction execution unit 371, and that a register control unit 377 of this embodiment further comprises a mode register 375.

The mode instruction execution unit 371 is connected to the instruction decoder unit 17, the mode register 375, and the general register 37. The mode register 375 is connected to the exception inhibiting history confirmation control unit 26 and the exception inhibiting flag nullifying instruction execution unit 217.

In the processor of this embodiment having the above structure, the value "0" is stored in the mode register 375 when an inherent instruction is executed. The value "1" is stored in the mode register 375, when an interrupt is generated as a commit instruction or an exception inhibiting flag nullifying instruction, as well as the inherent instruction, is executed.

The exception inhibiting history confirmation control unit 26 outputs an interrupt signal so as to notify the interrupt control unit 10 that an interrupt has occurred with the execution of a commit instruction, only when the mode register 375 holds the value "1". The exception inhibiting flag nullifying instruction execution unit 217 outputs an interrupt signal so as to notify the interrupt control unit 10 that an interrupt has occurred with the execution of an exception inhibiting flag nullifying instruction.

When receiving an operation mode read instruction from the instruction decoder unit 17, the instruction execution circuit 23 reads out the value from the mode register 375, and writes the value into the general register 37. When receiving an operation mode write instruction, the instruction execution circuit 23 reads out the value from the general register 37, and writes the value into the mode register 375.

In the processor of the sixteenth embodiment, the exception inhibiting data break history table is stored in a predetermined address in the memory 1. As shown in FIG. 75, the exception inhibiting data break history table of this embodiment contains data that is made up of the register numbers of register in which execution results of instructions subjected to a break operation, the instruction addresses of the instructions subjected to a break operation, and the effective addresses of the instructions subjected to a break operation, i.e., (r0, a0, ea0), (r1, a1, ea1), . . . , (rl, al, eal).

Figure 74:
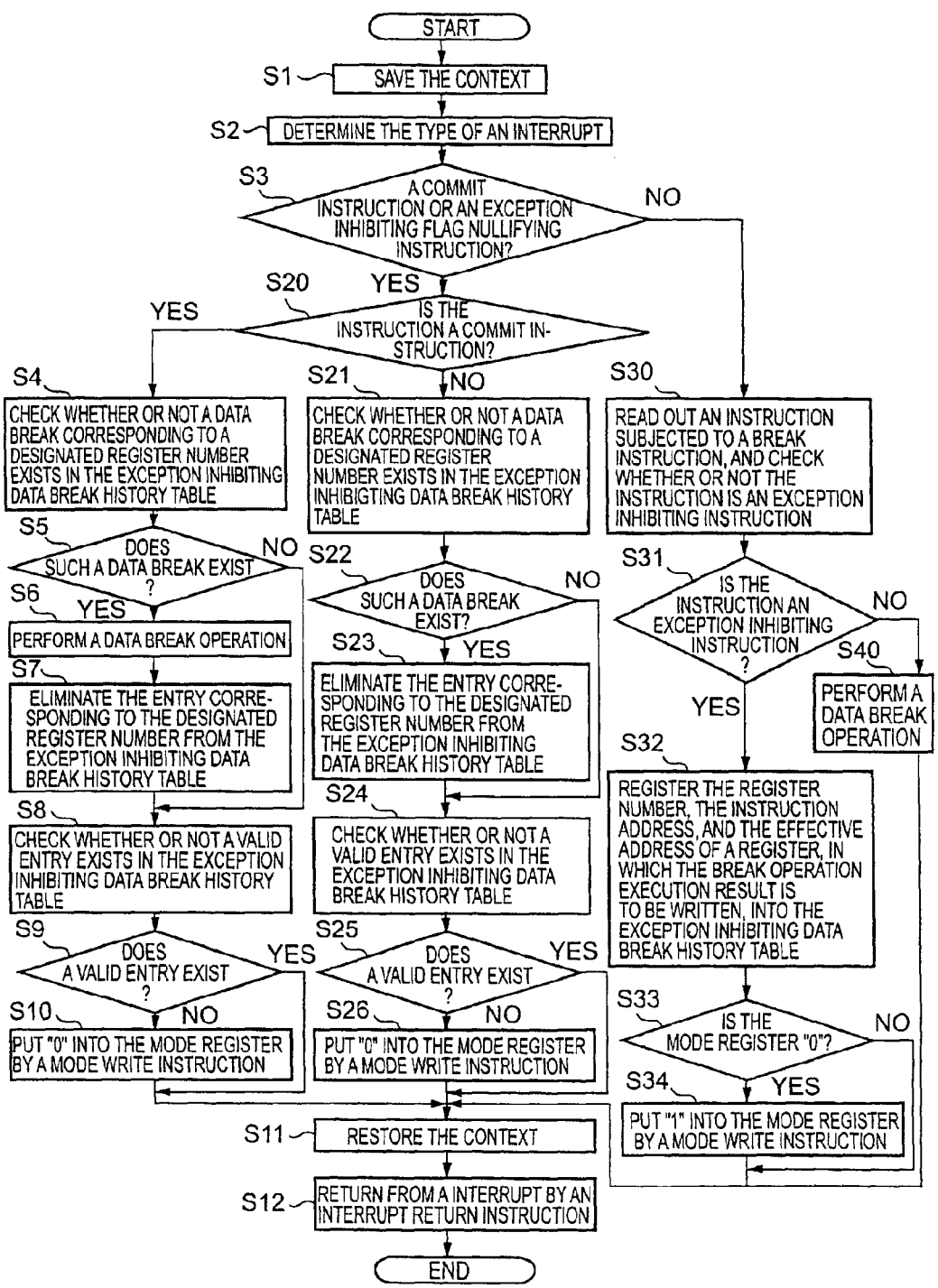
FIG. 74 is a flowchart showing a data break interrupt operation performed by a processor of FIG. 73 in accordance with an interrupt operation program.

FIG. 74 is a flowchart showing a data break operation performed by the processor shown in FIG. 73 in accordance with an interrupt operation program.

Figure 12:
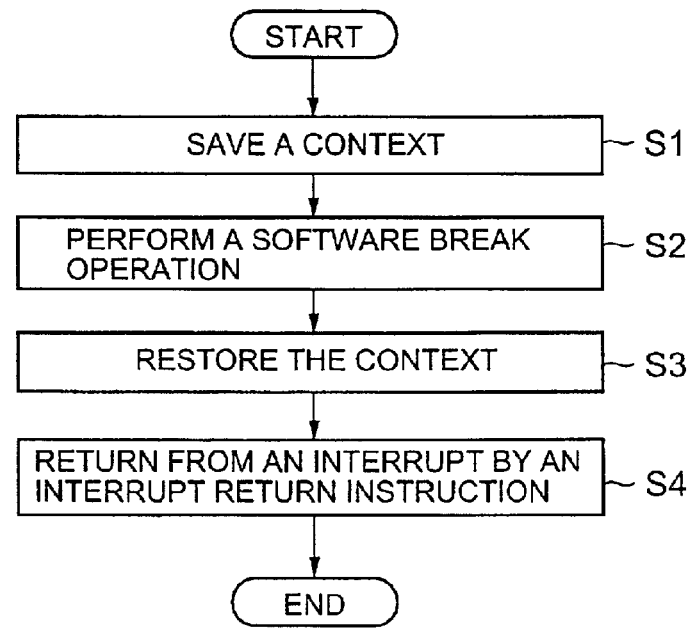
FIG. 12 is a flowchart showing a software break interrupt operation by an interrupt operation program.

The software break interrupt operation performed by the processor of this embodiment is the same as the operation performed by the conventional processor shown in the flowchart of FIG. 12.

As shown in FIG. 74, in step S1, the context is saved. In step S2, the type of an interrupt is determined. In step S3, it is determined whether or not the interrupt is generated by a commit instruction or an exception inhibiting flag nullifying instruction. If the interrupt is not generated by either of the instructions, the operation moves on to step S30. If the interrupt is generated from either one of the instructions, the operation moves on to step S20. In step S20, it is determined whether or not the interrupt is generated by the execution of a commit instruction. If the interrupt is generated by the execution of a commit instruction, the operation moves on to step S4. If the interrupt is generated by the execution of an exception inhibiting flag nullifying instruction, instead of a commit instruction, the operation moves on to step S21.

In step S4, it is determined whether or not the register number of a register designated by the commit instruction is stored as the number data r1 of a register in which the execution result is to be written in the exception inhibiting data break history table stored in the memory 1. If the register number is not found in step S5, the operation moves on to step S8. If the register number is found in step S5, the operation advances to step S6, in which a data break operation is performed so that the result is written in the register designated by the register number. In step S7, a set (an entry) of data that contains the register number designated by the commit instruction is eliminated from the exception inhibiting data break history table.

In step S8, it is determined whether or not a valid entry exists in the exception inhibiting data break history table. If it is determined that there is no valid entry existing in the exception inhibiting data break history table in step S9, the operation advances to step S10. If it is determined that there is a valid entry in step S10, the operation moves on to step S11.

In step S10, a mode write instruction is executed so as to store the value "0" into the mode register 375.

In step S11, the context is restored. In step S12, an interrupt return instruction is executed so as to return from an interrupt operation, thereby ending a data break interrupt operation.

In step S21, it is determined whether or not the register number designated by the exception inhibiting flay nullifying instruction is stored as the number data rl of the register in which the execution result is to be written in the exception inhibiting data break history table stored in the memory 1. If the register number is not found in step S22, the operation moves on to step S24. If the register number is found in step S22, the operation advances to step S23, in which a set (an entry) of data that contains the register number designated by the exception inhibiting flag nullifying instruction is eliminated from the exception inhibiting data break history table.

In step S24, it is determined whether or not a valid entry exists in the exception inhibiting data break history table. If it is determined that no valid entry exists in the exception inhibiting data break history table in step S25, the operation moves on to step S26. If it is determined that a valid entry exists in the exception inhibiting data break history table in step S25, the operation moves on to step S11.

In step S26, a mode write instruction is executed so as to store the value "0" into the mode register 375, and the operation moves on to step S11.

Meanwhile, in step S30, the arithmetic operation instruction execution unit 22 determines, through a comparison operation, whether or not an instruction subjected to a break operation is an exception inhibiting instruction. If the instruction is determined to be an exception inhibiting instruction in step S31, the operation moves on to step S32. If the instruction is determined not to be an exception inhibiting instruction in step S31, the operation moves on to step S40.

In step S32, the register number, the instruction address, and the effective address of the register in which the exception result of the instruction subjected to a break operation, are registered in the exception inhibiting data break history table stored in the memory 1. In step S33, it is determined whether or not the value stored in the mode register 375 is "0". If the mode register 375 holds the value "0", the operation advances to step S34. If the mode register 375 holds the value "1", the operation moves on to step S11.

In step S34, a mode write instruction is executed so as to store the value "1" in the mode register 375, and the operation moves on to step S11.

Meanwhile, in step S40, a data break operation is performed, and the operation moves on to step S11.

As described so far, when the execution of a data break operation is retained, the mode register 375 is set at the value "1". Accordingly, whether or not there is a data break operation necessary for executing an ensured instruction can be promptly determined from the value stored in the mode register 375. Thus, with the processor of this embodiment, the speed of data processing can be further increased.

The present invention is not limited to the specifically disclosed embodiments, but variations and modifications may be made without departing from the scope of the present invention.

The present application is based on Japanese priority application Nos. 11-359837, filed on Dec. 17, 1999, 2000-043441, filed on Feb. 21, 2000, and 2000-067789, filed on Mar. 10, 2000, the entire contents of which are hereby incorporated by reference.

What is claimed is:

1. A method of controlling a processor that changes an execution sequence of instructions arranged in a program, the method comprising:

executing a second instruction that is placed after a first instruction in the program prior to execution of the first instruction; and overwriting an execution result of the first instruction on data corresponding to an address of a first data when the address of the first data to be executed by the first instruction is included in an address region of second data to be processed by the second instruction, wherein the first instruction is a store instruction to store the first data into a storage unit, and the second instruction is a load instruction to read out the second data from the storage unit.

2. The method as claimed in claim 1, wherein:

executing the second instruction includes storing information for specifying a storage unit that stores an address of the second data to be processed by the second instruction and a result obtained by the execution of the second instruction; and overwriting is carried out in accordance with the address of the data to be processed by the second instruction and the information for specifying the storage unit.

3. The method as claimed in claim 2, further comprising:

executing a third instruction so as to erase the address and the information for specifying the storage unit.

4. The method as claimed in claim 2, further comprising:

executing a third instruction so as to erase either the address of the data to be processed by the second instruction or the information for specifying the storage unit.

5. The method as claimed in claim 1, wherein:

executing the second instruction includes storing identification information of a context to be processed by the second instruction; and overwriting is carried out in accordance with the identification information of the context.

6. The method as claimed in claim 1, wherein the overwriting is carried out in accordance with an interrupt operation program, when the address of the first data to be processed by the first instruction is included in the address region of the second data to be processed by the second instruction.

7. The method as claimed in claim 1, wherein the overwriting is carried out in accordance with a program at a branch destination designated by executing a branch instruction, when the address of the first data to be processed by the first instruction is included in the address region of the second data to be processed by the second instruction.

8. A processor that executes programmed instructions, comprising:
   a storage destination memory unit that stores a storage designation of a result obtained by executing a second instruction prior to execution of a first instruction, the second instruction being placed after the first instruction in a program;
   a judgment unit that determines whether an address of first data to be processed by the first instruction is included in an address region of second data to be processed by the second instruction;
   a data restoration unit that overwrites a result obtained by executing the first instruction on the second data corresponding to the address of the first data at the storage destination stored in the storage destination memory unit, when the judgment unit determines that the address of the first data is included in the address region of the second data
   a storage unit that stores data, where the first instruction is a store instruction to store the first data into the storage unit, and the second instruction is a load instruction to read out the second data from the storage unit.

9. The processor as claimed in claim 8, further comprising a plurality of storage units,
   the storage destination memory unit stores the information for specifying one of the storage units in which an address of the second data and the result obtained by executing the second instruction is stored.

10. The processor ass claimed in claim 8, further comprising a context information storage information for specifying a context to be processed by the second instruction,
   wherein the judgment unit is activated, only when a context to be processed by the first instruction is determined to coincide with the context to be processed by the second instruction, in accordance with the information stored in the context information storage unit.

11. The processor as claimed in claim 8, wherein the data restoration unit performs an overwrite operation in accordance with an interrupt operation program, when the judgment unit determines that the address of the first data is included in the address region of the second data.

12. The processor as claimed in claim 8, wherein the data restoration unit performs an overwrite operation in accordance with a program at a branch destination designated through execution of a branch instruction, when the judgment unit determines that the address of the first data is included in the address region of the second data.

13. The processor as claimed in claim 8, further comprising a storage destination erase unit that executes a third instruction so as to erase the storage destination stored in the storage destination memory unit.

14. The processor as claimed in claim 8, further comprising a storage destination erase unit that executes a third instruction so as to erase the storage destination stored in the storage destination memory unit.

15. A method of controlling a processor that controls execution of programmed instructions arranged in a program, the method comprising:
   executing an instruction prior to execution of a branch instruction, the instruction being placed after the branch instruction in the program;
   retaining an exception operation when necessity of the exception operation is detected in execution;
   performing the exception operation when the retained exception operation is needed in execution of an instruction at a branch destination selected through the execution of the branch instruction by a commit instruction; and
   returning to the program so as to continue the execution of the instruction at the branch destination when the exception operation is finished.

16. A method of controlling a processor that controls execution of instructions arranged in a program, the method comprising:
   executing an instruction prior to execution of a branch instruction, the instruction being placed after the branch instruction in the program;
   retaining an exception operation when an exception start instruction that requires the exception operation is detected during the executing;
   performing the exception operation when the retained exception operation is required in execution of an instruction at a branch destination selected through the execution of the branch instruction by a commit instruction; and
   returning to the program so as to sequentially execute the instructions starting from the exception start instruction, when the exception operation is finished.

17. The method as claimed in claim 15, wherein performing the exception operation is carried out by executing an interrupt operation program.

18. The method as claimed in claim 15, wherein:
   retaining the exception operation includes storing information for performing the retained exception operation; and
   performing the exception operation is carried out in accordance with the stored information.

19. The method as claimed in claim 15, wherein:
   retaining the exception operation includes allocating identification information to each set of data obtained as a result of a predetermined operation, the identification information indicating whether or not the corresponding set of data requires the exception operation; and
   performing the exception operation is carried out when a set of data that is determined to require the exception operation from the identification information is processed in the execution of the instruction at the branch destination selected through the execution of the branch instruction.

20. The method as claimed in claim 18, further comprising:
   executing a predetermined instruction so as to nullify the information for performing the retained exception operation.

21. The method as claimed in claim 19, further comprising:
   executing a predetermined instruction so as to nullify the identification information.

22. The method as claimed in claim 19, further comprising:
   executing a predetermined instruction so as to read out the identification information or to rewrite the identification information.

23. The method as claimed in claim 16, wherein performing the exception operation is carried out by executing an interrupt operation program.

24. The method as claimed in claim 16, wherein:
   retaining the exception operation includes storing information for performing the retained exception operation; and performing the exception operation is carried out in accordance with the stored information.

25. The method as claimed in claim 16, wherein:
retaining the exception operation includes allocating identification information to each set of data obtained as a result of a predetermined operation, the identification information indicating whether the corresponding set of data requires the exception operation; and
performing the exception operation is carried out when a set of data that is determined to require the exception operation from the identification information is processed in the execution of the instruction at the branch destination selected through the execution of the branch instruction.

26. The method as claimed in claim 24, further comprising:
executing a predetermined instruction so as to nullify the information for performing the retained exception operation.

27. The method as claimed in claim 25, further comprising:
executing a predetermined instruction so as to nullify the identification information.

28. The method as claimed in claim 25, further comprising:
executing a predetermined instruction so as to read out the identification information or to rewrite the identification information.

29. A processor that executes instructions arranged in a program, the processor comprising:
a control unit that controls an execution sequence so that an instruction placed after a branch instruction in the program is executed prior to execution of the branch instruction;
an exception inhibiting unit that retains an exception operation when necessity of the exception operation is detected during the execution of the instruction placed after the branch instruction;
an exception operation unit that performs the exception operation when the exception operation retained by the exception inhibiting unit is needed in execution of an instruction at a branch destination selected through execution of the branch instruction by a commit instruction; and
a return unit that returns to the program when the exception operation is finished, and continues the execution of the instruction at the branch destination.

30. A processor that executes instructions arranged in a program, the processor comprising:
a control unit that controls an execution sequence so that an instruction placed after a branch instruction in the program is executed prior to execution of the branch instruction;
an exception inhibiting unit that retains an exception operation when an exception start instruction that requires the exception operation is detected during the execution of the instruction placed after the branch instruction;
an exception operation unit that performs the exception operation when the exception operation retained by the exception inhibiting unit is needed in execution of an instruction at a branch destination selected through execution of the branch instruction by a commit instruction; and
a return unit that returns to the program when the exception operation is finished, and sequentially executes the instructions starting from the exception start instruction.

31. The processor as claimed in claim 29, wherein the exception operation unit executes an interrupt operation program so as to perform the exception operation.

32. The processor as claimed in claim 29, further comprising a storage unit that stores information for performing the exception operation retained by the exception inhibiting unit,
wherein the exception operation unit performs the exception operation in accordance with the information stored in the storage unit.

33. The processor as claimed in claim 29, wherein:
the exception inhibiting unit allocates identification information to each set of data obtained as a result of a predetermined operation, the identification information indicating whether or not the exception operation is required; and
the exception operation unit performs the exception operation, when data determined to require the exception operation in accordance with the identification information is processed in the execution of the instruction at the branch destination selected through the execution of the branch instruction.

34. The processor as claimed in claim 32, further comprising a history nullifying that executes a predetermined instruction so as to nullify the information for executing the retained exception operation.

35. The processor as claimed in claim 33, further comprising an identification information nullifying unit that executes a predetermined instruction so as to nullify the identification information.

36. The processor as claimed in claim 33, further comprising:
an identification information read unit that executes a predetermined instruction so as to read out the identification information; and
an identification information rewrite unit that executes a predetermined instruction so as to rewrite the identification information.

37. The processor as claimed in claim 30, wherein the exception operation unit executes an interrupt operation program so as to perform the exception operation.

38. The processor as claimed in claim 30, further comprising a storage unit that stores information for performing the exception operation retained by the exception inhibiting unit,
wherein the exception operation unit performs the exception operation in accordance with the information stored in the storage unit.

39. The processor as claimed in claim 30, wherein:
the exception inhibiting unit allocates identification information to each set of data obtained as a result of a predetermined operation, the identification information indicating whether or not the exception operation is required; and
the exception operation unit performs the exception operation, when data determined to require the exception operation in accordance with the identification information is processed in the execution of the instruction at the branch destination selected through the execution of the branch instruction.

40. The processor as claimed in claim 38, further comprising a history nullifying that executes a predetermined instruction so as to nullify the information for executing the retained exception operation.

41. The processor as claimed in claim 39, further comprising an identification information nullifying unit that executes a predetermined instruction so as to nullify the identification information.

42. The processor as claimed in claim 39, further comprising:
   an identification information read unit that executes a predetermined instruction so as to read out the identification information; and
   an identification information rewrite unit that executes a predetermined instruction so as to rewrite the identification information.

43. A method of controlling execution of instructions in a program, the method comprising:
   executing an instruction prior to execution of a branch instruction, the instruction being placed after the branch instruction in the program;
   retaining a break operation when necessity to suspend execution of the program is detected in executing the instruction by an exception inhibiting load instruction; and
   performing the break operation when the retained break operation is required in execution of an instruction at a branch destination selected through the execution of the branch instruction.

44. The method as claimed in claim 43, wherein:
   retaining a break operation includes storing information for performing the retained break operation; and
   performing the break operation is carried out in accordance with the stored information.

45. The method as claimed in claim 44, further comprising:
   nullifying the stored information.

46. The method as claimed in claim 43, wherein:
   retaining a break operation includes setting a predetermined value into a flag; and
   performing the break operation includes referring to the value of the flag so as to determine whether or not the retained break operation is needed in execution of an instruction at a branch destination selected through the execution of the branch instruction.

47. The method as claimed in claim 46, further comprising:
   executing a predetermined instruction so as to nullify the value of the flag.

48. The method as claimed in claim 43, wherein performing the break operation includes executing the instruction at the branch instruction selected through the execution of the branch instruction, in accordance with an interrupt operation program.

49. A processor that executes instructions in a program, the processor comprising:
   an exception inhibiting unit that retains a break operation when necessity of suspending execution of the program is detected in execution of a predetermined instruction by an exception inhibiting load instruction prior to execution of a branch instruction, the predetermined instruction being placed after the branch instruction in the program; and
   a break operation unit that performs the break operation when the break operation retained by the exception inhibiting unit is required in execution of an instruction at a branch destination selected through the execution of he branch instruction.

50. The processor as claimed in claim 49, further comprising a storage unit that stores information for performing the retained break operation,
   wherein the break operation unit performs the break operation in accordance with the information stored in the storage unit.

51. The processor as claimed in claim 50, further comprising a nullifying unit that nullifies the information stored in the storage unit.

52. The processor as claimed in claim 49, further comprising a flag, wherein:
   the exception inhibiting unit sets a predetermined value in the flag; and
   the break operation unit refers to the value of the flag so as to determine whether or not the retained break operation is needed in the execution of the instruction at the branch destination selected through the execution of the branch instruction.

53. The processor as claimed in claim 52, further comprising a flag nullifying unit that executes a predetermined instruction so as to nullify the flag.

54. The processor as claimed in claim 49, further comprising an interrupt operation unit that executes the instruction at the branch destination selected through the execution of the branch instruction, in accordance with an interrupt operation program.

55. A method of controlling a processor, comprising:
   executing a load instruction located after a store instruction in a program sequence prior to execution of the store instruction; and
   detecting whether an address region of data to be executed by the store instruction overlaps with an address region of data executed by the load instruction, where an execution result of the store instruction is overwritten upon determining that the address region for the execution of the store instruction overlaps the address region of the data executed by the load instruction.

* * * * *

UNITED STATES PATENT AND TRADEMARK OFFICE
CERTIFICATE OF CORRECTION

PATENT NO. : 6,889,315 B2
DATED : May 3, 2005
INVENTOR(S) : Hideo Miyake et al.

It is certified that error appears in the above-identified patent and that said Letters Patent is hereby corrected as shown below:

Column 51,
Line 31, change "ass" to -- as --;
Line 65, after "detected in" insert -- the --;

Column 56,
Line 9, change "he" to -- the --.

Signed and Sealed this

Third Day of January, 2006

JON W. DUDAS
*Director of the United States Patent and Trademark Office*